United States Patent
Fietsam et al.

(10) Patent No.: US 8,952,298 B2
(45) Date of Patent: Feb. 10, 2015

(54) ELECTRIC BROILER

(75) Inventors: Kim Charles Fietsam, New Athens, IL (US); Gregory K. Swanson, Eureka, MO (US); Daryl R. Monroe, Granite City, IL (US); Steven M. Shei, Fort Wayne, IN (US); Daniel Marvin Henke, Edwardsville, IL (US); Robert J. Reese, Edwardsville, IL (US); Jeffrey A. Stafford, Godfrey, IL (US)

(73) Assignee: Burger King Corporation, Miami, FL (US)

( * ) Notice: Subject to any disclaimer, the term of this patent is extended or adjusted under 35 U.S.C. 154(b) by 330 days.

(21) Appl. No.: 13/376,541

(22) PCT Filed: Jun. 11, 2010

(86) PCT No.: PCT/US2010/038244
§ 371 (c)(1),
(2), (4) Date: Dec. 6, 2011

(87) PCT Pub. No.: WO2010/144758
PCT Pub. Date: Dec. 16, 2010

(65) Prior Publication Data
US 2012/0085746 A1    Apr. 12, 2012

Related U.S. Application Data

(60) Provisional application No. 61/186,464, filed on Jun. 12, 2009.

(51) Int. Cl.
*F27B 9/36* (2006.01)
*A47J 37/04* (2006.01)
(Continued)

(52) U.S. Cl.
CPC .............. *A47J 37/044* (2013.01); *A47J 37/045* (2013.01); *F27D 11/02* (2013.01); *A21B 1/22* (2013.01); *F27B 9/063* (2013.01)
USPC ............ 219/403; 219/388; 219/395; 219/411

(58) Field of Classification Search
USPC ........................................................ 219/403
See application file for complete search history.

(56) References Cited

U.S. PATENT DOCUMENTS 1,982,386 A * 11/1934 Heinbuch ...................... 219/403
2,422,950 A * 6/1947 Cash .............................. 219/474
(Continued)

FOREIGN PATENT DOCUMENTS

| CN | 1367661 A | 9/2002 |
|---|---|---|
| EP | 0253278 A2 | 1/1988 |
| WO | WO 01/10275 A1 | 2/2001 |

OTHER PUBLICATIONS

Extended European Search Report for European Application No. 10786884.6 dated Feb. 11, 2013, 4 pgs.
(Continued)

*Primary Examiner* — Joseph M Pelham
(74) *Attorney, Agent, or Firm* — Arent Fox LLP

(57) ABSTRACT

A new electric broiler is disclosed. The broiler includes a housing having a cooking chamber, and a cooking surface in the housing. Upper and lower electrical heat sources are provided in the cooking chamber above and below the cooking surface. The lower heat source includes a removable heating module having an electric heating element and a quick connect/disconnect connector for quick electrical connection and disconnection of the electric heating element to and from a quick connect/disconnect connector on the housing. The broiler also includes a module holder on the housing for holding the removable heating module. The heating module is removable from the holder for quick replacement of the module.

22 Claims, 43 Drawing Sheets

(51) Int. Cl.
*A21B 1/14* (2006.01)
*F27D 11/00* (2006.01)
*F27D 11/02* (2006.01)
*A21B 1/22* (2006.01)
*F27B 9/06* (2006.01)

(56) References Cited

U.S. PATENT DOCUMENTS

| | | | | |
|---|---|---|---|---|
| 2,824,204 A * | 2/1958 | Reno et al. | | 219/402 |
| 2,872,558 A * | 2/1959 | Price | | 219/532 |
| 2,930,881 A * | 3/1960 | Ammerman | | 219/536 |
| 2,994,760 A * | 8/1961 | Pecoraro et al. | | 219/394 |
| 3,059,984 A | 10/1962 | Handel | | |
| 3,161,755 A | 12/1964 | Tilus | | |
| 3,270,660 A | 9/1966 | Filipak | | |
| 3,515,854 A | 6/1970 | Williams | | |
| 3,548,154 A * | 12/1970 | Christiansson | | 219/403 |
| 3,899,655 A * | 8/1975 | Skinner | | 219/404 |
| 4,244,285 A | 1/1981 | Baker | | |
| 4,358,669 A | 11/1982 | Bryson, Jr. | | |
| 4,554,437 A | 11/1985 | Wagner et al. | | |
| 4,763,300 A | 8/1988 | Yukawa | | |
| 5,142,795 A * | 9/1992 | Abbott | | 34/444 |
| 5,156,873 A | 10/1992 | Skrmetta | | |
| 5,253,564 A * | 10/1993 | Rosenbrock et al. | | 99/328 |
| 5,270,519 A | 12/1993 | Higgins | | |
| 5,668,533 A | 9/1997 | Jackson, Jr. et al. | | |
| 6,080,022 A | 6/2000 | Shaberman et al. | | |
| 6,206,714 B1 | 3/2001 | Bernardini | | |
| 6,576,874 B2 * | 6/2003 | Zapata et al. | | 219/400 |
| 6,727,471 B2 | 4/2004 | Evans et al. | | |
| 6,808,389 B1 | 10/2004 | Glidden | | |
| 6,867,392 B1 * | 3/2005 | Howard | | 219/388 |
| 7,038,172 B1 * | 5/2006 | Stuck | | 219/388 |
| 7,087,867 B2 | 8/2006 | Stockley | | |
| 7,254,009 B2 | 8/2007 | Allen | | |
| 7,524,362 B2 | 4/2009 | Wu et al. | | |
| 7,973,264 B2 * | 7/2011 | Li | | 219/404 |
| 8,033,213 B2 * | 10/2011 | Cook et al. | | 99/328 |
| 2003/0042244 A1 * | 3/2003 | Zapata et al. | | 219/400 |
| 2003/0056658 A1 * | 3/2003 | Jones et al. | | 99/386 |
| 2005/0109216 A1 * | 5/2005 | Jones et al. | | 99/386 |
| 2006/0157469 A1 | 7/2006 | Coleman et al. | | |
| 2006/0257542 A1 | 11/2006 | Cook et al. | | |
| 2008/0032018 A1 * | 2/2008 | Garniss et al. | | 426/523 |
| 2008/0099461 A1 * | 5/2008 | Li | | 219/402 |
| 2008/0314892 A1 * | 12/2008 | Graham | | 219/388 |

OTHER PUBLICATIONS

International Search Report issued in PCT/US2010/038244, dated Aug. 19, 2010, 6 pages.
Written Opinion issued in PCT/US2010/038244, dated Aug. 19, 2010, 9 pages.
Examination Report for European Application No. 10786884.6 dated Jan. 28, 2014.
Chinese Office Action dated May 15, 2014 issued in Chinese Patent Publication No. 201080035432.6.

* cited by examiner

SCENARIO 1:
SIDE INTERLOCK PROPERLY
INSTALLED REAR INTERLOCK
PROPERLY INSTALLED WITH K1 & K2
IN NORMAL OPERATION MODE

SCENARIO 2:
SIDE INTERLOCK PROPERLY
INSTALLED REAR INTERLOCK
NOT PROPERLY INSTALLED

SCENARIO 3:
SIDE INTERLOCK NOT PROPERLY
INSTALLED REAR INTERLOCK
PROPERLY INSTALLED

SCENARIO 4:
SIDE INTERLOCK NOT PROPERLY
INSTALLED REAR INTERLOCK NOT
PROPERLY INSTALLED

ELECTRIC BROILER

FIELD OF THE INVENTION

The present invention generally relates to broilers for batch cooking having particular use in quick serve and fast food restaurants, and more particularly to an electric broiler for broiling batches of various food products by utilizing electric heating elements above and below the food to be cooked.

BACKGROUND OF THE INVENTION

Broilers having a continuously moving chain conveyor for moving food products past heating elements are known in the fast food industry. Such broilers allow for the continuous sequential cooking of beef patties and other food products to accommodate high demand periods in fast food restaurants. Conveyor broilers also increase the efficiency of kitchen operations by uniformly cooking similar food products without continuous attention from the cook. U.S. published application No. 2006/0257542, entitled AUTOMATIC BROILER FOR VARIABLE BATCH COOKING and incorporated by reference herein, describes a conveyor broiler in which the heating elements are gas burners for flame broiling food products.

A need exists for an improved conveyor broiler in which the heating elements are powered by electricity rather than gas, since gas is not available in a substantial number of territories.

SUMMARY OF THE INVENTION

This invention is directed to an electric broiler comprising a housing having a top, bottom, front, back and opposite sides, a cooking chamber in the housing, and a cooking surface in the cooking chamber. An upper heat source is provided in the cooking chamber above the cooking surface, and a lower heat source is provided in the cooking chamber below the cooking surface. An electrical circuit provides electrical power to the upper and lower heat sources. The electrical circuit includes at least one quick connect/disconnect connector on the housing. The lower heat source comprises a removable heating module having an electric heating element and a quick connect/disconnect connector for quick electrical connection and disconnection of the electric heating element to and from said quick connect/disconnect connector on the housing. The broiler also includes a module holder on the housing for holding the removable heating module. The heating module being movable from a first position in which the heating element is in the module holder and operable to heat the cooking chamber to a second position in which the heating module is removed from the module holder to permit replacement of the module.

This invention is also directed to an electric broiler comprising a housing having a top, bottom, front, back and opposite sides, a cooking chamber in the housing, and a cooking surface in the cooking chamber. An upper heat source is provided in the cooking chamber above the cooking surface, and a lower heat source is provided in the cooking chamber below the cooking surface. An electrical circuit provides electrical power to the upper and lower heat sources. The electrical circuit includes at least one quick connect/disconnect connector on the housing. The upper heat source comprises a removable heating module having an electric heating element and a quick connect/disconnect connector for quick electrical connection and disconnection of the electric heating element to and from said quick connect/disconnect connector on the housing. The broiler also includes a module holder on the housing for holding the removable heating module. The heating module being movable from a first position in which the heating element is in the module holder and operable to heat the cooking chamber to a second position in which the heating module is removed from the module holder to permit replacement of the module.

The invention is also directed to a removable heating module for an electric broiler. The broiler comprises a housing having a top, bottom, front, back and opposite sides, a cooking chamber in the housing, a cooking surface in the cooking chamber, an upper heat source in the cooking chamber above the cooking surface, a lower heat source in the cooking chamber below the cooking surface, a module holder in the cooking chamber for holding said removable module, and an electrical circuit for providing electrical power to the upper and lower heat sources. The electrical circuit includes at least one quick connect/disconnect connector on the housing. The removable heating module comprises an electric heating element and a quick connect/disconnect connector for quick electrical connection and disconnection of said electric heating element to and from the quick connect/disconnect connector on the housing. The removable heating module is movable from a first position in which the heating element is in the module holder and operable to heat the cooking chamber to a second position in which the heating module is removed from the module holder to permit replacement of the module with a replacement module.

Other objects and features of this invention will be in part apparent and in part pointed out hereinafter in the specification and claims of this application.

BRIEF DESCRIPTION OF THE DRAWINGS

Corresponding reference characters indicate corresponding parts throughout the drawings.

DETAILED DESCRIPTION

Figure 1:
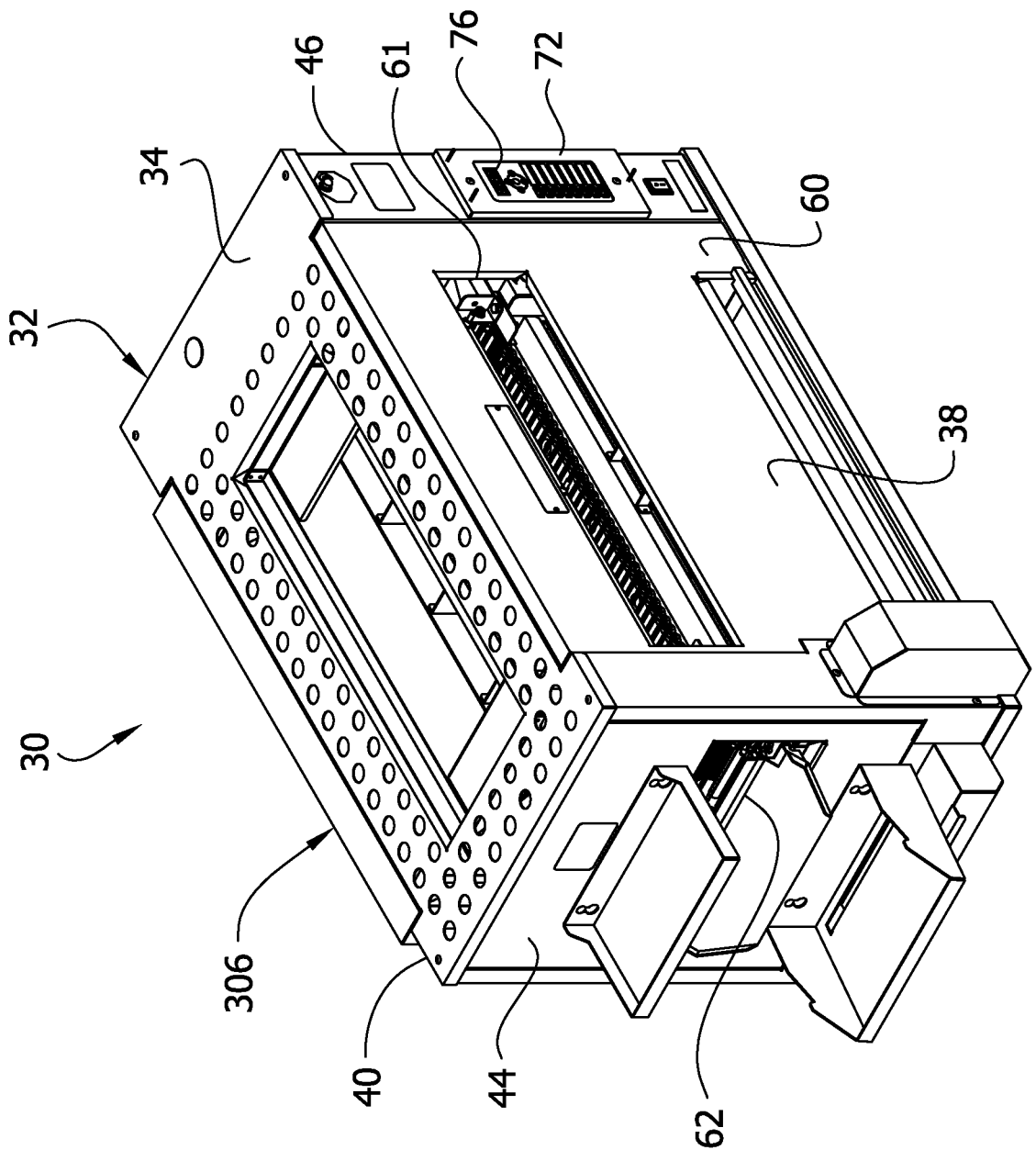
FIG. 1 is a perspective of an electric broiler of this invention.
Figure 2:
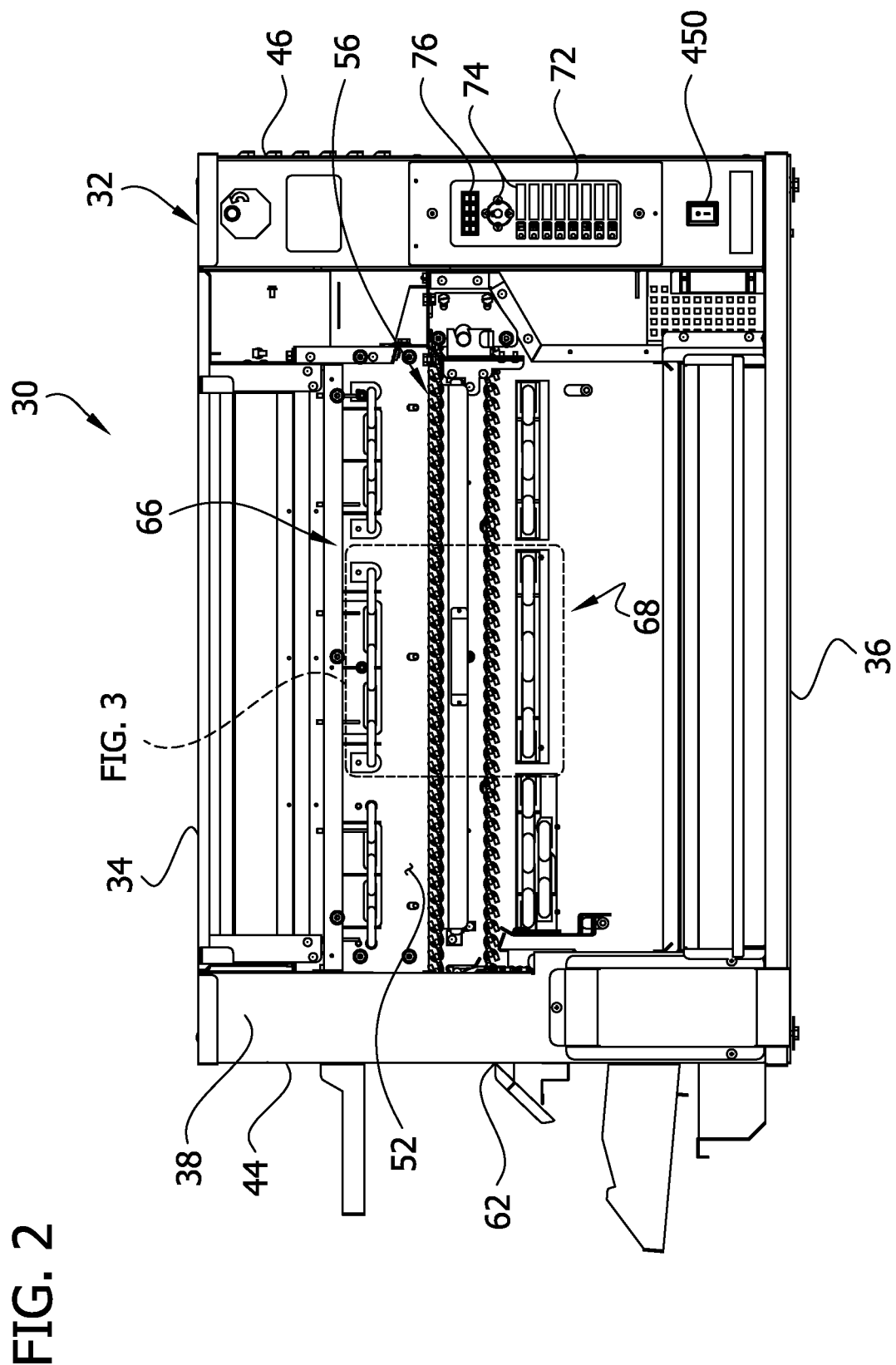
FIG. 2 is a front view of the broiler with parts removed to show details inside a cooking chamber of the broiler.
Figure 3:
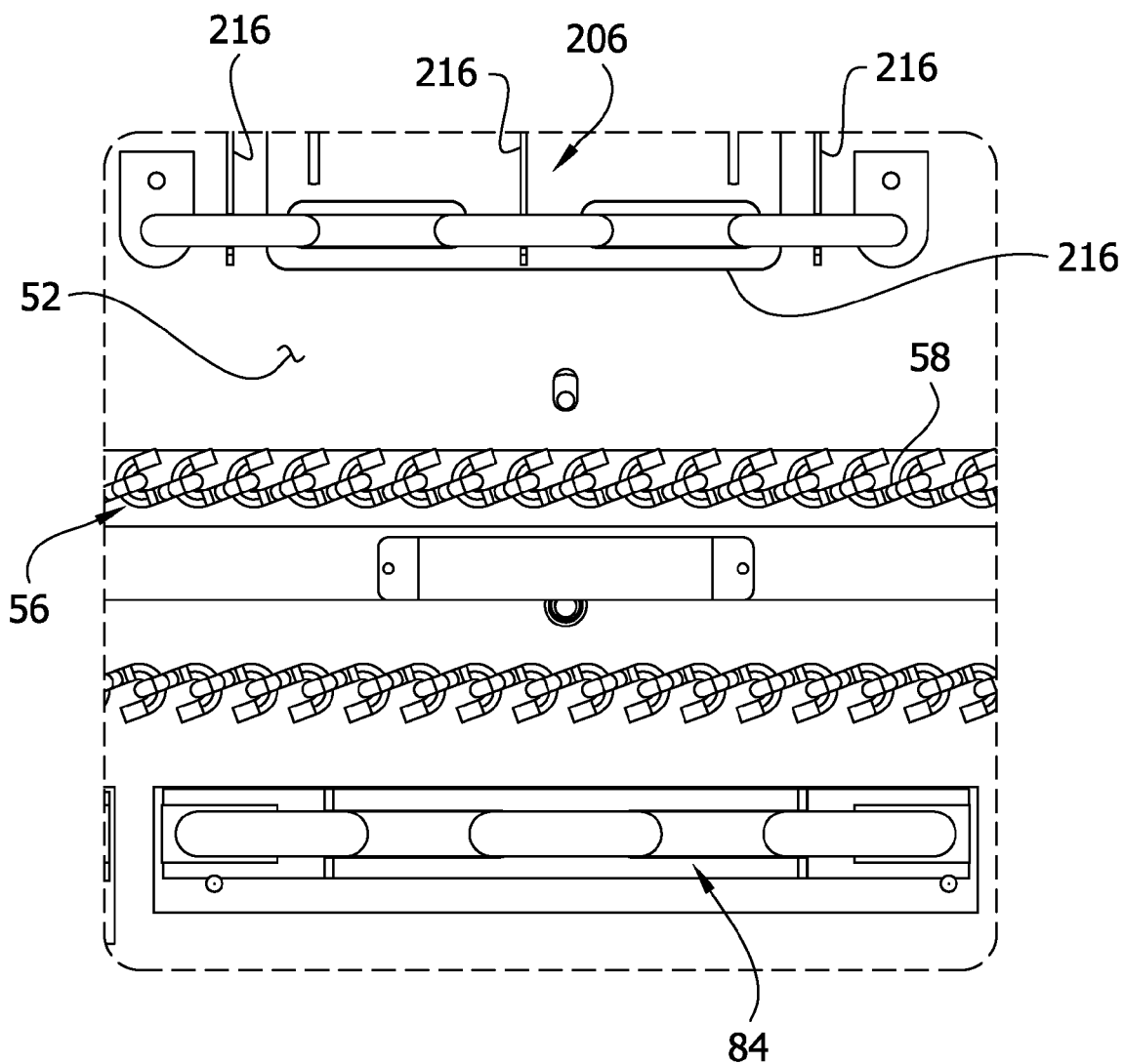
FIG. 3 is an enlarged portion of FIG. 2 showing a cooking surface and upper and lower heat sources above and below the cooking surface.
Figure 21:
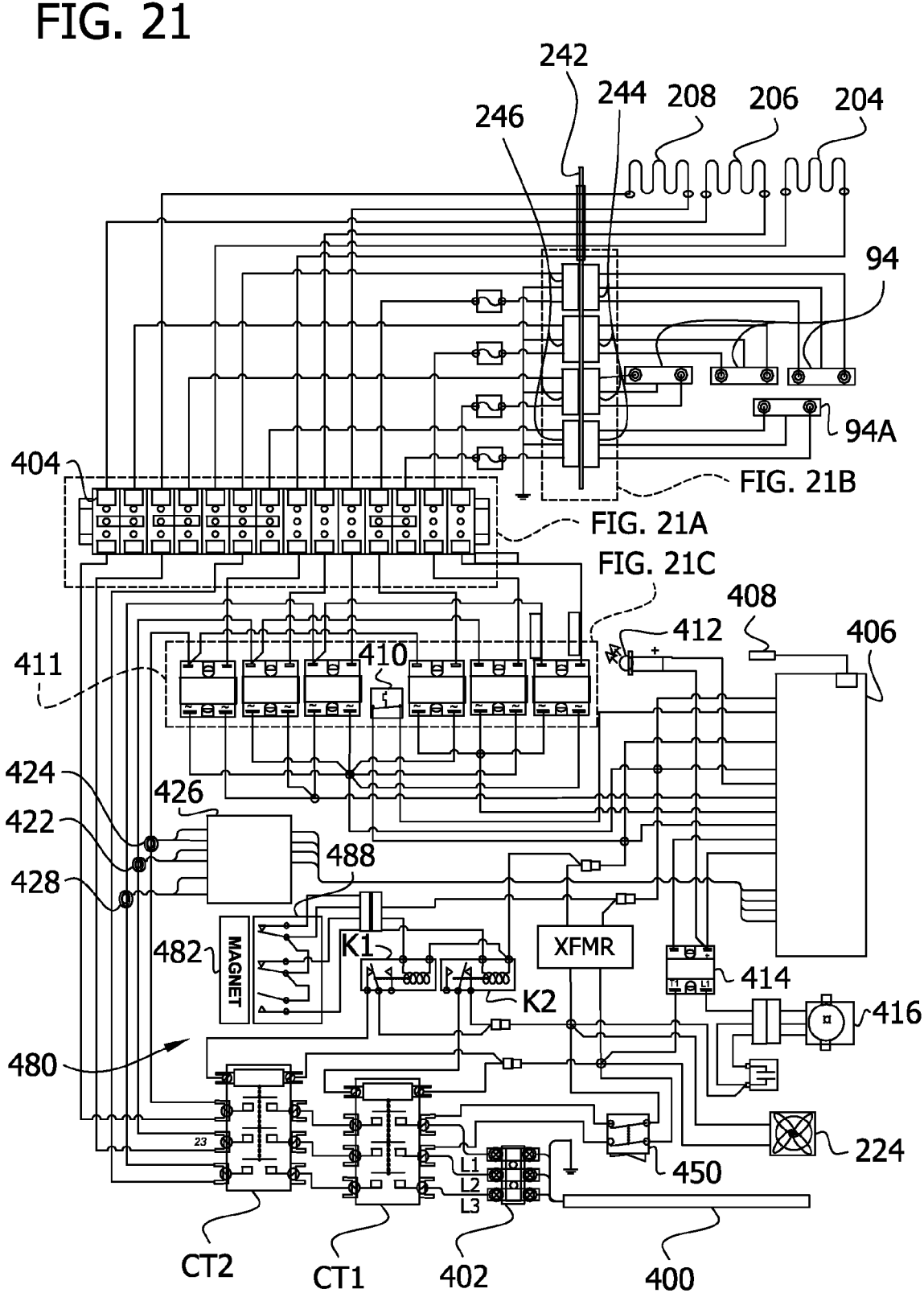
FIG. 21 is a wiring diagram of the broiler of the first embodiment.

Referring to FIGS. 1-3, an electric broiler of the present invention is designated in its entirety at 30. In general, the broiler 30 comprises a housing 32 having a top 34, bottom 36, front 38, back 40 and opposite sides 44,46. The housing 32 contains a cooking chamber 52. A conveyor 56 defining a cooking surface 58 (FIG. 3) is provided inside the housing for transporting food items that have been cooked (e.g., beef patties) through the cooking chamber. In the illustrated embodiment, the conveyor 56 is an endless chain conveyor having an upper generally horizontal reach defining the cooking surface 58 and a lower reach. Other types of transport systems may be used. The front 38 of the housing 32 includes a front panel 60 having an opening 61 through which food items may be loaded manually or automatically (e.g., by a suitable loading mechanism, not shown) into the cooking chamber 52 for transport by the conveyor 56 to an outlet 62 at one side 44 of the housing. An upper heat source 66 is provided above the cooking surface 58, and a lower heat source 68 is provided below the cooking surface. The broiler 30 includes an electrical circuit 70 (e.g., as shown in FIG. 21) for providing electrical power to the upper and lower heat sources 66, 68. A control panel 72 with an operator input 74 and visual display 76 is provided on the front 38 of the housing 32 adjacent the side 46 of the housing opposite the outlet 62.

The cooking chamber 52 can be divided into multiple cooking zones Z1, Z2, Z3 (FIG. 4) having different heating requirements. In the illustrated embodiment, the cooking chamber has a first cooking zone Z1 adjacent the outlet side 44 of the broiler, a second middle cooking zone Z2, and a third cooking zone Z3 adjacent the opposite side 46 of the broiler. Since cooler ambient air is drawn through the outlet 62 and into zone Z1, it generally takes more heat to heat the first cooking zone Z1 than the middle cooking zone Z2, and it takes lower heat density to heat the middle cooking zone than the third cooking zone Z3. Therefore, the upper and lower heat sources 66, 68 are configured to meet the different heating requirements and to generate different amounts of heat for the different cooking zones. The broiler may include more or less than three cooking zones.

The lower heat source 68 comprises at least one removable heating module. In the illustrated embodiment, three modules 82, 84, 86 are provided for the first, second and third cooking zones Z1, Z2 and Z3, respectively, but the number of zones and the number of modules per zone can vary. The lower heat source can be controller independently from the upper heat source. Each removable heating module 82, 84, 86 is movable from a first operative position (FIGS. 1-4) in which the module is installed in the housing 32 for operation to a second removed position (FIGS. 5-7) in which the module is removed from the housing to permit replacement of the module with a replacement module.

In general, the modules 82, 84 and 86 have the same or similar components, as will be described. For convenience, therefore, corresponding components of the three removable modules 82, 84, 86 are given the same reference numbers.

Figure 5:
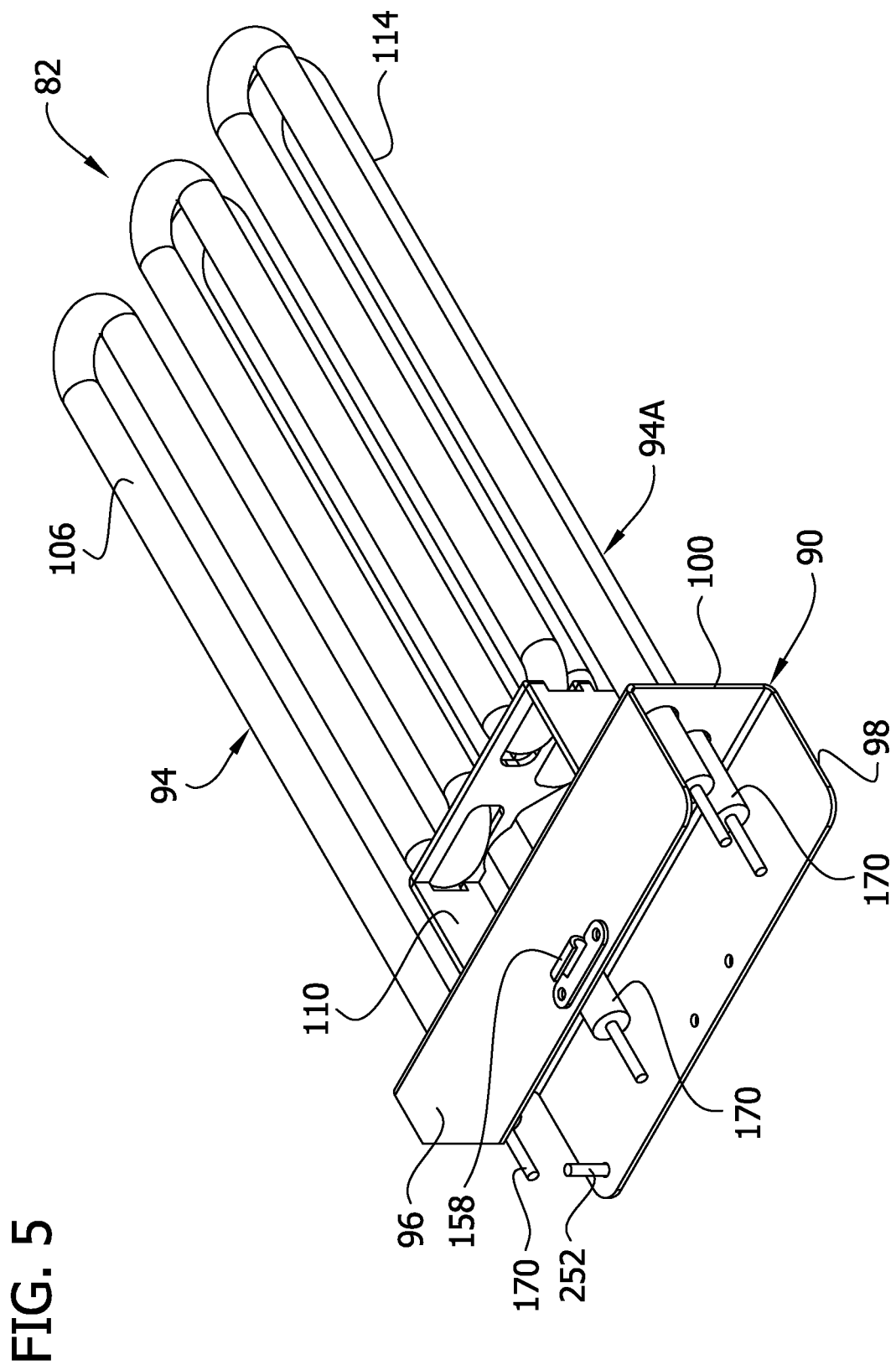
FIG. 5 is a perspective of a first removable heating module of the lower heat source of the broiler.
Figure 6:
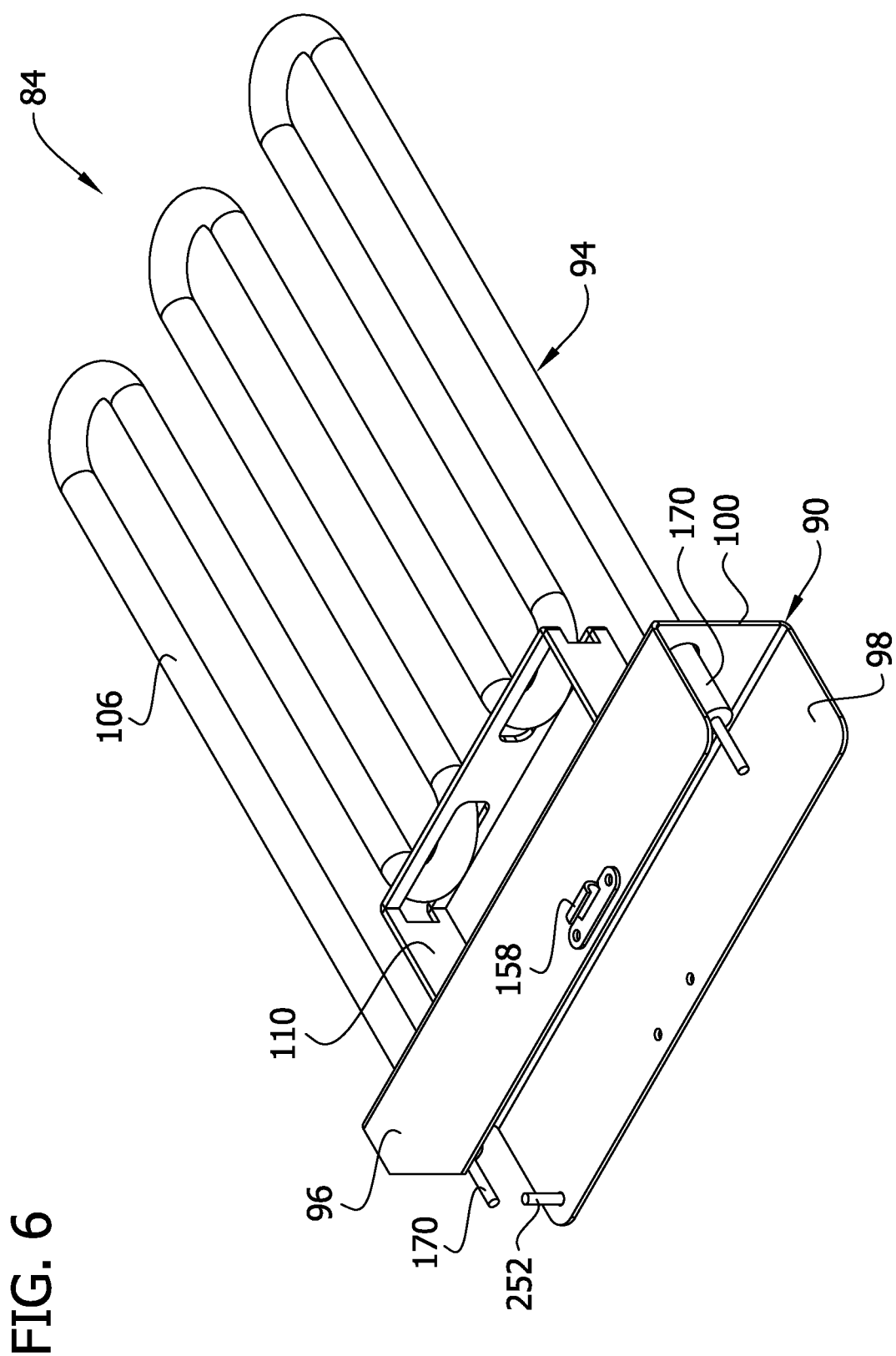
FIG. 6 is a perspective of a second removable heating module of the lower heat source of the broiler.
Figure 7:
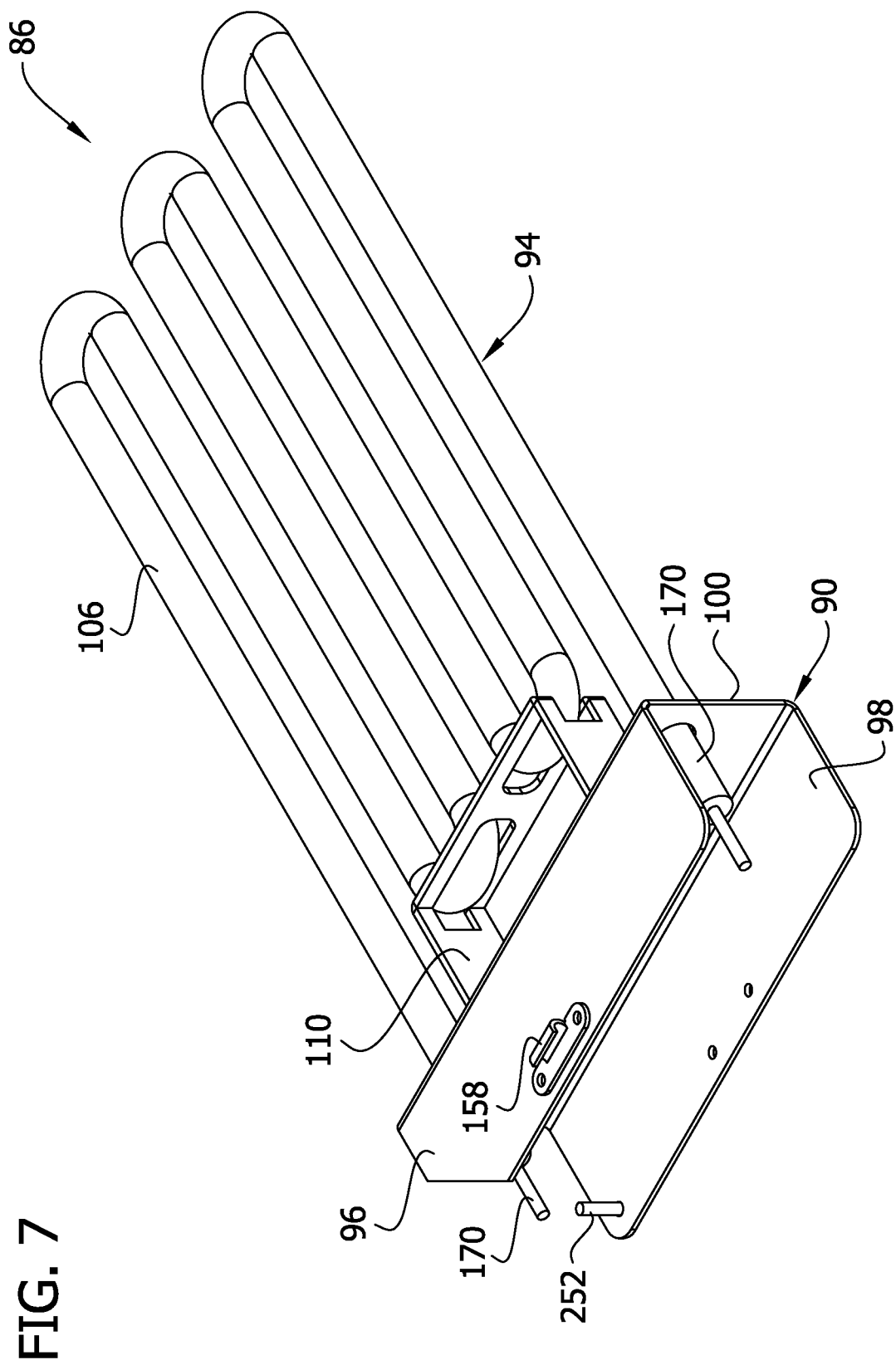
FIG. 7 is a perspective of a third removable heating module of the lower heat source of the broiler.

As shown in FIGS. 5-7, each module 82, 84, 86 comprises a frame 90 and at least one electrical heating element 94 mounted on the frame. (As explained below, the configuration of the heating element 94 may vary from module to module, but only one reference number 90 is used for convenience.) The frame 90 is elongate and generally channel-shaped, having horizontal top and bottom walls 96, 98 and a vertical connecting wall or web 100. The frame 90 may have other configurations without departing from the scope of this invention. Each heating element 94 is a tubular heating element comprising a sinuous coil 106 projecting out from the frame as a cantilever in a generally forward direction, and opposite ends extending in a rearward direction through the web 100 of the frame between the top and bottom walls 96, 98. (As used here, "forward" and "rearward" are relative to the front 38 and back 40 of the housing 32 of the broiler when the removable module is in its operative position in the broiler.) The rearward ends of the turns of the coil 106 are supported by a U-shaped bracket 110 secured to the web 100 of the frame at the front of the frame.

In the illustrated embodiment, the first heating module 82 adjacent the outlet 62 of the broiler, i.e., in the first cooking zone Z1, has two heating elements 94, 94A to provide more heat to this particular zone. The coils 106, 114 of the two heating elements 94, 94A are disposed one on top of the other. The second and third heating modules 84, 86 have one heating element 94 per module. The heating elements 94, 94A in the heating modules 82, 84 and 86 are configured differently to provide the appropriate different amounts of heat to the respective cooking zones Z1, Z2 and Z3. By way of example, the heating element configurations may vary by the number of heating elements in a module and/or by the physical properties of the heating element, such as the overall dimensions of the coil or other characteristics such as: turns in the coil, the spacing between the turns, the watt density, and the coil outer diameter, all of which affect the amount of heat generated by the heating element.

Figure 8:
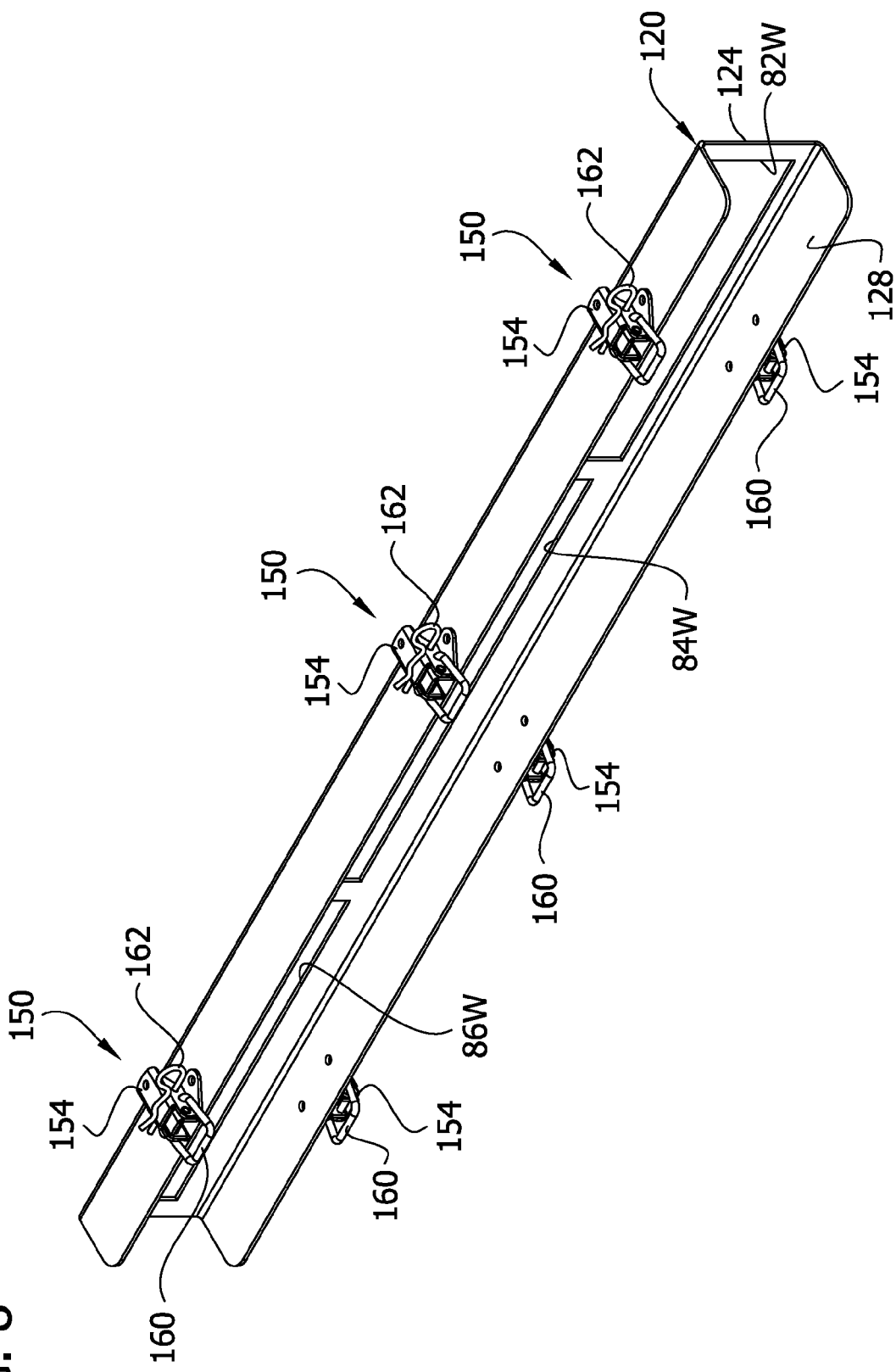
FIG. 8 is a perspective of a module holder of the broiler.
Figure 9:
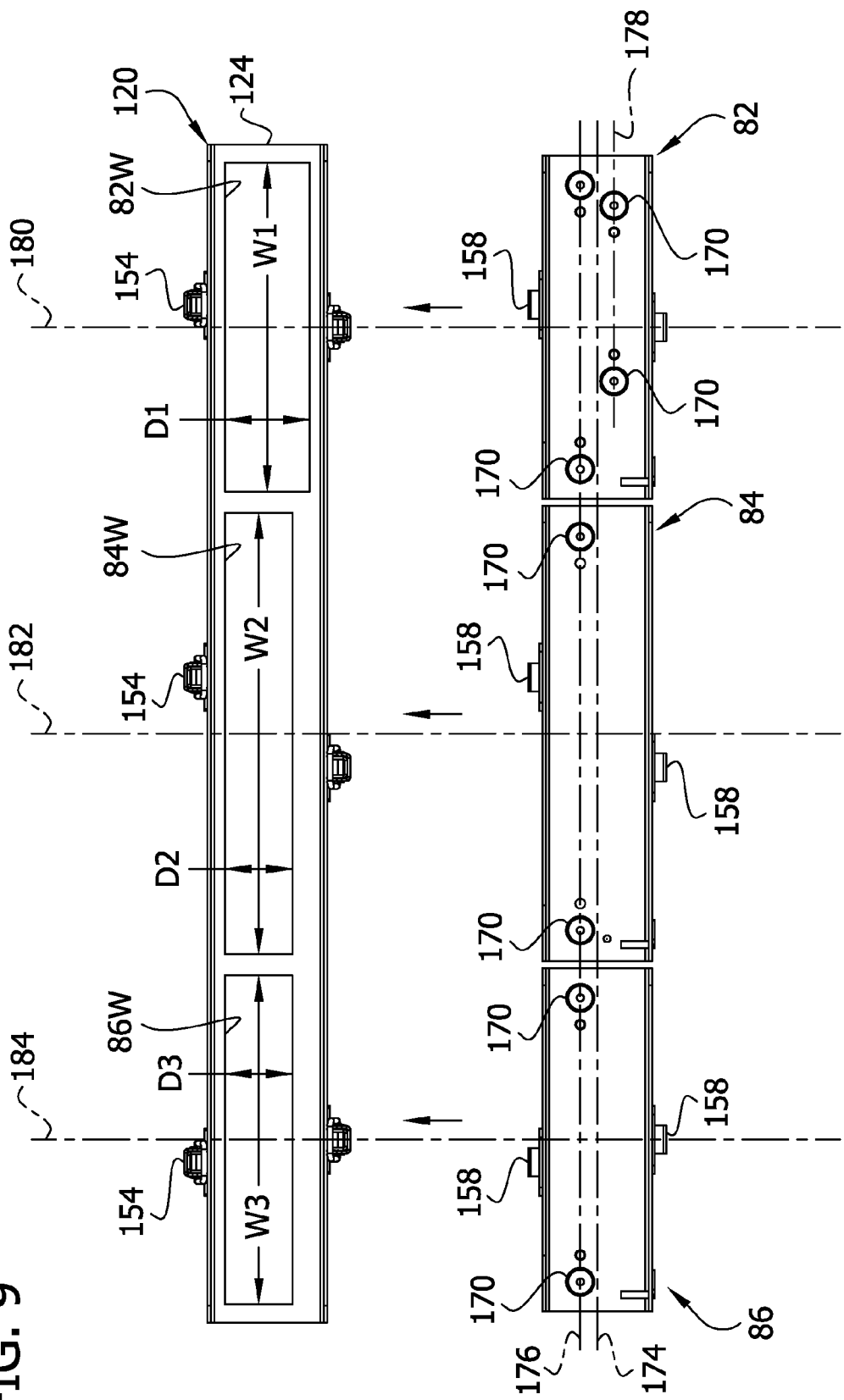
FIG. 9 are views showing a key system for preventing operation of a heating module at a location on the module holder not suited for that heating module.
Figure 10:
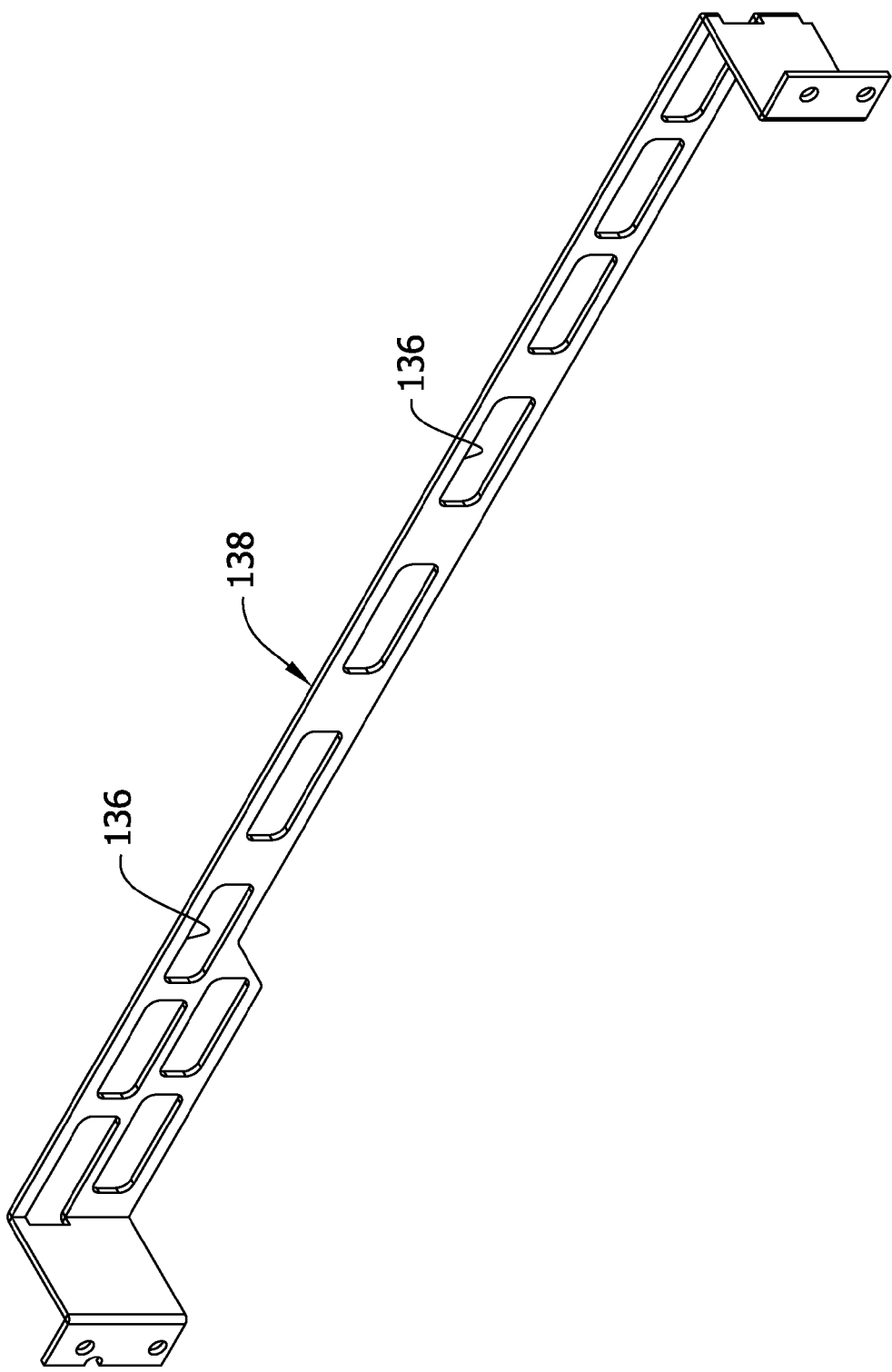
FIG. 10 is a perspective of a bracket for locating the front ends of heating elements of the heating modules.
Figure 11:
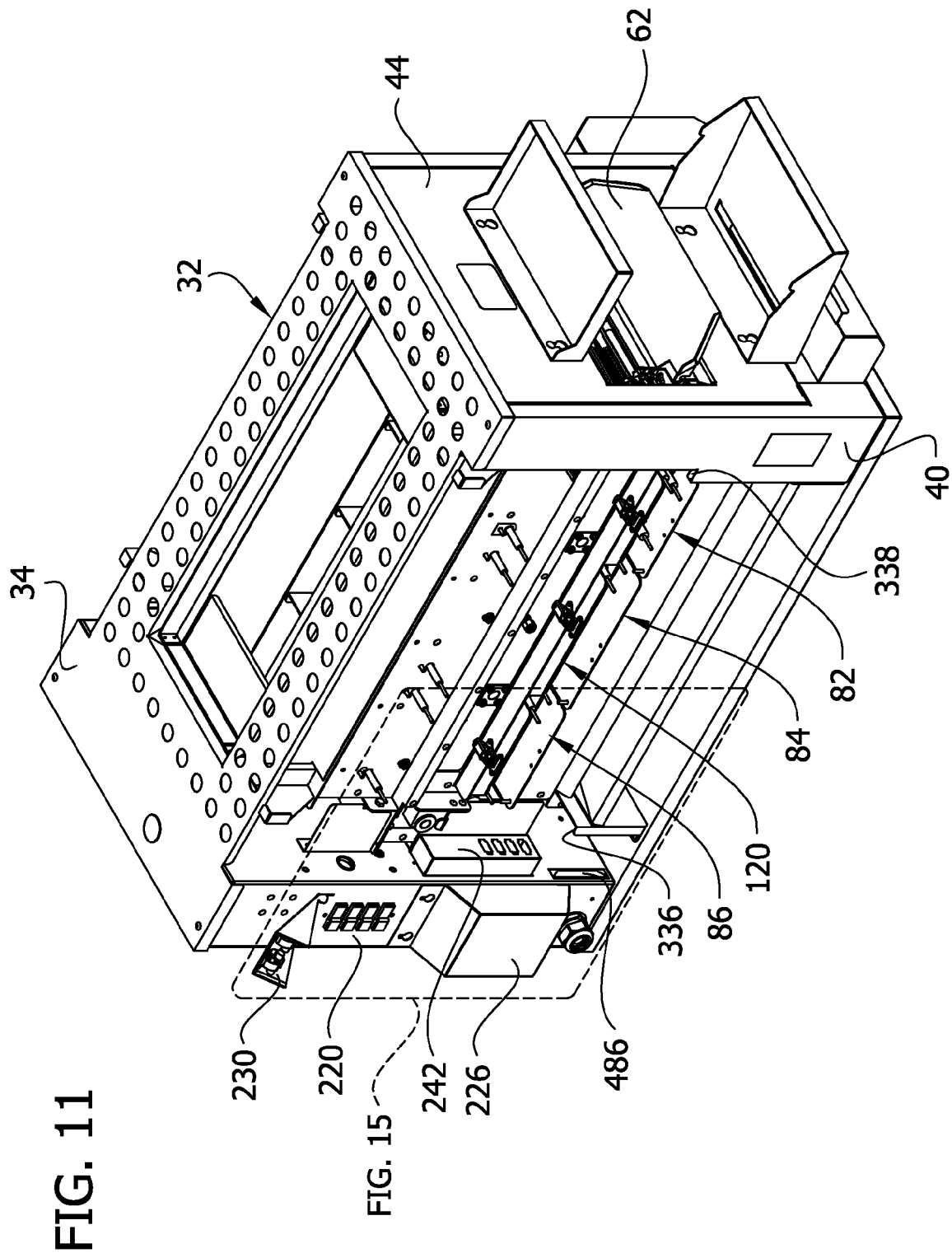
FIG. 11 is a rear perspective of the broiler with a back panel and terminal covers removed.

As shown in FIGS. 8 and 9, each module 82, 84, 86 of the lower heat source 68 is held by a module holder 120 comprising a channel (also designated 120, for convenience) in the housing 32 at the rear of the cooking chamber 52. The channel 120 defines an elongate horizontal recess for receiving the frame 90 of the heating module. The channel frame has a generally vertical web 124 and spaced apart upper and lower flanges 126, 128 extending rearward from the web. The web 124 of the channel has a series of openings or "windows" 82W, 84W, 86W for receiving the heating modules 82, 84, 86, respectively, at desired locations along the holder 120 corresponding to the different cooking zones Z1, Z2 and Z3. The top and bottom walls 96, 98 of each module frame 90 are configured for reception between respective upper and lower flanges 126, 128 of the module holder 120 such that the heating element or elements 94, 94A extend forward through a respective "window" and into the cooking chamber 52 below the upper reach of the conveyor 56. When the heating module 82, 84, 86 is properly installed, the turns at the forward end of the coil 106 of each heating element are received in openings 136 of a bracket 138 secured to the housing (FIG. 10). The openings 136 in the bracket 138 are positioned to insure that the heating element(s) 94, 94A is properly installed.

The module holder 120 shown in the drawings comprises a single channel extending across the back of the housing for holding all three heating modules 82, 84, 86. However, it will be understood that the module holder could be any number of separate channels or other devices for holding the heating modules. Further, the module holder can have other configurations without departing from this invention.

Figure 13:
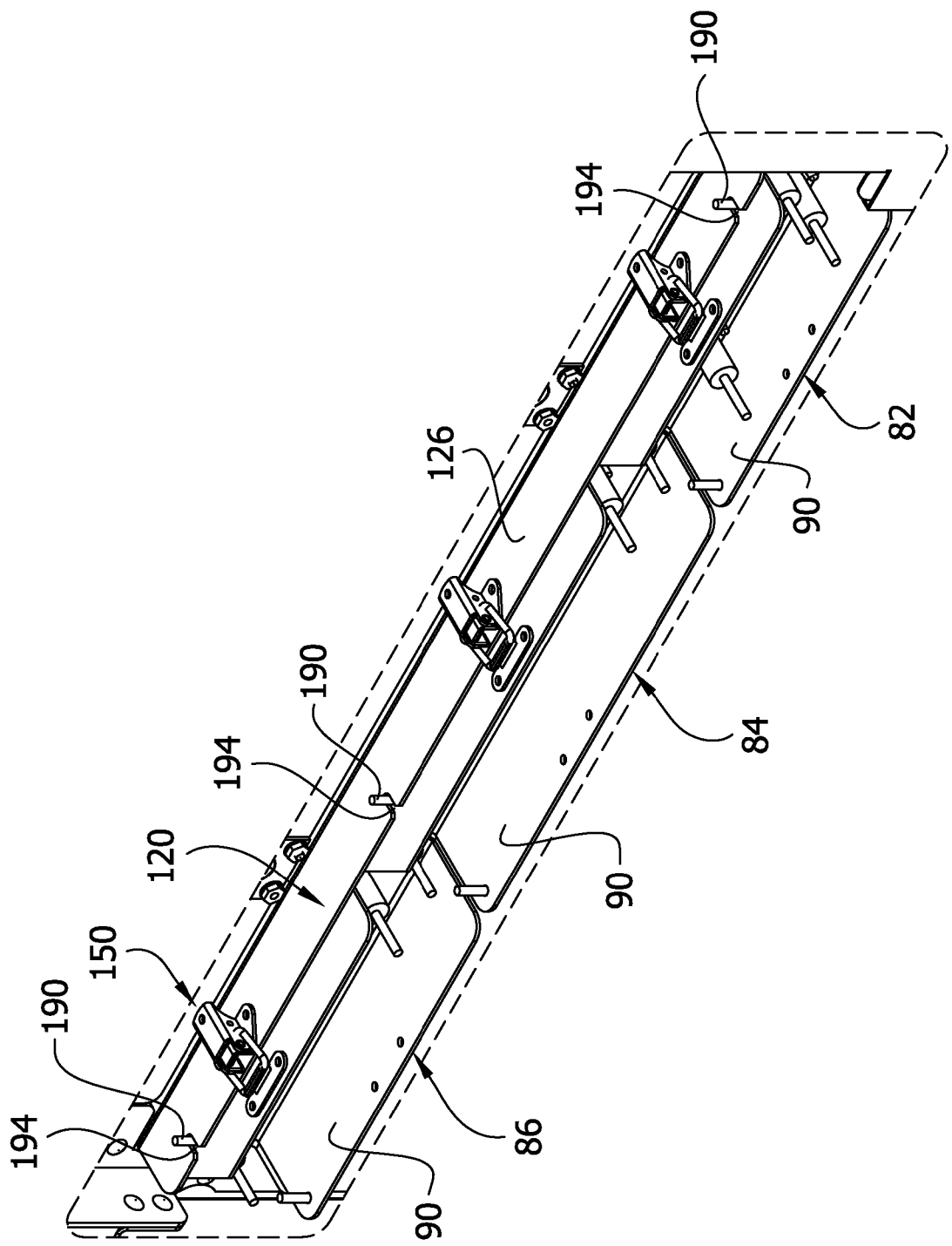
FIG. 13 is an enlarged portion of FIG. 11 showing the removable modules in place in the module holder.

A locking mechanism, generally designated 150 in FIGS. 8 and 13, is provided for locking each heating module 82, 84, 86 in its stated first position in which it is operative to deliver heat to the cooking chamber 52. In the illustrated embodiment, the locking mechanism 150 comprises three sets of mating locking components on the heating module 82, 84, 86 and on the module holder 120, one set for each module. Each set includes over-center latch hooks 154 on the upper and lower flanges 126, 128 of the module holder and catches 158 on the top and bottom walls 96, 98 of the module frame 90 for catching respective bales 160 of the latch hooks. Optionally, spring pins 162 (FIG. 8) may be used to secure the latch hooks 154 in their latching position against unintentional release. The number of locking components in each set may vary. By way of example, each set may include only one latch hook 154 on the upper flange 126 of the module holder and only one catch 158 on the top wall 96 of the module frame 90.

In another embodiment (not shown), the locking mechanism comprises mating cam components on the module frame 90 and on the module holder 120. By way of example, these components may include cams mounted for rotation on the upper and lower flanges 126, 128 of the module holder 120 and cam followers comprising upper and lower portions of the module frame 90. Other locking mechanisms may be used.

As previously noted, the three lower heating modules 82, 84, 86 have different heating element configurations (e.g., different numbers of heating elements and/or different coil sizes and/or different coil shapes) to supply different amounts of heat to the three different cooking zones Z1, Z2 and Z3. Accordingly, a key system is provided for preventing installation of a heating module 82, 84, 86 at a window location on the module holder 120 not suited for that heating module. In the illustrated embodiment (see FIG. 9), the windows 82W, 84W, 86W in the module holder 120 have different sizes and shapes, and each window is configured for receiving a heating module having a specific heating element configuration (e.g., number of heating elements and/or coil size and/or coil shape). In particular, the windows 82W, 84W, 86W corresponding to the first, second and third removable heating modules 82, 84, 86 have widths W1, W2 and W3, respectively, and depths D1, D2 and D3, respectively. The windows are dimensioned such that the first window 82W has a width W1 and depth D1 either or both of which closely correspond to the width and depth of the heating elements 94, 94A of the first heating module 82 suitable for the first cooking zone Z1; the second window 84W has a width W2 and depth D2 either or both of which closely correspond to the width and depth of the heating element 94 of the second module suitable for the second cooking zone Z2; and the third window 86W has a width W3 and depth D3 either or both of which closely correspond to the width and depth of the heating element 94 of the third heating module 86 suitable for the third cooking zone Z3. As a result, each heating module can be placed only at location on the module holder 120 for which it is suited or, stated conversely, placement of a removable module at a wrong location (i.e., in a cooking zone for which the module is unsuited) is prevented.

Referring again to FIG. 9, the terminal ends 170 of each heating element 94, 94A may be located vertically "off-center" to insure that the heating module 82, 84, 86 is properly installed in the module holder 120. That is, the terminal ends 170 are spaced above and/or below the horizontal centerline 174 of the module frame 90. In one embodiment, the terminal ends 170 of the heating elements 94 are located along the same generally horizontal axis 176 spaced above and parallel to the horizontal centerline 174 of the module frame 90, and the terminal ends 170 of the heating element 94A are located along the same generally horizontal axis 178 spaced below and parallel to the horizontal centerline 174 of the module frame 90. Other terminal end arrangements are possible, such as with integral insulated lead wires.

Desirably, the different sets of locking components 154, 158 on the heating modules 82, 84, 86 and module holder 120 have different configurations at different window locations on the module holder 120 such that a heating module can be mounted only at a suitable location, i.e., in a cooking zone suitable for that heating module. In the illustrated embodiment, the latching (or cam) components 154, 158 associated with the first cooking zone Z1 have a first configuration relative to the vertical centerline 180 of the first window 82W; the latching (or cam) components 154, 158 associated with the second cooking zone Z2 have a second configuration relative to the vertical centerline 182 of the second window 84W; and the latching (or cam) components 154, 158 associated with the third cooking zone Z3 have a third configuration relative to the vertical centerline 184 of the third window 86W. Similarly, the mating locking components 158 on the heating modules 82, 84, 86 are configured such that only the first module 82 will properly lock in place in the first cooking zone Z1; only the second module 84 will properly lock in place in the second cooking zone Z2; and only the third module will properly lock in place in the third cooking zone Z3. As a result, placement of a removable module 82, 84, 86 at a wrong location (i.e., in a cooking zone for which the module is unsuited) is prevented.

Figure 14:
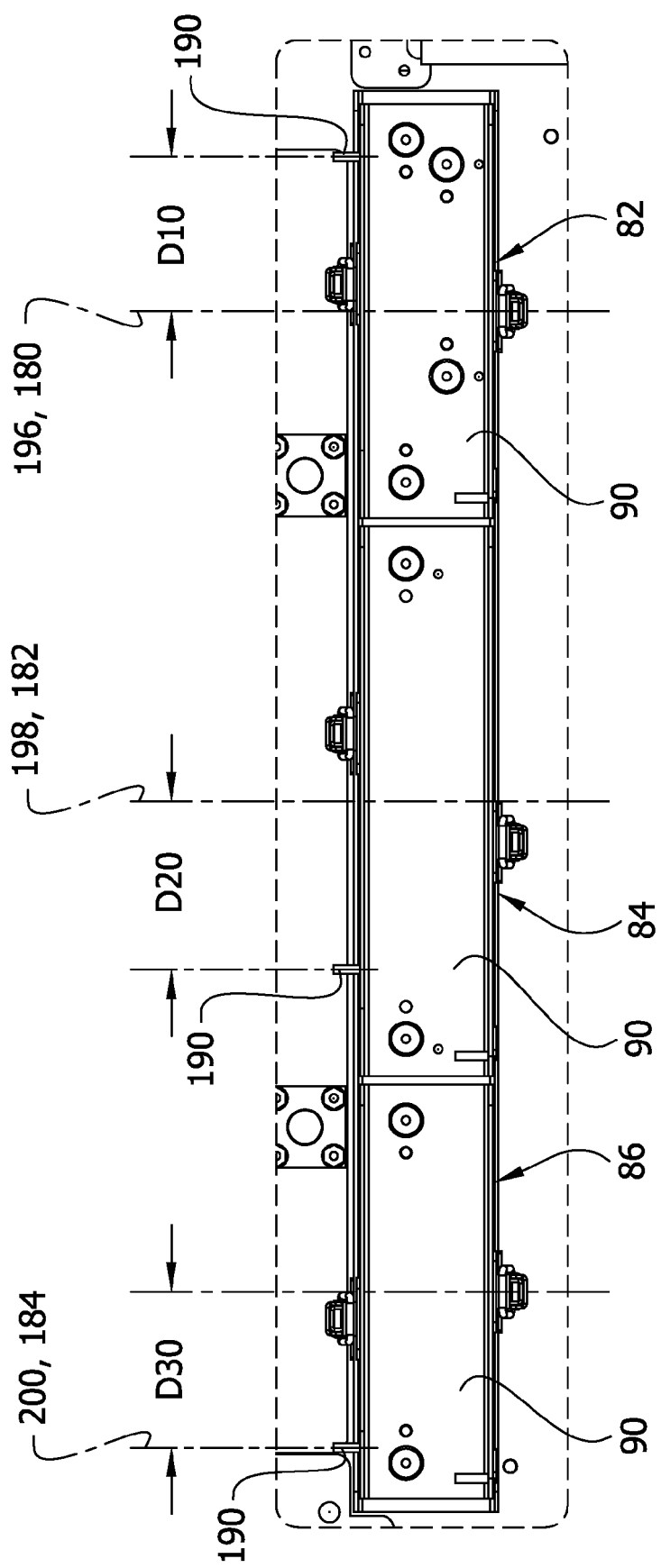
FIG. 14 is an enlarged portion of FIG. 12 showing the removable modules in place in the module holder.
Figure 15:
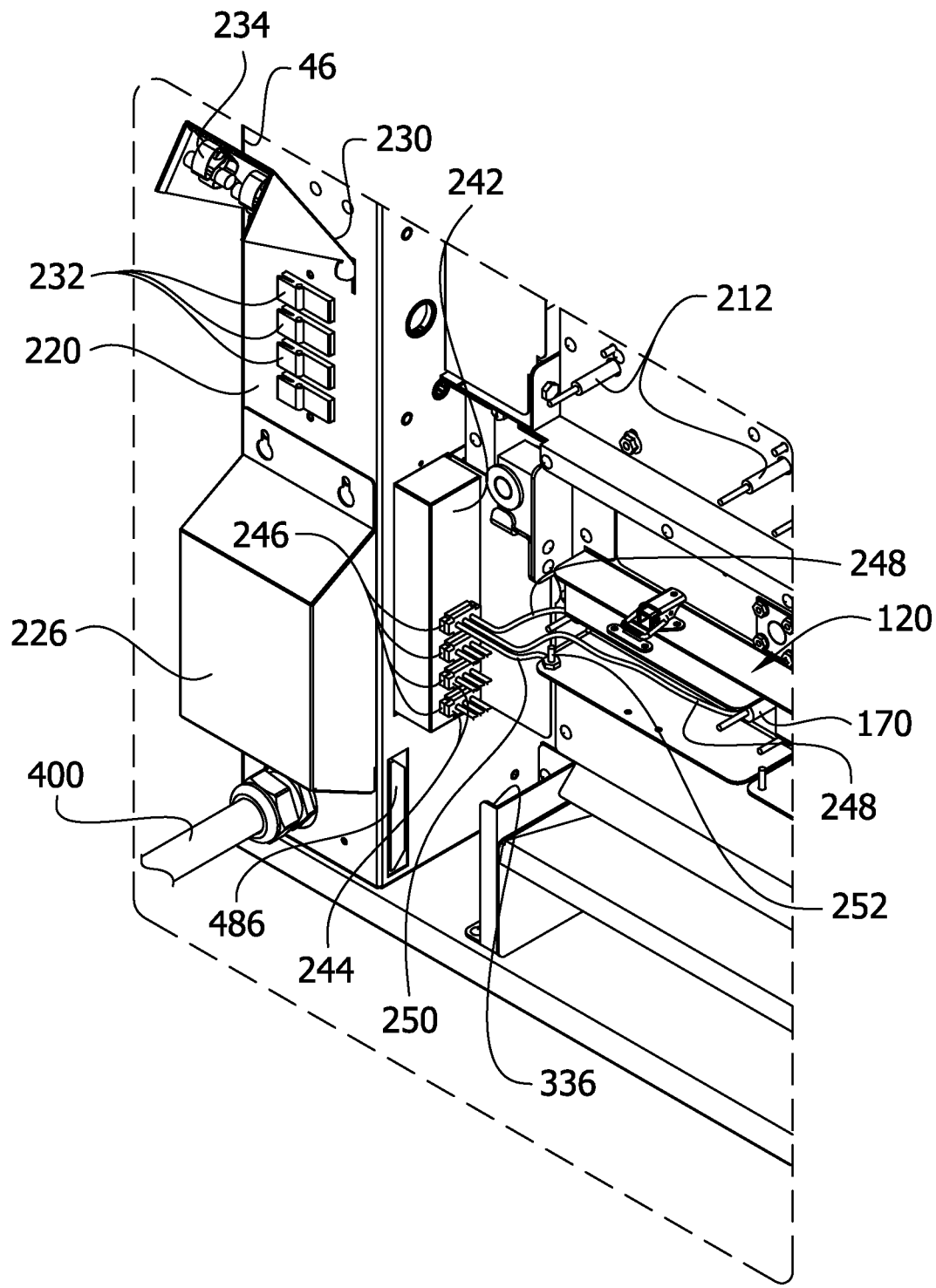
FIG. 15 is an enlarged portion of FIG. 11 showing electrical circuitry and quick connect/disconnect connectors.

Other key systems may be used. For example, as illustrated in FIGS. 13 and 14, a pin-and-slot system can be used comprising pins 190 on either the heating modules 82, 84, 86 or the module holder 120 and slots 194 for receiving the pins on the other of the heating modules or the module holder. The pins 190 and slots 194 have different arrangements at the different locations on the module holder 120 such that each heating module can be mounted only at a window location suitable for that module. In the embodiment of FIGS. 13 and 14, the frame 90 of the first heating module 82 has a vertical pin 190 located a first distance D10 to the right of the vertical centerline 196 of the frame; the frame 90 of the second heating module 84 has a vertical pin 190 located a second distance D20 to the right of the vertical centerline 198 of the frame; and the frame 90 of the third heating module 86 has a vertical pin 190 located a third distance D30 to the left of the vertical centerline 200 of the frame. The upper flange 126 of the module holder 120 has a first slot 194 located the first distance D10 from the vertical centerline 180 of the first window 82W for receiving the pin 190 on the first module 82, a second slot 194 located the second distance D20 from the vertical centerline 182 of the second window 84W for receiving the pin 190 on the second module 84; and a third slot 194 located the third distance D30 from the vertical centerline 184 of the third window 86W for receiving the pin 190 of the third module 86. As a result, placement of a removable module at a wrong location (i.e., in a cooking zone for which the module is unsuited) in prevented. Other key arrangements are possible.

Figure 4:
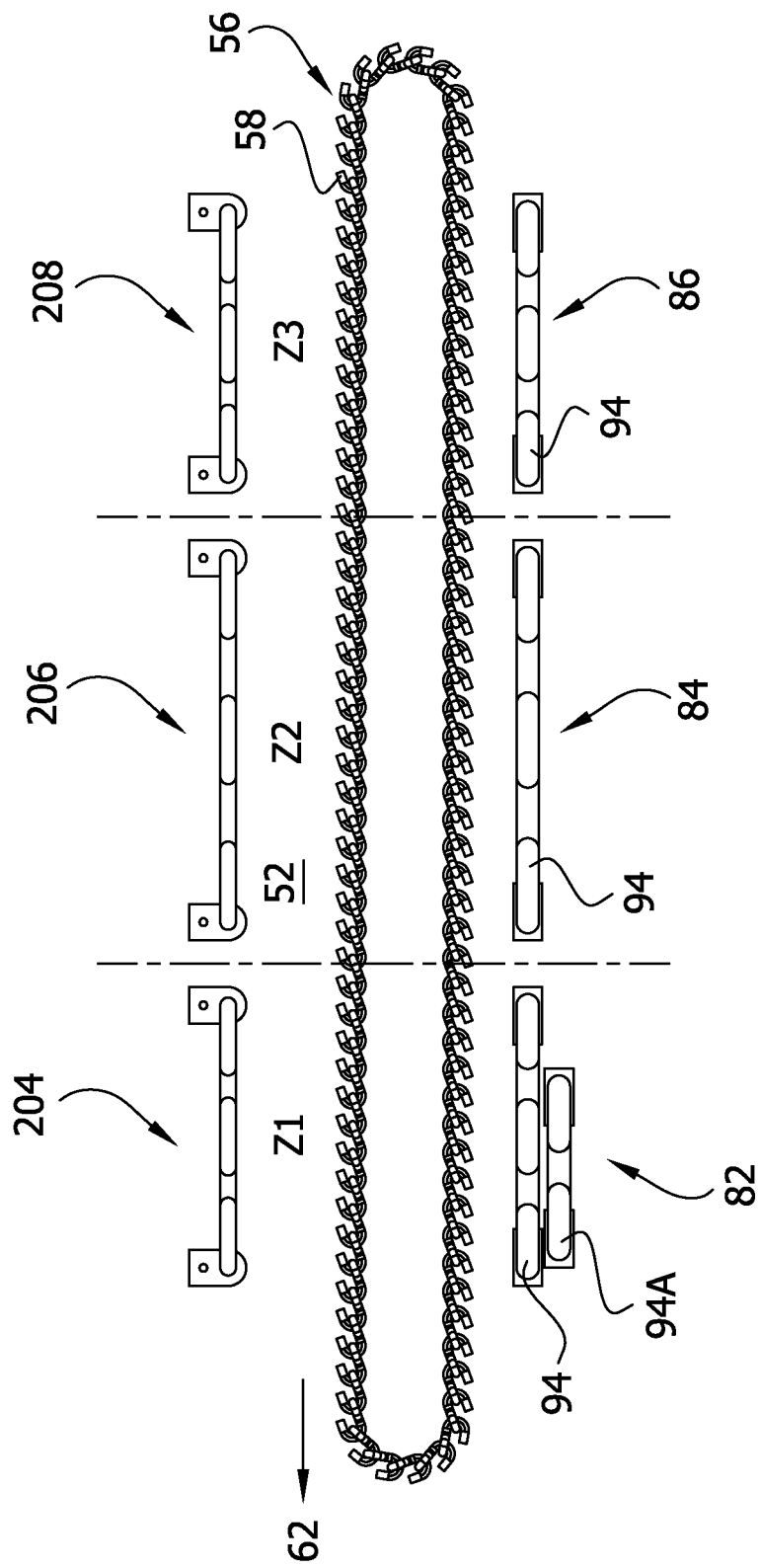
FIG. 4 is a schematic view showing different cooking zones in the cooking chamber.
Figure 12:
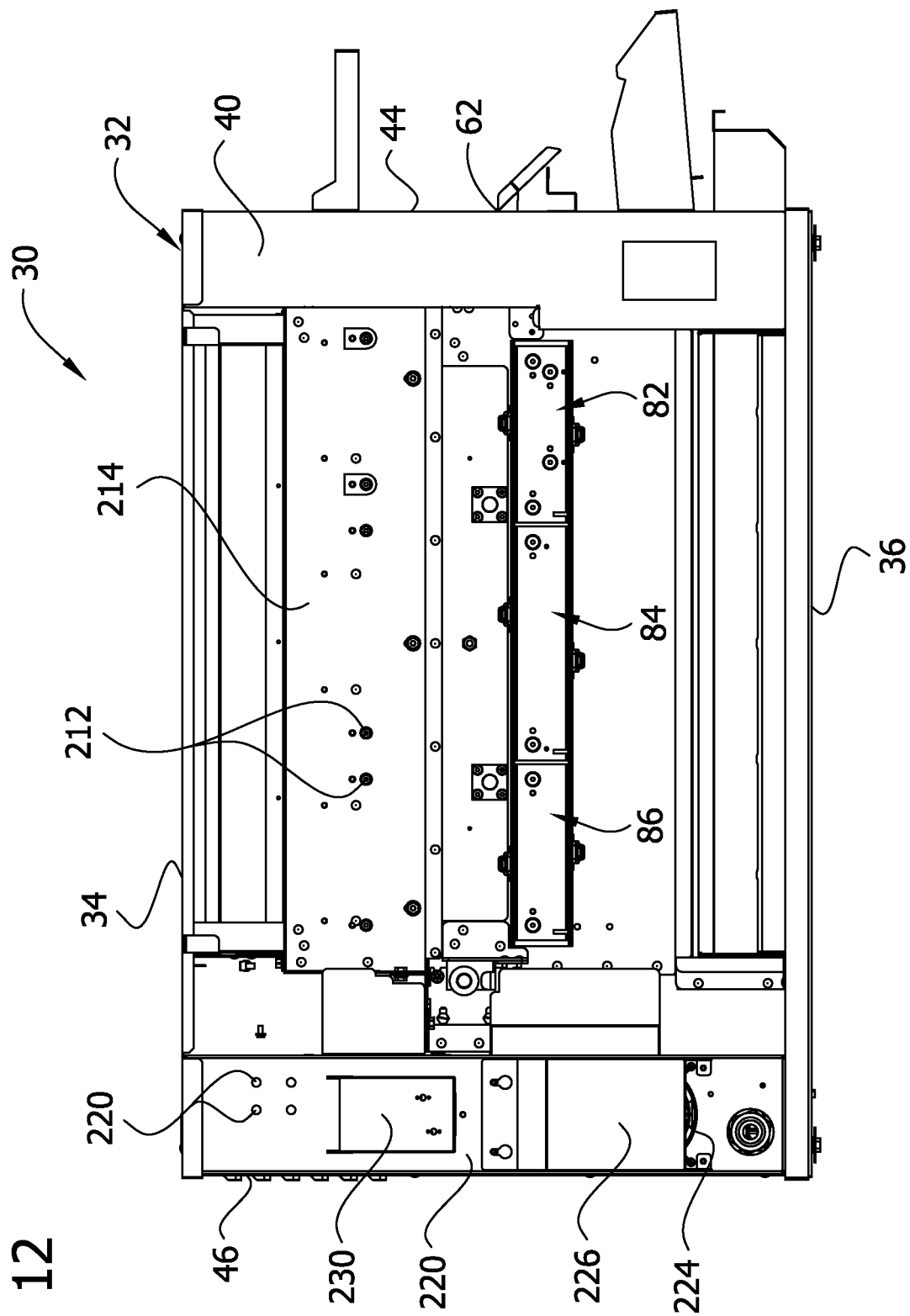
FIG. 12 is a rear elevation view of FIG. 11.

Referring to FIG. 4, the upper heat source 66 comprises fourth, fifth and sixth electric heating elements 204, 206 and 208, respectively, spaced above respective first, second and third removable heating modules 82, 84, 86 of the lower heat source 68. The number of upper heating elements may vary. The upper heating elements 204, 206, 208 may be part of removable heating modules like the heating elements 94, 94A of the lower heat source 68. Further, an upper module holder can be provided for holding the upper heating modules, like the lower module holder 120 described above. However, as a practical matter, the upper heating elements 204, 206, 208 are less likely to need replacement, because they are less exposed to dripping grease, food and other materials from the cooking process. Therefore, in the illustrated embodiment, the upper heating elements 204, 206, 208 are not fabricated as removable modules like the lower heat source 68. Instead, as shown in FIG. 12, the terminal ends 212 of the upper heating elements are secured to a fixed mounting plate 214 at the back 40 of the housing 32. The coils of the heating elements are supported in the cooking chamber 52 by suitable brackets 216 (FIG. 3).

Referring to FIGS. 11, 12, 15, and 16, the housing 32 of the broiler 220 includes an electrical enclosure 220 at the side 46 of the housing 32 opposite the outlet 62 for containing circuitry, terminations and electrical components of the broiler. The enclosure 220 has openings for ventilation, and a fan 224 is provided adjacent the bottom of the enclosure for circulating cooling air through the enclosure. The fan 224 is covered by a shield 226 to protect against water entry into the electrical enclosure. A hood 230 is pivoted on the enclosure 220 at the back 40 of the housing 32 for movement between a closed position (FIGS. 12 and 16) and an open position (FIGS. 11 and 15) providing access to fuse holders 232 and replacement fuses in the enclosure. The hood 230 shields the fuse holders 232 from contact with liquids such as water. Clips 234 on the underside of the hood hold one or more replacement fuses.

Referring to FIG. 12, the terminal ends 212 of the upper heating elements 204, 206, 208 have leads (not shown) connected to a terminal block 240 inside the electrical enclosure 220. (See FIG. 21 showing the electrical circuit.) Each removable heating module 82, 84, 86 of the lower heat source 68 is configured for quick connection and disconnection to and from an interface 242 on the electrical enclosure 220 of the housing 32. The quick connection and disconnection is enabled by means of mating quick connect/disconnect connectors, such as male plugs 244 (or other quick connect/disconnect devices) connected to the terminals of the heating elements 94, 94A on the removable modules 82, 84, 86 and female receptacles 246 (or other quick connect/disconnect devices) on the interface 242 for receiving the male plugs. In the illustrated embodiment, the male plugs 244 have terminal leads 248 connected to respective terminals 170 on the heating elements 82, 84, 86 and ground leads 250 connected to grounding terminals 252 on the module holder 120. The leads 248, 250 of the male plugs 244 are connected to their respective terminals by suitable means, e.g., stud-and-eyelet connections or crimped and bonded connections. Other types of quick connect/disconnect connectors may be used to readily connect and disconnect the heating modules 82, 84, 86 to and from the interface 242 on the housing 32.

Figure 16:
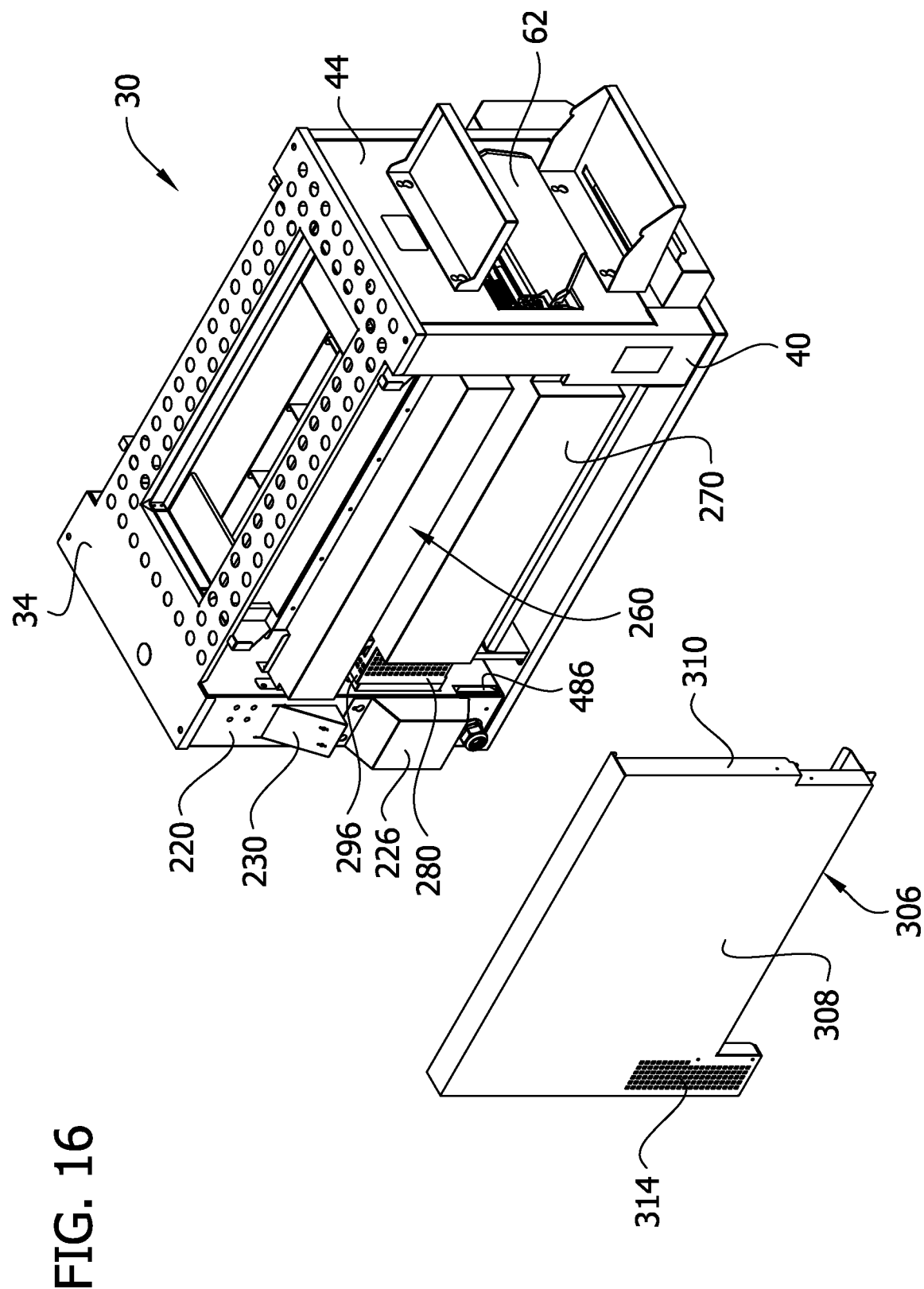
FIG. 16 is a rear perspective of the broiler showing the terminal covers in place and the back panel exploded away from the broiler.
Figure 17:
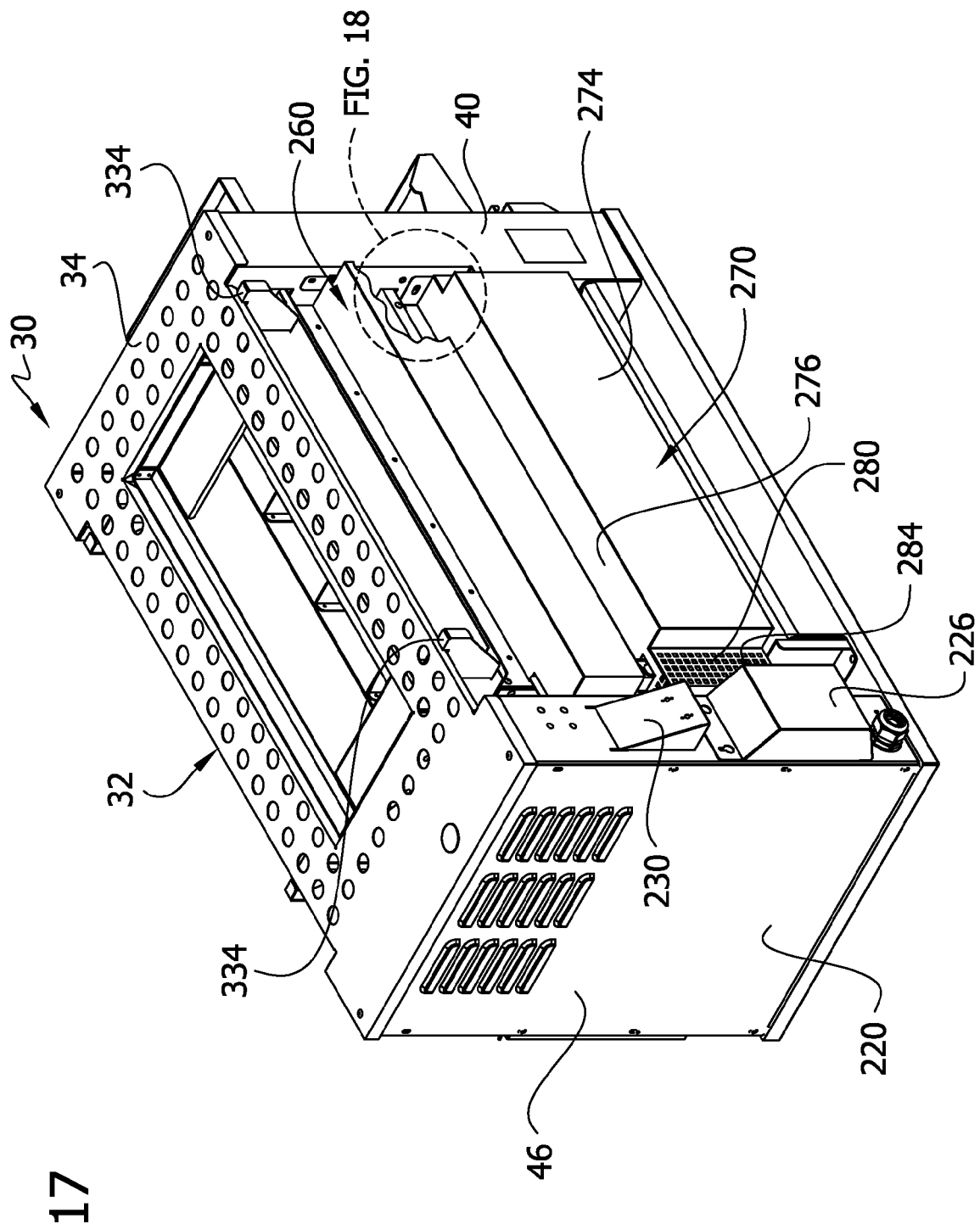
FIG. 17 is a rear perspective of the broiler showing the terminal covers in place, the back panel removed, and parts broken away to show details of how the lower terminal cover is releasably connected to the housing.

As shown best in FIGS. 16 and 17, an elongate upper terminal cover 260 extends generally horizontally across the back 40 of the housing 32 for covering the terminal ends 212 of the heating elements 204, 206, 208 and associated wiring of the upper heat source 66 which, in the illustrated embodiment, does not include removable modules. The upper terminal cover 260 is secured in place on the housing by suitable fasteners.

Figure 18:
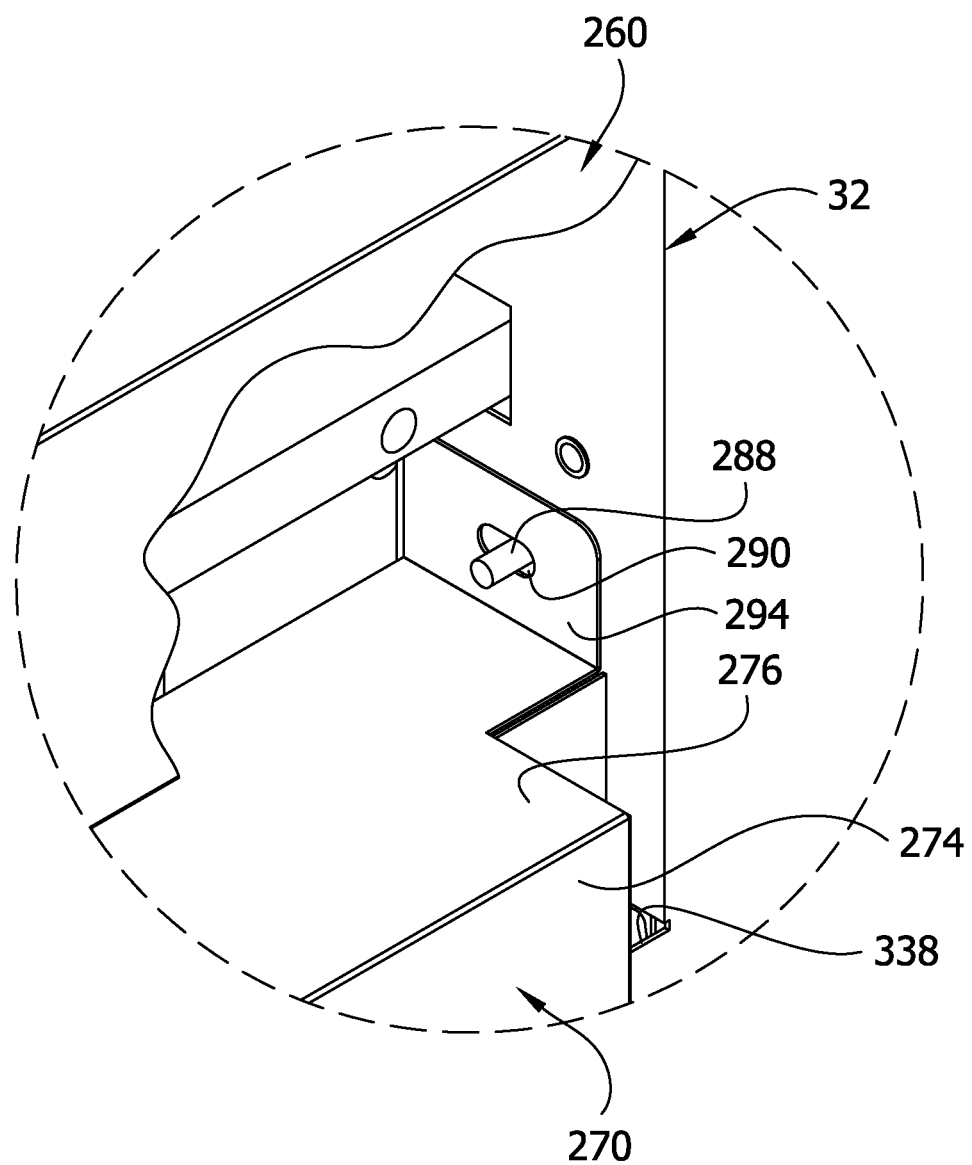
FIG. 18 is an enlarged portion of FIG. 17 showing additional details of the releasable connection between the lower terminal cover and the housing.

Referring to FIGS. 16-18, an elongate lower terminal cover 270 extends generally horizontally across the back 40 of the housing 32 for covering the terminal ends 170, mating connectors 244, 246 and associated wiring of the removable modules 82, 84, 86 of the lower heat source 68. In the illustrated embodiment, the lower terminal cover 270 has a vertical base wall 274 and a rim 276 extending forward from the base wall defining an interior space for receiving the module frame 90, module holder 120, and the associated wiring of the heating modules 82, 84, 86. An extension 280 at one side of the cover 270 encloses the space occupied by the mating electrical connectors 244, 246. The extension 280 has air ventilation openings 284 for the circulation of air through this space.

The housing 32 and lower terminal cover 270 have interlocking, quick-assembly components which allow the cover to be quickly installed on the housing and removed from the housing without the use of tools so that a failed removable heating module 82, 84, 86 of the lower heat source can be quickly replaced. As shown in FIGS. 16-18, these quick-assembly components include a pin 288 on the housing 32 receivable in an opening 290 in a first tab 294 extending up from the rim 276 of the cover at one side of the cover, and a second tab 296 on the side extension 280 of the cover overlying a portion of the housing at the opposite side of the cover. Other interlocking components may be used. Opposite sides of the lower terminal cover 270 may be tethered to the housing 32 by one or more tethers (e.g., braided wire, not shown) to insure that the cover is replaced after it has been removed to permit replacement of a heating module 82, 84, 86.

The housing 32 also includes a removable back panel 306 (FIGS. 16, 19 and 20) that covers substantially the entire back of the housing, including the upper and lower terminal covers 260, 270. In the illustrated embodiment, the back panel 306 has a vertical back wall 308 and a rim 310 extending forward from the back wall defining an interior space for enclosing various parts of the broiler at the back of the broiler. The back panel 306 has ventilation holes 314 in the area of the electrical connections between the heating modules 82, 84, 86 and the interface 242.

Figure 19:
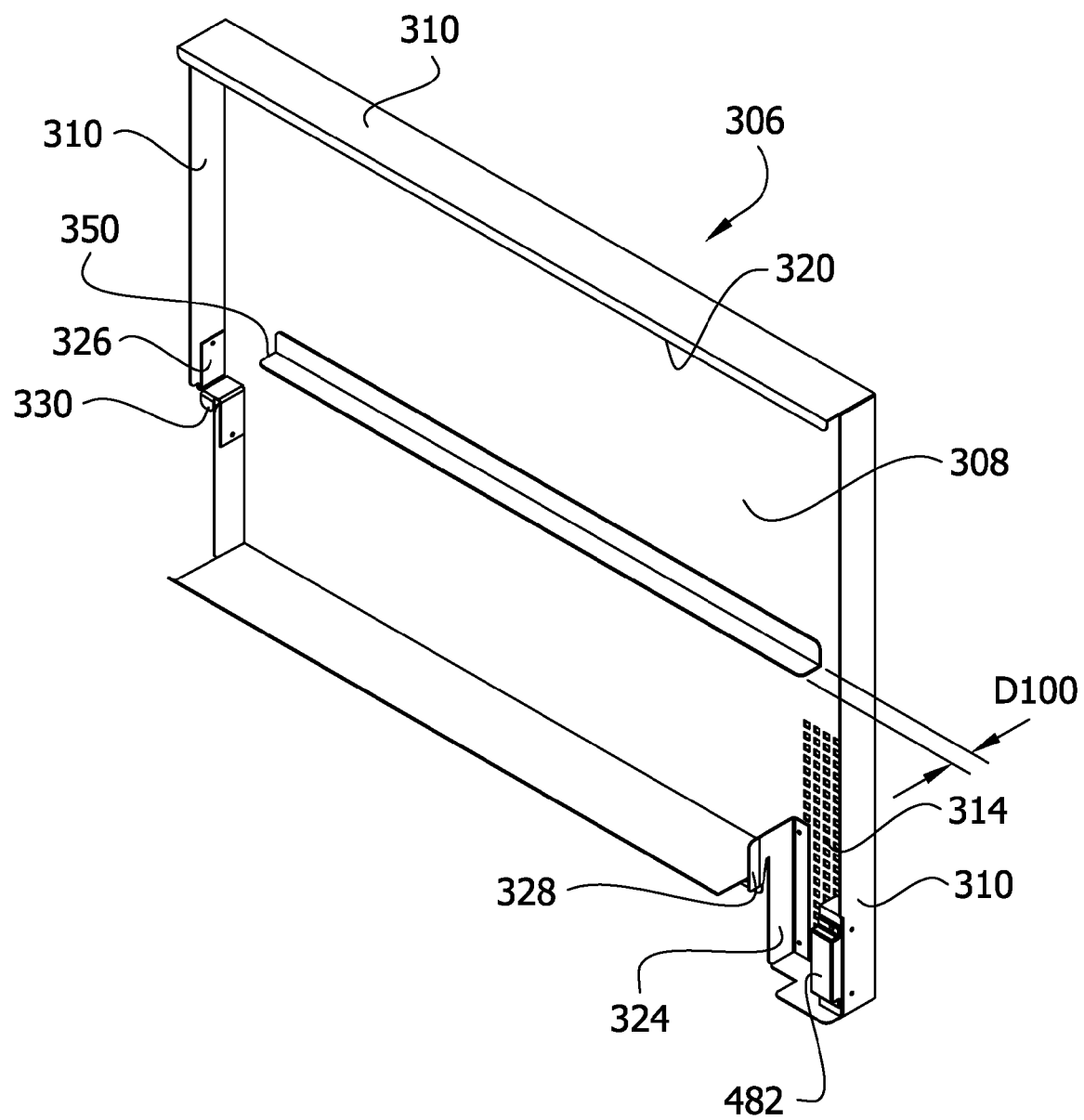
FIG. 19 is a front perspective of back panel.
Figure 20:
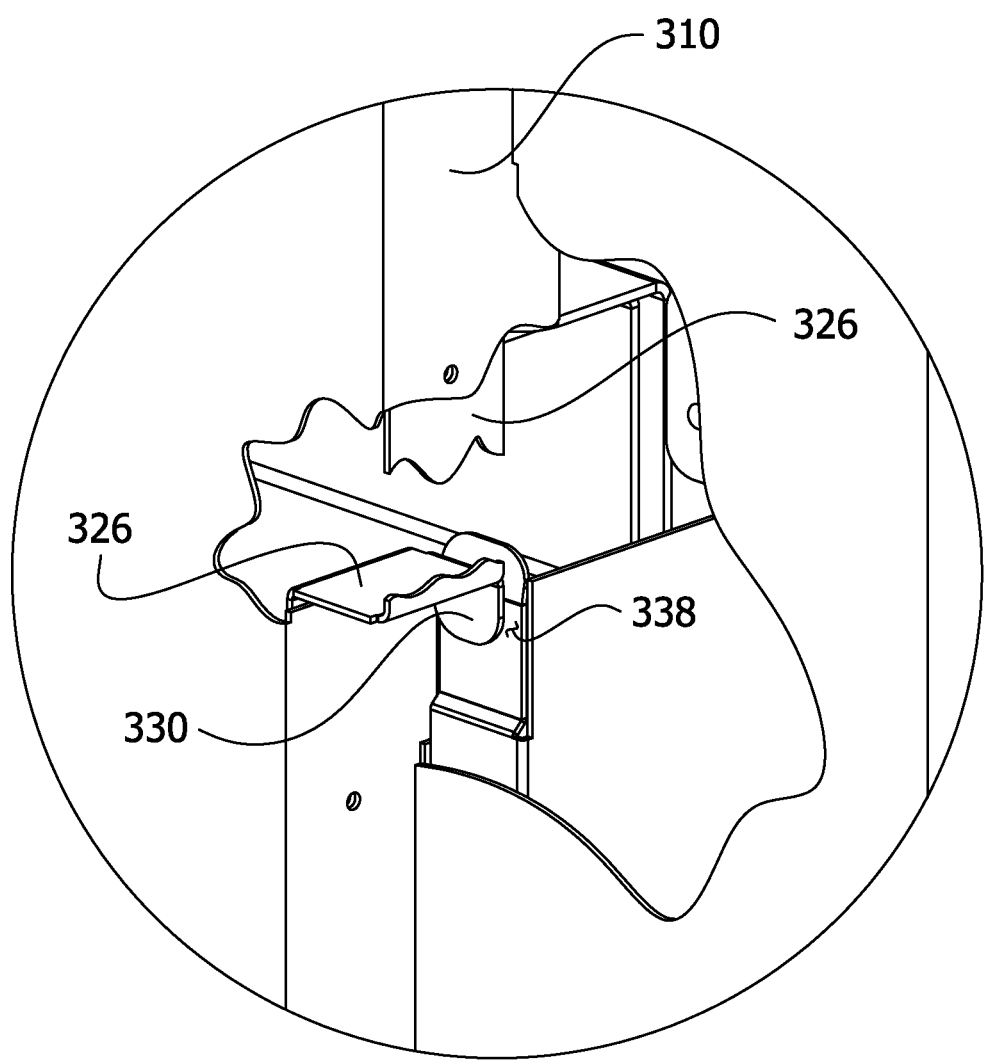
FIG. 20 is a view, with parts broken away, to show the releasable connection between the back panel and the housing.

Like the lower terminal cover 270, the back panel 306 and housing 32 have interlocking, quick-assembly components which allow the back panel to be quickly installed on the housing and removed from the housing without the use of tools (FIG. 19). These components include a lip 320 extending down from an upper wall of the rim 310 of the back panel, and first and second brackets 324, 326 on the inner surface of the back wall 308 of the panel adjacent opposite sides of the panel. The brackets 324, 326 have downwardly-projecting locking elements designated 328 and 330, respectively. The housing 32 include slots 334 adjacent the top 34 of the housing for receiving the lip 320 of the back panel 306 and recesses 336, 338 for receiving the downwardly-projecting locking elements 328, 330 of the brackets 324, 326 to secure the back panel to the housing (FIGS. 11, 15, and 17-20). Other interlocking components on the back panel 306 and housing 32 can be used within the scope of this invention.

As shown in FIG. 19, a spacer 350 on the back wall 308 of the panel 306 projects forward from the inner surface of the wall a distance D100 at an elevation corresponding to the vertical wall 274 of the lower terminal cover 270. The distance D100 is sufficient to prevent or at least inhibit proper mounting of the back panel 306 on the housing 32 unless the lower terminal cover 270 is pushed fully forward to a proper position covering the heating modules 82, 84, 86 of the lower heat source 68. In particular, the distance D100 is such that when the lower terminal cover 270 and back panel 306 are properly installed on the housing, the bottom edge of the spacer is in contact with or closely adjacent the top horizontal wall of the terminal cover (e.g., within 0.5 in. or more desirably within about 0.1 in.). The back panel 306 can include a similar spacer (not shown) at an elevation corresponding to the back wall of the upper terminal cover 260 in the event the upper heat source 66 comprises one or more removable modules. Other mechanisms may be used to inhibit mounting of the back panel 306 on the housing unless each terminal cover covering one or more removable modules is in its proper covering position.

A locking mechanism (not shown) may be provided for locking the back panel 306 in its installed position on the housing 32 for additional security.

Referring to FIGS. 21, 21A, 21B and 21C, a wire diagram showing one embodiment of the electrical aspects of the broiler of the invention is illustrated.

A line supply cord and plug 400 connected to a 3 phase 208/240 volt power source supplies power to the broiler 30. The supply line 400 is connected to the terminal block 402 which is then connected to the first contactor CT1. The first contactor CT1 is connected in series with a second contactor CT2 which connect one phase via an element terminal block 404 to one terminal of each of the heating elements 94, 94A, 204, 206, 208 of the upper and lower heat sources 66, 68. The other terminal of each heating element 94, 94A, 204, 206, 208 is connected to another phase via the element terminal block 404 to a bank of solid state relays SSR-1 to SSR-6, generally referred to by reference character 411, which selectively energize the heating elements. Fuses (e.g., 25 or 30 amp rating) are connected in series to each terminal of the heating elements.

The operation of the SSR relays 411 is controlled by a controller mounted on a PC board 406. In one embodiment, the controller may be a microprocessor based controller. The controller also monitors cooking chamber temperature via a cook cavity thermocouple 408, monitors a thermal limit switch 410, and energizes and de-energizes a load light 412 to indicate that the broiler is "not ready" and "ready" to cook, respectively. In addition, the controller board 406 controls a conveyor solid state relay 414 which selectively energizes a conveyor motor 416 for driving the conveyor. A plurality of current sensors 420, 422, 424, one for each cooking zone Z1, Z2, Z3, senses the current supplied to each zone. The sensors are connected to a current sense PCB 426 which provides the sensed current to the controller for monitoring operation of the heating elements 94, 94A, 204, 206, 208.

The controller runs a diagnostic routine at defined intervals during the idle and also at the end of each cook cycle. The diagnostic routine performs three separate tests on the heating elements. It performs a test with all upper heating elements "on" and with all lower heating elements "off", followed by a test with all upper heating elements "off" and with all lower heating elements "on", and finally a test with all heating elements "off." In the event that the sensed current indicates that a heating element is not operating properly, the controller will display an error message identifying the element that has failed. (The message will indicate top left element, bottom center element, etc.) In the event that a heating element is not working properly and a cook cycle is run, the controller will sound an alarm consisting of an audible alarm and flashing of the visual display 76, to indicate that the operator should test the product temperature to make sure that the product has been cooked completely. The heating element error message will continue to display during idle. If desired, the operator can decide to not cook in the zone Z1, Z2, Z3 directly above or below the failed element. The portion of the diagnostic routine that is run with all elements off can detect a shorted solid state relay or a shorted heating element. In the event that the controller detects this condition, and error message will be displayed to indicate that the unit requires service. Using fewer than all three zones to cook is sometimes referred to as "cripple cooking."

An alternate construction of two current sensors can be used with common functional processes described for controller diagnostics, identification of a unique failed or improperly functioning heating element, and operator alerts for 3-zone heating elements 94, 94A, 204, 206, 208.

An additional alternate construction is a single current sensor with coordinated variance in heating element wattage providing common systems fault mode detection and operator alarm.

A manually operated power switch 450 is connected to the line supply and, when closed by an operator, selectively supplies power to the SSR heat sink cooling fan 224, the conveyor motor 416 via the conveyor solid state relay 414, a relay K1, a relay K2, the first contactor CT1, the second contactor CT2 and a primary of a transformer XFMR. The transformer XFMR has a secondary connected to the controller for powering the controller, connected to the relays K1, K2, and connected to the solid state relays 411 (SSR-1 to SSR-6) for powering the relays.

As shown in FIGS. 14, 19 and 21, a back panel 306 interlock switch device 480 is provided. The switch device includes an actuator 482 (labeled MAGNET in FIG. 21) mounted on the back panel 306 and a safety sensor 488 on the housing 32. Alternatively, in other (e.g., wireless) configurations, the actuator 482 could be on the housing and the sensor 488 on the back panel. When the back panel 306 is properly in place on the broiler, the actuator 482 is aligned adjacent the safety sensor 488. The actuator 482 contains a plurality of aligned magnets having a unique configuration of polarities. The sensor 488 is configured to detect only an actuator having the same unique configuration of polarities. The sensor 488 has three magnetic switches MS1, MS2, MS3. When the actuator 482 is not aligned adjacent the sensor so that the sensor does not detect the magnetic fields of the actuator, or the sensor detects magnetic fields which do not have the unique configuration of polarities, or the actuator is not properly aligned with the sensor so that the sensor does not detect the unique configuration of polarities, N.O. (normally open) switches MS1 and MS2 remain open and N.C. (normally closed) switch MS3 remains closed. On the other hand, when the actuator 482 is properly aligned adjacent the sensor 488 so that the sensor detects the unique configuration of polarities of the magnetic fields of the actuator, the sensor closes the N.O. switches MS1 and MS2 and opens the N.C. switch MS3. (Switch MS1 is not used in this embodiment but can be used in other embodiments.) In one embodiment, the sensor may be model no. BNS 33S manufactured and sold by Schmersal, Inc. of Tarrytown, N.Y., and the actuator may be model BPS-33 manufactured and sold by Schmersal, Inc. Other types of interlock switch devices can be used in which one component of the device is on the back panel 306 and another complementary component is on the housing 32, and in which the components function to interrupt power to the broiler when the back panel is not properly in place on the housing.

Power is supplied to the relays via the safety sensor 488. When the back panel 306 is properly in place such that the actuator 482 is aligned adjacent the safety sensor 488, the magnetic field of the actuator causes the N.O. magnetic switch MS2 to close and interconnect the secondary of the transformer XMFR to the relays to power relay K1, and causes the N.C. magnetic switch MS3 to open and disconnect the secondary of the transformer XMFR to relay K2. When the back panel is not properly in place such that the actuator is not aligned adjacent the safety sensor, the absence of the magnetic field of the actuator results in the N.O. magnetic switch MS2 remaining open and the N.C. magnetic switch MS3 remaining closed to interconnect the secondary of the transformer XMFR to the relays to power the relays.

When the back panel 306 is properly in place such that the actuator 482 is aligned adjacent the safety sensor 488, N.C. magnetic switch MS3 is open to disconnect relay K1 from the secondary of the transformer XMFR, thereby de-energizing relay K2 and resulting in its contact being closed to interconnect the first contactor CT1 with the line supply. This energizes the first contactor CT1 and closes its contacts to connect the line supply 400 to the second contactor CT2. If the contacts of contactor CT2 are closed (see below), the broiler is operational.

When the back panel 306 is not properly in place such that the actuator 482 is not aligned adjacent the safety sensor 488, N.C. magnetic switch MS3 remains closed to interconnect relay K2 to the secondary of the transformer XMFR, energizing relay K2 causing its contact to open and disconnect the first contactor CT1 from the line supply. This results in de-energizing the first contactor CT1, opening its contacts to prevent connection between the line supply and the second contactor CT2. As a result, the upper and lower heat sources 66, 68 cannot be energized and the broiler is not operational.

Thus, the interlock switch 480 provides a first level of power control in that the back panel 306 must be in place such that the actuator 482 is aligned adjacent the sensor 488 in order to energize the first contactor CT1 to close the contacts of the first contactor CT1, which is in series between the line supply 400 and the heating elements of the upper and lower heat sources 66, 68.

When the back panel 306 is properly in place such that the actuator 482 is aligned adjacent the safety sensor 488, the N.O. magnetic switch MS2 is closed to interconnect relay K1 to the secondary of the transformer XMFR, thereby energizing relay K1 and closing its contact to interconnect the second contactor CT2 with the first contactor CT1. This causes the contacts of the second contact CT2 to close to connect the first contactor CT1 to the second contactor CT2. If the contacts of contactor CT1 are closed (see above), the broiler is operational.

When the back panel 306 is not properly in place such that the actuator 482 is not aligned adjacent the safety sensor 488, N.O. magnetic switch MS2 remains open to disconnect relay K1 from the secondary of the transformer XMFR, de-energizing relay K1 causing its contacts to open and disconnect the first contactor CT2 from the line supply. This results in de-energizing the second contact CT2 and opening its contacts to prevent connection between the first contactor CT1 and the second contactor CT2. As a result, the heating elements of the upper and lower heat sources 66, 68 cannot be energized and the broiler is not operational.

Thus, the interlock switch 480 provides a second (redundant) level of power control in that the back panel 306 must be in place to energize the second contactor CT2 to close the contacts of the second contactor CT2, which is in series between the line supply 400 and the heating elements of the upper and lower heat sources 66, 68.

This embodiment also provides additional fail-safe (redundant) power controls when the back panel 306 is not in place such that the actuator 482 is not aligned adjacent the safety sensor 488. For example, if relay K1 fails such that its contact are welded closed causing the contacts of contactor CT2 to close, and if the rear panel is not in place such that the actuator is not aligned adjacent the safety sensor, relay K2 would still have an open contact to open the contacts of contactor CT1 and prevent energizing of the heating elements of the upper and lower heat sources 66, 68. Thus, failure of relay K1 does not inhibit proper operation of the interlock switch device 480 to prevent broiler operation when the back panel 306 is not in place.

As another example, if relay K2 fails such that its contact are welded (e.g., fused) closed causing the contacts of contactor CT1 to close, and if the back panel 306 is not in place such that the actuator 482 is not aligned adjacent the safety sensor 488, relay K1 would still have an open contact to open the contacts of contactor CT2 and prevent energizing of the heating elements of the upper and lower heat sources 66, 68. Thus, failure of relay K2 does not inhibit proper operation of the interlock switch to prevent broiler operation when the back panel is not in place.

As another example, if the first contactor CT1 fails such that its contacts are welded closed, and if the back panel is not in place such that the actuator 482 is not aligned adjacent the safety sensor 488, relay K1 and second contactor CT2 still would operate as noted above to prevent energizing of the heating elements of the upper and lower heat sources 66, 68. Thus, failure of first contactor CT1 does not inhibit proper operation of the interlock switch device 480 to prevent broiler operation when the back panel 306 is not in place.

As another example, if the second contactor CT2 fails such that its contacts are welded closed, and if the back panel is not in place such that the actuator 482 is not aligned adjacent the safety sensor 488, relay K2 and second contactor CT1 still would operate as noted above to prevent energizing of the heating elements of the upper and lower heat sources 66, 68. Thus, failure of second contactor CT2 does not inhibit proper operation of the interlock switch device 480 to prevent broiler operation when the back panel 306 is not in place.

As another example, if the N.O. second magnetic switch MS2 fails such that it is welded closed, and if the back panel 306 is not in place such that the actuator 482 is not aligned adjacent the safety sensor 488, the N.C. magnetic switch MS3 would close energizing relay K2 to open its contact to de-energize contactor CT1 as noted above and prevent energizing of the heating elements of the upper and lower heat sources 66, 68. Thus, failure of N.O. second magnetic switch MS2 does not inhibit proper operation of the interlock switch device 480 to prevent broiler operation when the back panel 306 is not in place.

As another example, if the N.C. third magnetic switch MS3 fails such that it is welded closed, this would energize relay K2 to open its contact to de-energize contactor CT1 as noted above and prevent energizing of the heating elements of the upper and lower heat sources 66, 68. Thus, failure of N.C. third magnetic switch MS3 does not inhibit proper operation of the interlock switch device 480 to prevent broiler operation when the back panel 306 is not in place.

Thus, the first contactor CT1 and the second contactor CT2 comprise redundant electrical components in combination with the interlock switch device 480 to permit safe operation of the broiler 30. Also, relay K1 and relay K2 comprise redundant electrical components in combination with the interlock switch device 480 to permit safe operation of the broiler. Also, the fuses in line with the solid state relays protect the relays so that the relays operate properly in response to the controller, which also permits safe operation of the broiler.

Figure 21A:
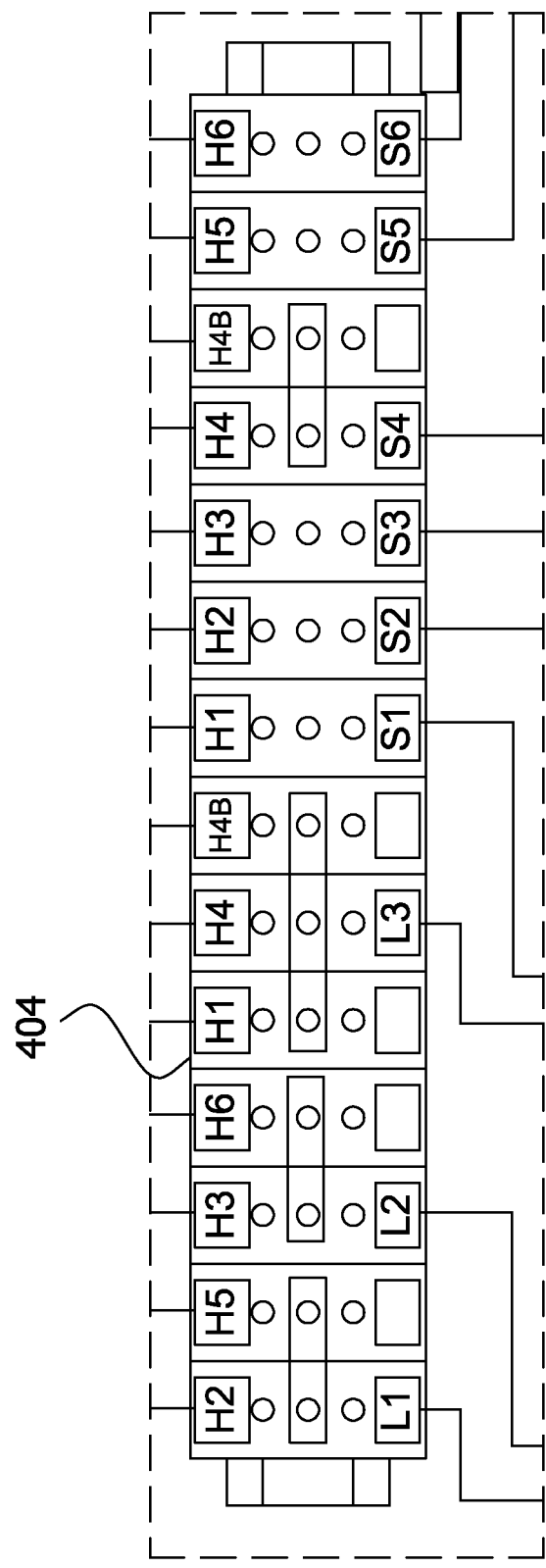
FIG. 21A is an expanded view of a portion of FIG. 21 showing the terminal block 404.
Figure 21B:
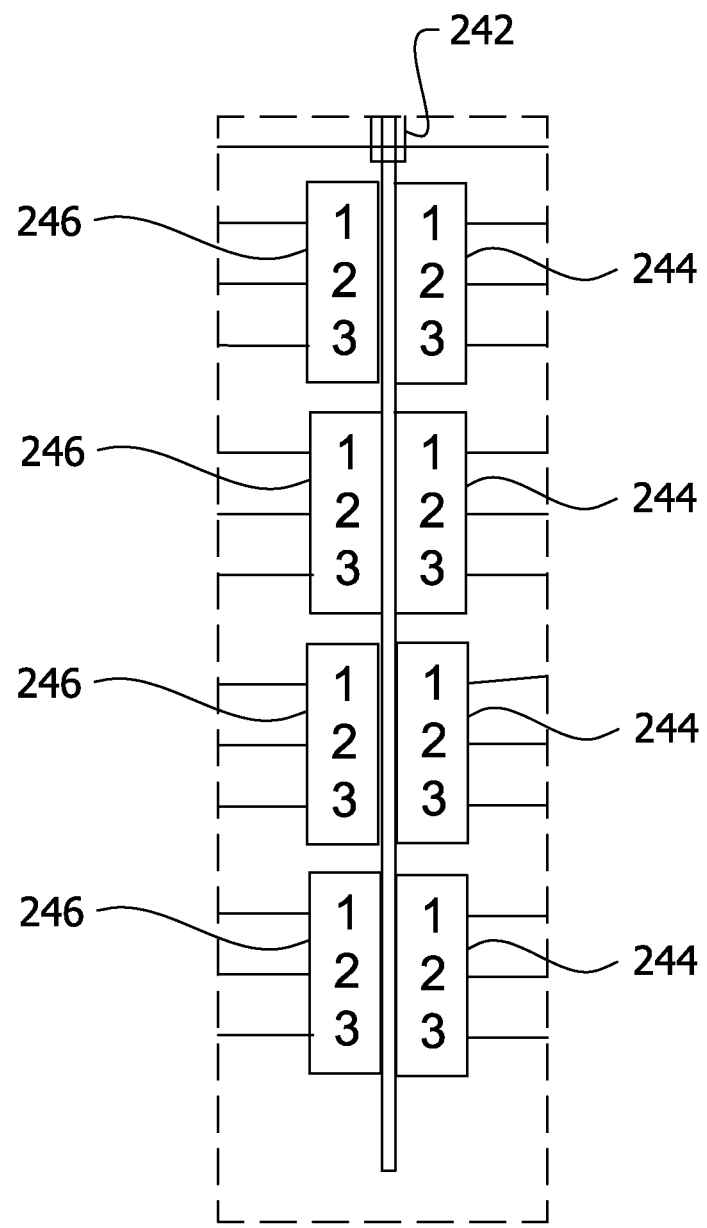
FIG. 21B is an expanded view of a portion of FIGS. 21 and 22 showing the interface 242.
Figure 21C:
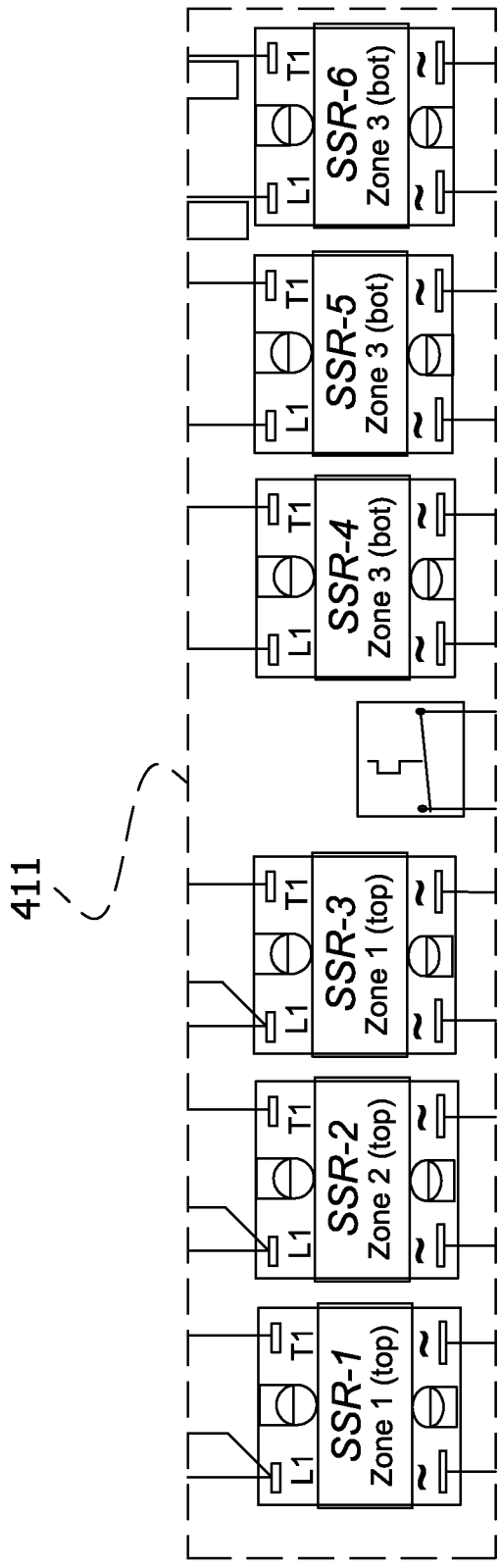
FIG. 21C is an expanded view of a portion of FIGS. 21 and 22 showing the solid state relays 411 (SSR-1 to SSR-6).

The wiring diagram shown in FIGS. 21-21C is suited for broilers to be used in markets (e.g., the United States) having certain electrical requirements. FIG. 21A is an expanded view of a portion of FIG. 21 showing the terminal block 404. FIG. 21B is an expanded view of a portion of FIG. 21 showing the interface 242. FIG. 21C is an expanded view of a portion of FIG. 21 showing the solid state relays 411 (SSR-1 to SSR-6).

Figure 22:
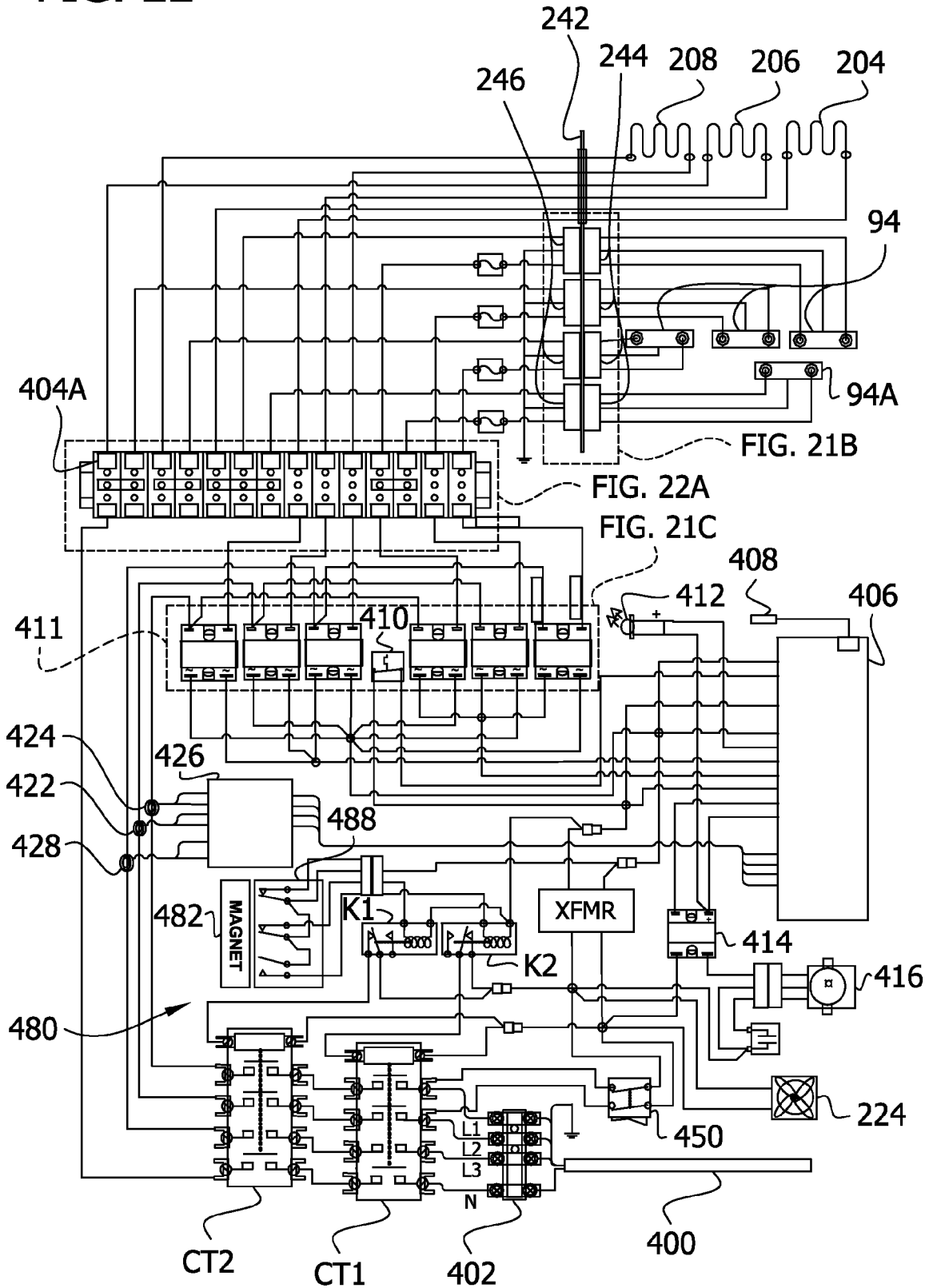
FIG. 22 is an alternative wiring diagram of the broiler of the first embodiment.
Figure 22A:
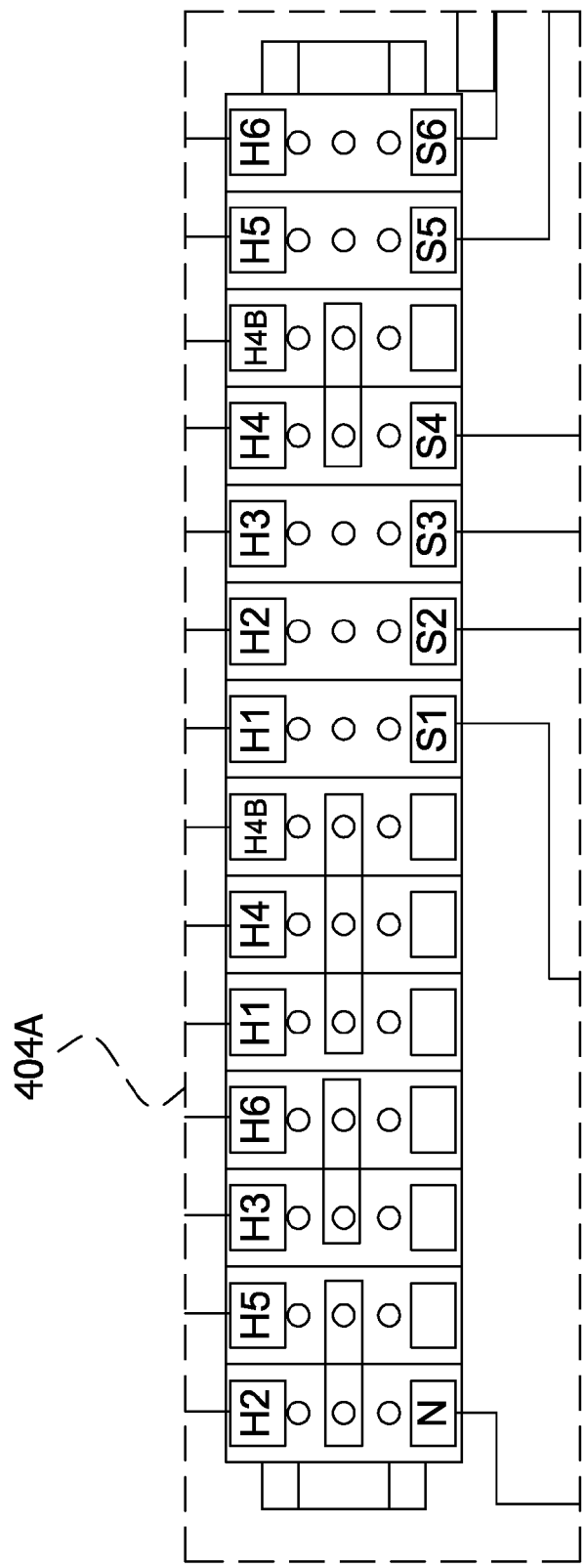
FIG. 22A is an expanded view of a portion of FIG. 22 showing the terminal block 404A.
Figure 23:
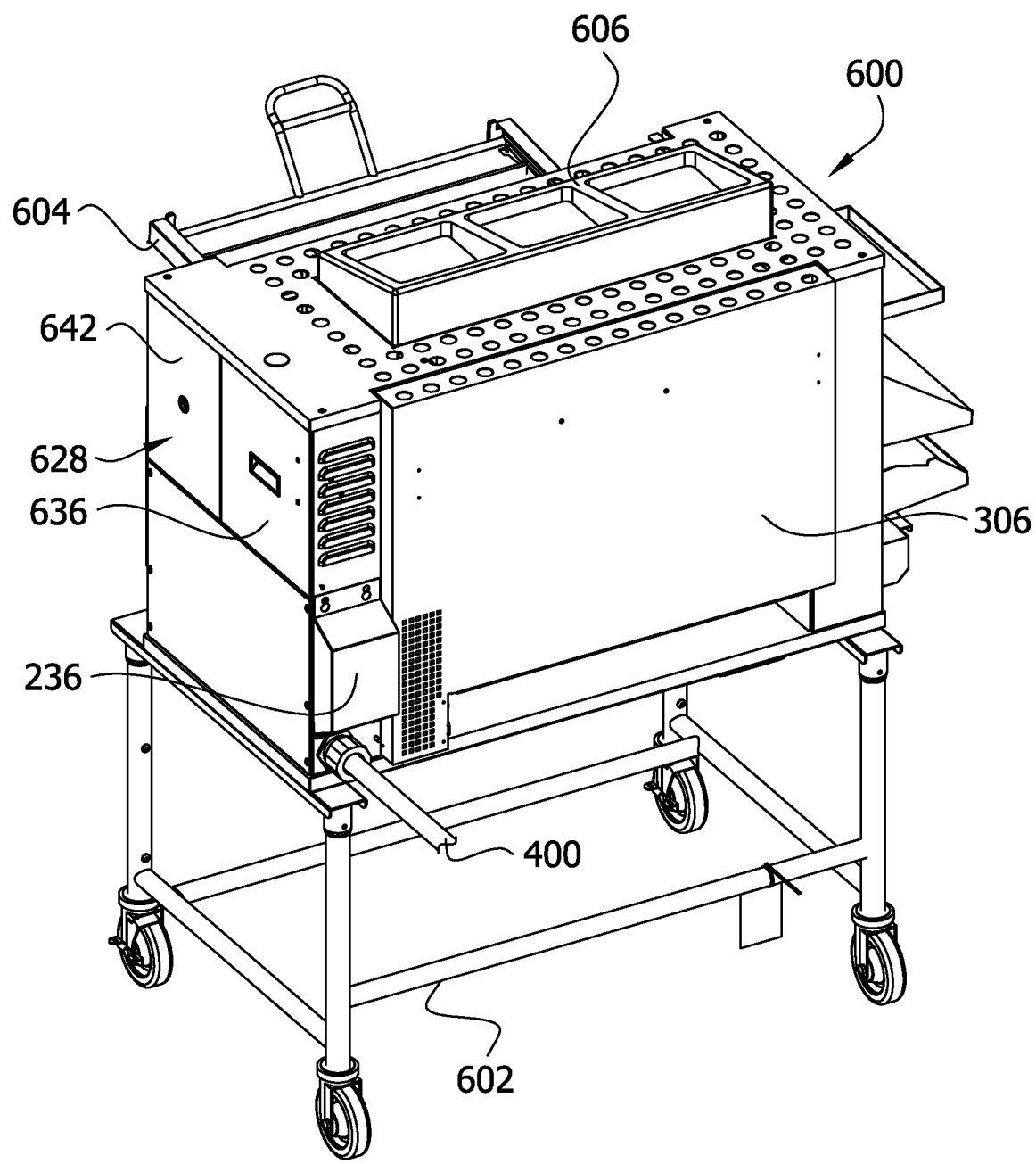
FIG. 23 is a rear perspective a second embodiment of the broiler.
Figure 24:
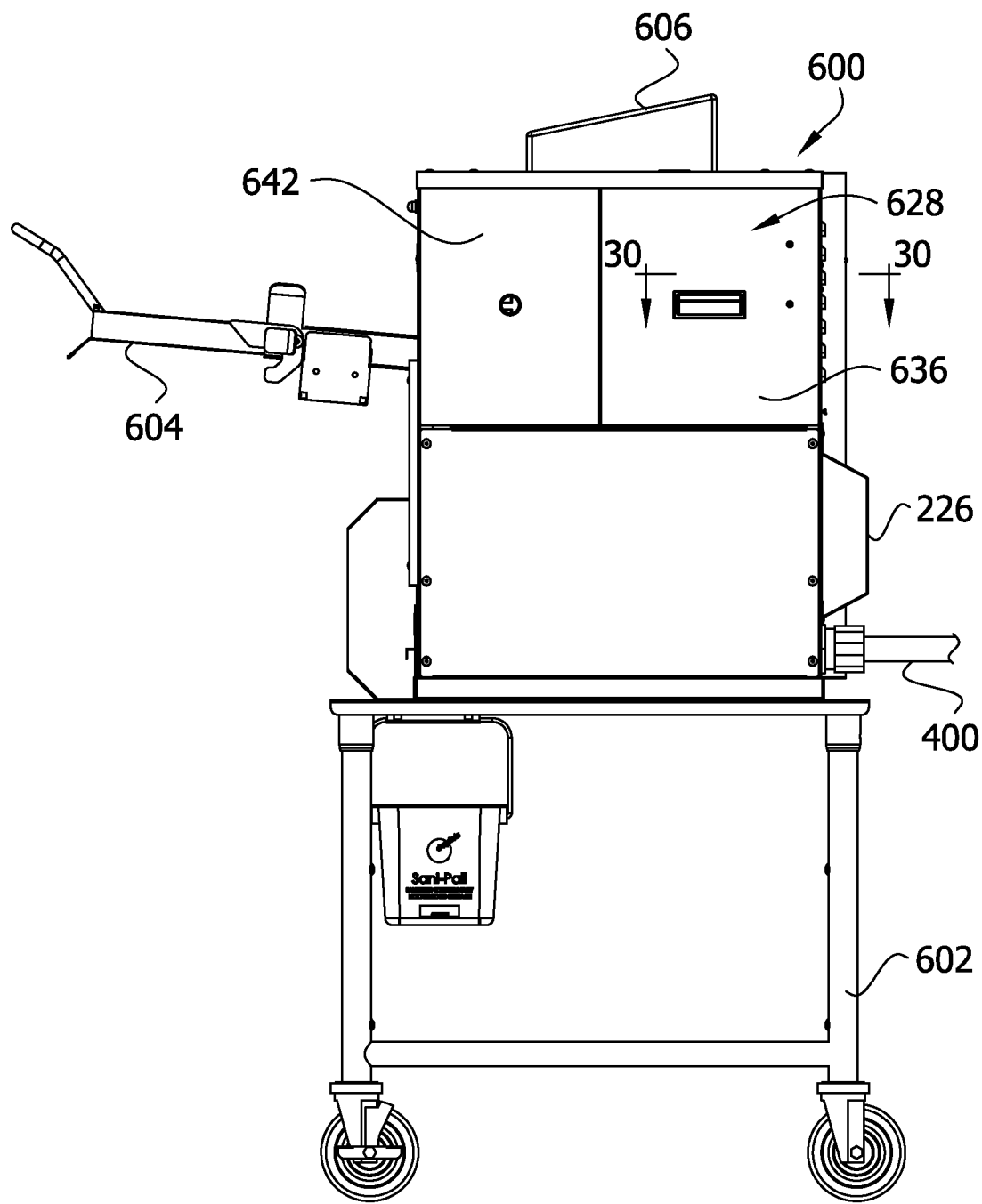
FIG. 24 is a left side elevation of the broiler of FIG. 23.

FIGS. 22-22A shows a wiring diagram similar to the one shown in FIGS. 21-21C but modified for broilers to be used in markets (e.g., European countries) having different electrical requirements. FIG. 22A illustrates a terminal block 404A of FIG. 22 interconnecting the heaters, the contactors CT1, CT2 and the solid state relays 411. FIG. 21B is an expanded view of a portion of FIG. 22 showing the interface 242. FIG. 21C is an expanded view of a portion of FIG. 22 showing the solid state relays 411 (SSR-1 to SSR-6).

The removable heating modules 82, 84, 86 described above enable a failed heating element 94 (H4, H5, H6), 94A (H4B) to be quickly, safely and easily replaced. To do this, the power switch 450 of the broiler 30 is turned off and the broiler is either unplugged or an all pole disconnect is locked out, to disconnect electrical power to the broiler. The back panel 306 is then removed by lifting it up from the housing 32 to disengage the lip 320 from the slots 334 and the locking elements 328, 330 on the cover brackets from their respective recesses 336, 338 in the housing. Removing the back panel 306 also moves the actuator 482 on the panel away from the safety sensor 488 to open the N.O. switch MS2 and close the N.C. switch MS1 to further insure that electrical circuit is broken for safety reasons.

Assuming that one of heating elements 94, 94A of the lower heat source 68 has failed, the lower terminal cover 270 is removed to expose the removable heating modules 82, 84, 86. The failed heating module is removed by unlatching the appropriate locking components 154, 158, quickly disconnecting the plug 244 of the failed module from the receptacle 246 on the interface 242, and pulling the module in a rearward direction to disengage the module frame from module holder 120. The failed module is then replaced with a replacement module, and the above steps are reversed to reinstall the lower terminal cover and back panel.

In the event the heating element 94, 94A failed due to an electrical short, the fuse corresponding to that heating element may blow to protect the respective solid state relay. Therefore, the replacement process may also involve replacing the blown fuse. This is readily accomplished by lifting the fuse hood 230 and replacing the blown fuse with a replacement fuse taken from one of the fuse holders 232 on the hood. After the back panel 306 is in position and the fuse is replaced, the broiler 30 is ready for operation. Electrical power is supplied to the broiler by throwing the circuit breaker to its closed position and moving the power switch 450 to its "power on" position.

The replacement process does not require tools, and the person replacing the module has no risk of injury due to electrical shock because the power circuit cannot be completed until the back panel 306 is in proper position closing the back of the housing with the actuator 482 aligned relative to the safety sensor 488.

FIGS. 23-29 show a second embodiment of a broiler of this invention generally designated 600. This embodiment is similar to the broiler 30 of the previous embodiment except as hereinafter described, and parts of the broiler 600 corresponding to parts of the broiler 30 are designated by the same reference numbers. The broiler sits on a wheeled cart 602 and is provided with a manually-operated loader 604 for loading food (e.g., hamburger patties) onto the cooking surface. An exhaust gas cleaning device 606 (e.g., catalyst) sits atop the broiler.

Figure 25:
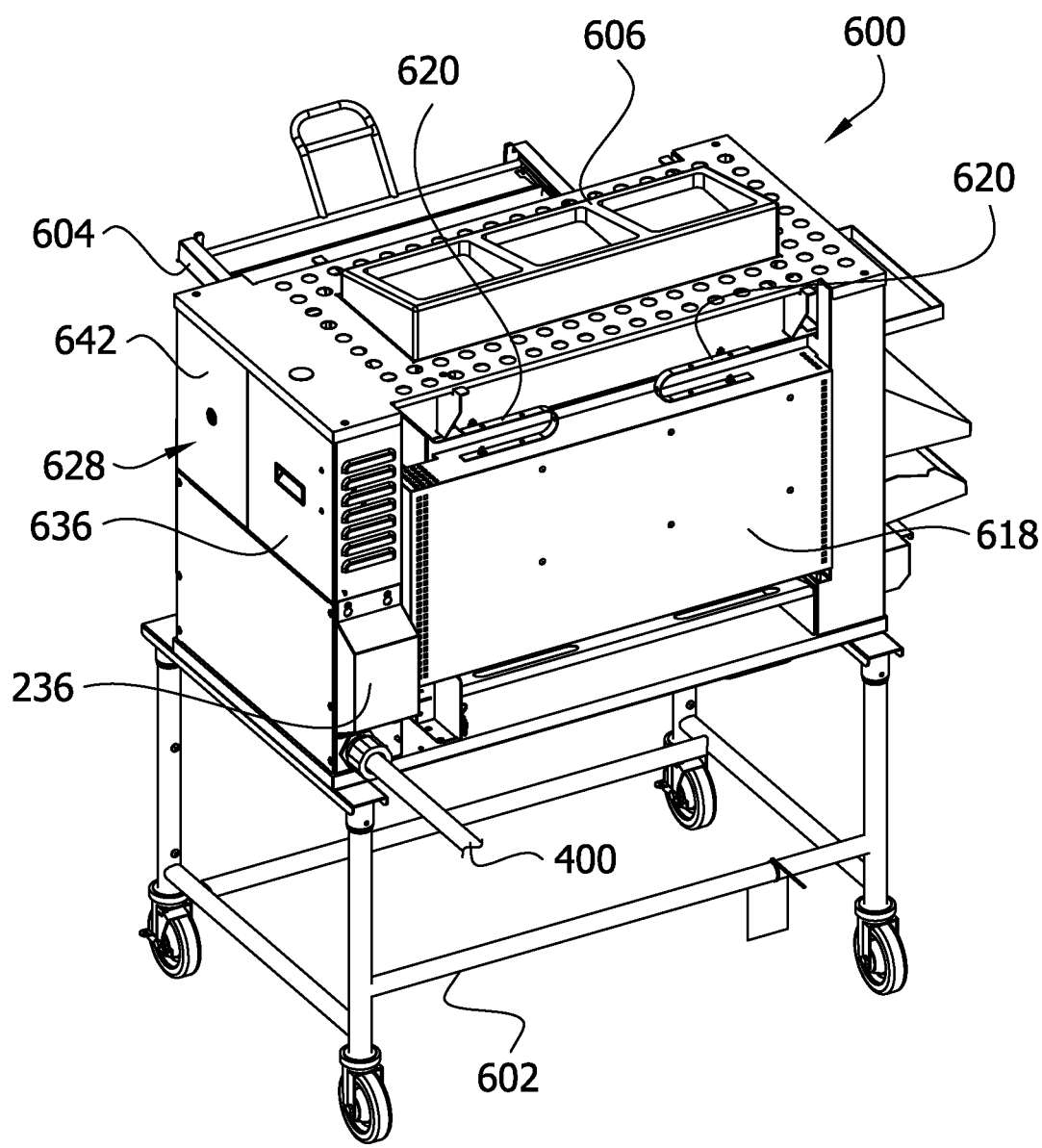
FIG. 25 is a view of similar to FIG. 23 but with a back panel of the broiler removed.
Figure 26:
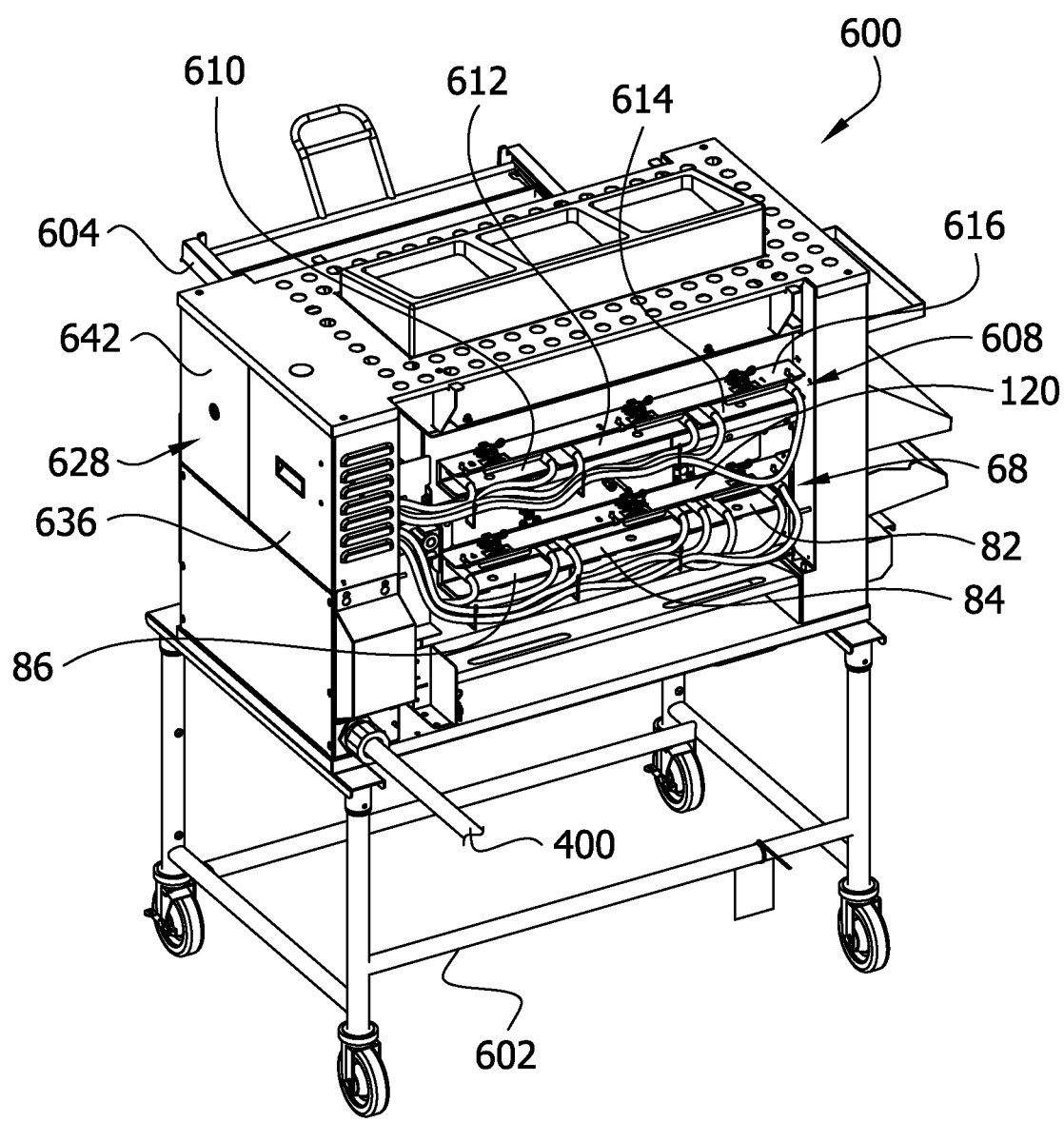
FIG. 26 is a view similar to FIG. 25 but with a terminal cover removed to show removable modules.
Figure 27:
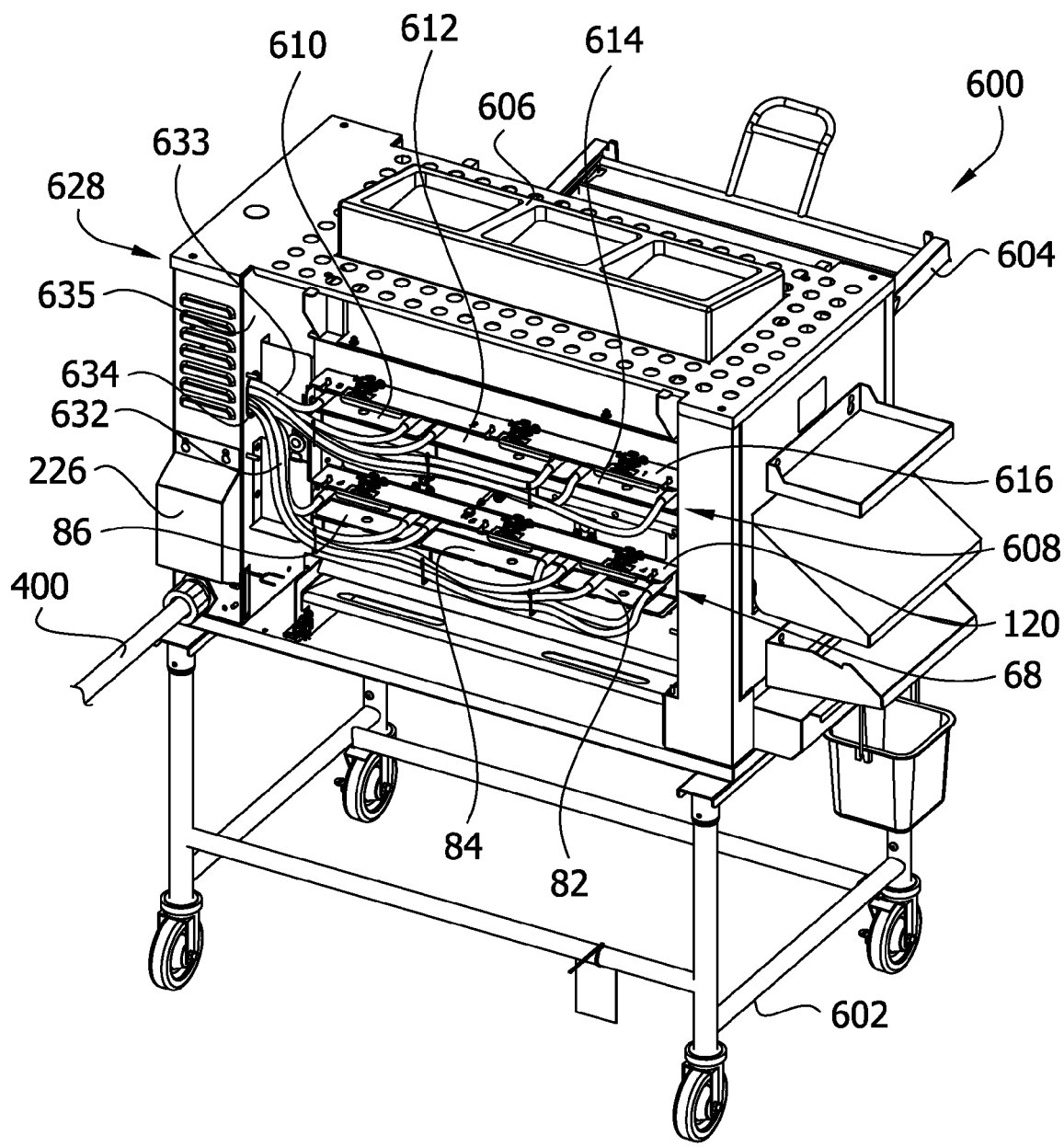
FIG. 27 is another rear perspective of a second embodiment of the broiler but with a terminal cover removed to show removable modules.
Figure 28:
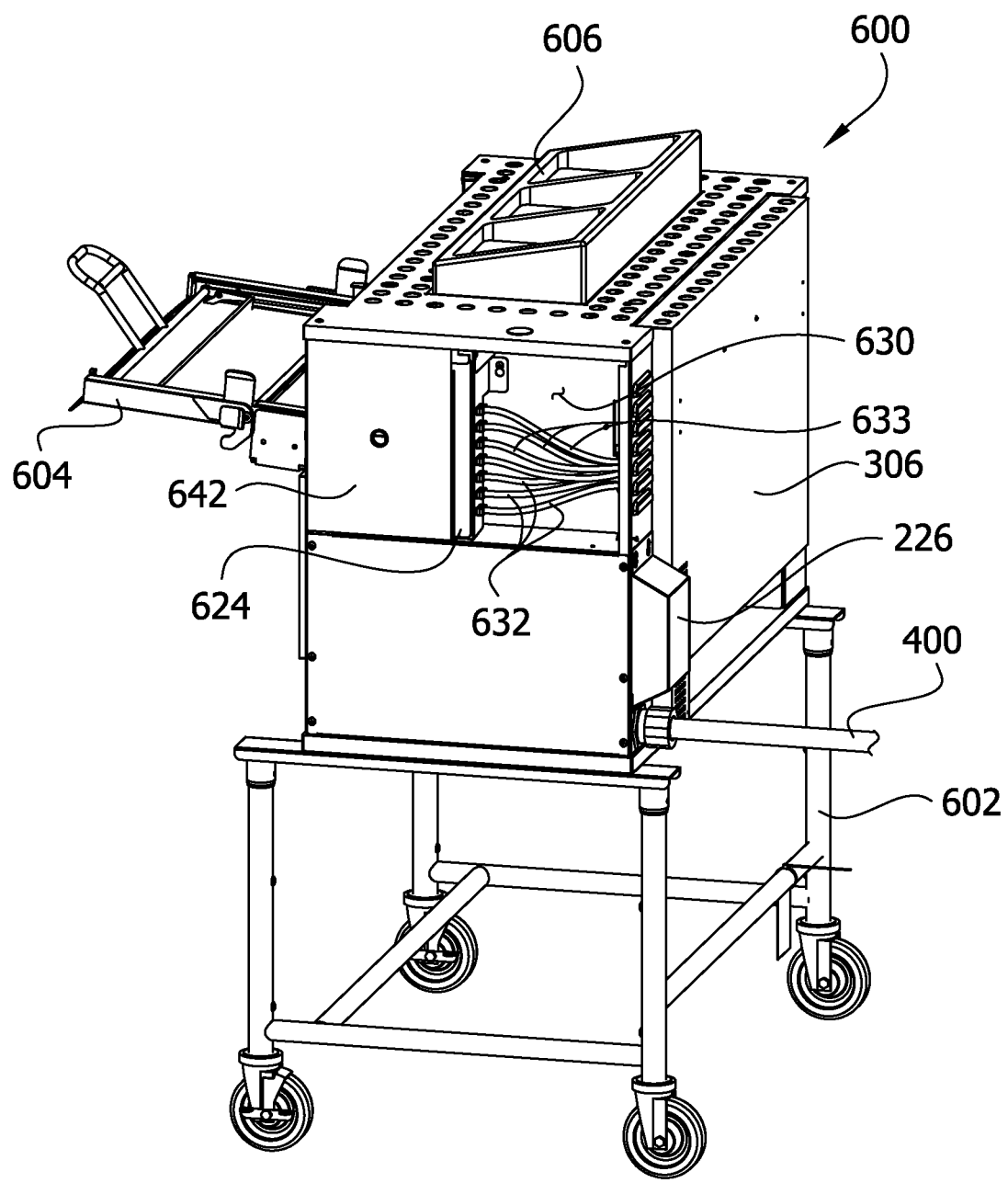
FIG. 28 is a side perspective a second embodiment of the broiler but with a first access panel removed to show the electrical leads from the heating modules connected to the interface.

Referring to FIGS. 27 and 28, the broiler 600 includes a lower heat source 68 and an upper heat source 608. In this embodiment, the upper heat source 608, like the lower heat source 68, comprises a number of removable heating modules held by a module holder 616, three such removable modules 610, 612, 614 being illustrated in FIGS. 26 and 27. The heating modules 610, 612, 614, 82, 84, 86 of the upper and lower heat sources 608, 68 and associated electrical wiring are enclosed by a single terminal cover 618 (FIG. 25) instead of separate upper and lower terminal covers as in the first embodiment. Desirably, the single terminal cover 618 and housing 32 have interlocking, quick-assembly components (not shown) which allow the cover to be quickly installed on the housing and removed from the housing 32 without the use of tools to facilitate access to the upper and lower heat sources 608, 68. The terminal cover 618 is suitably electrically grounded to the housing 32, as by one or more grounding straps 620 (FIG. 25). In the illustrated embodiment, two such grounding straps 620 are provided.

Figure 29:
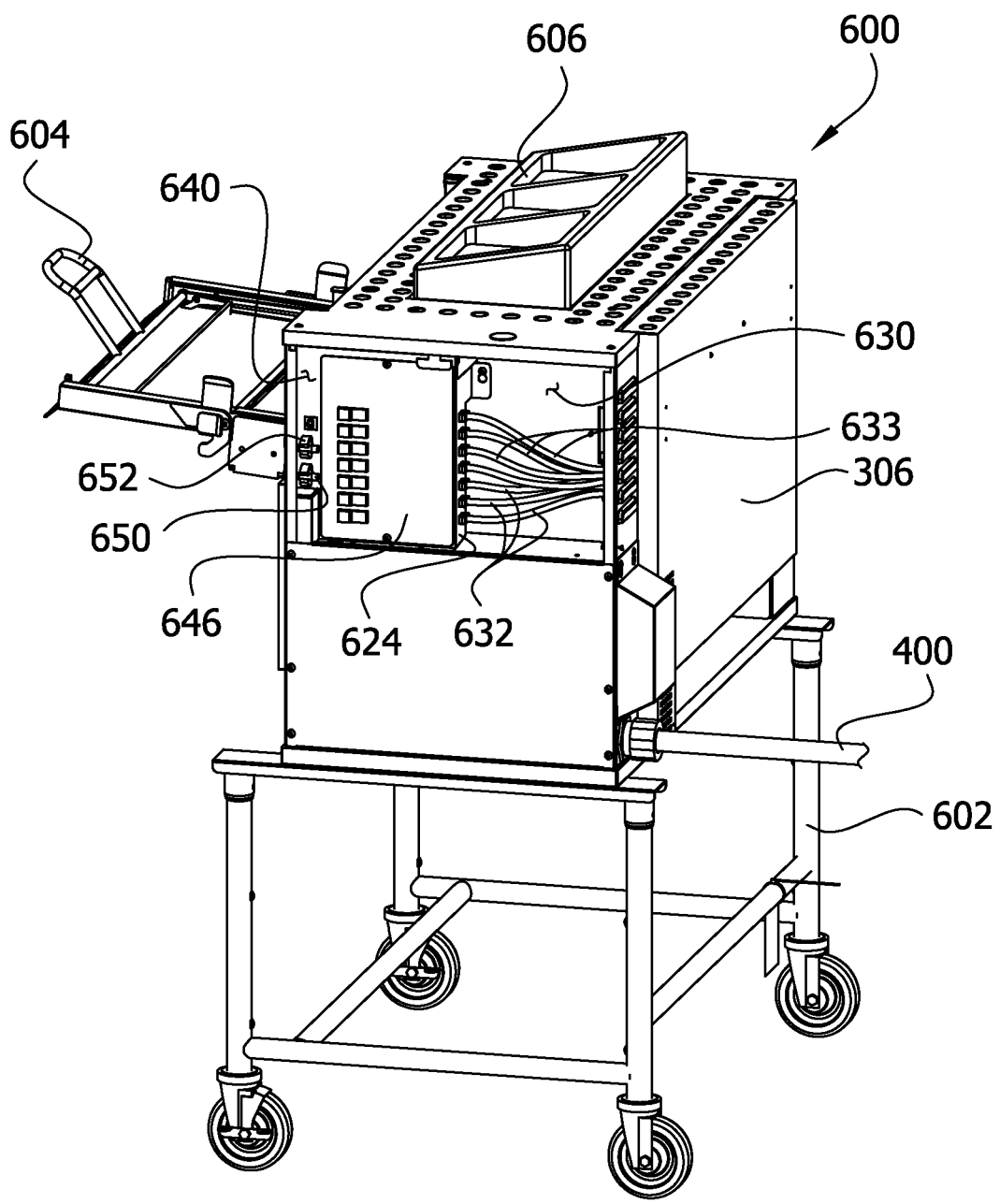
FIG. 29 is a side perspective a second embodiment of the broiler similar to FIG. 28 but with first and second access panels removed to show the circuit box.
Figure 30:
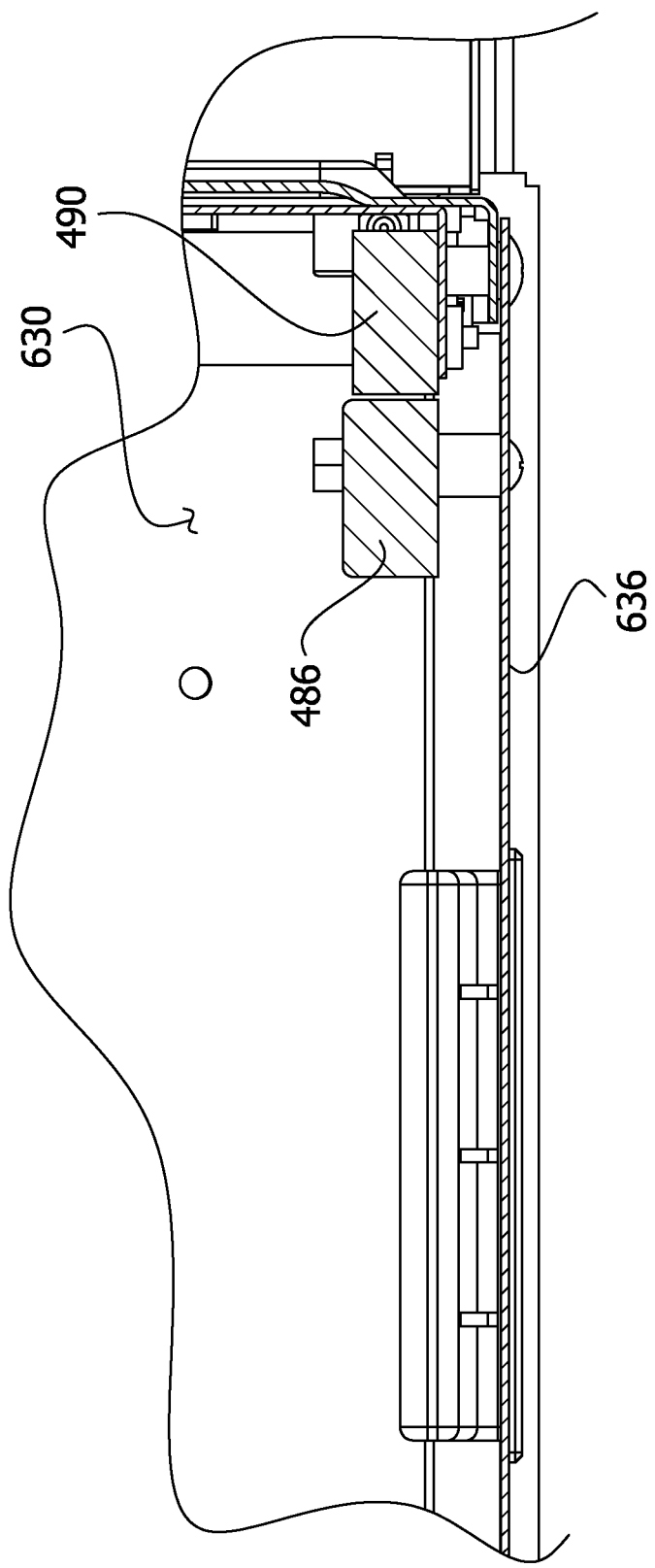
FIG. 30 is an enlarged perspective of a portion of the broiler taken along lines 30-30 of FIG. 24 showing the second access panel (side panel) sensor and second access panel actuator of an interlock.

Each removable heating module 82, 84, 86 of the lower heat source 68 is configured for quick connection and disconnection to and from an interface 624 in an electrical enclosure 628 at one side 46 of the housing 32 (FIGS. 25-29). The enclosure 628 has a first compartment 630 toward the rear of the broiler for housing the interface 624, electrical leads 632 from the lower removable heating modules 82, 84, 86, and electrical leads 633 from the upper removable heating modules 610, 612, 614 (FIG. 27). The electrical leads 632, 633 enter the compartment through one or more openings 634 in a partition 635 defining a rear wall of the enclosure 628 (FIG. 27). The wiring compartment 630 is accessible by removing a first access panel 636 (compare FIGS. 26 and 28). The enclosure 628 also includes a second compartment 640 toward the front of the broiler accessible by removing a second access panel 642 (compare FIGS. 26 and 29). The second compartment 640 contains a circuit box 646 for housing electrical circuitry of the broiler (FIG. 29). The box 646 is set back into the compartment 640 to provide a small storage space in front of the box for spare fuses 650 held by fuse holders 652.

The quick connection and disconnection of the modules 82, 84, 86 of the lower heat source 68 to the interface 624 is enabled by means of mating complementary quick connect/disconnect connectors, as in the first embodiment. Referring to FIG. 31E, these connectors include male plugs 660 connected via leads 632 to the terminal ends of the heating elements 94, 94A of the removable modules 82, 84, 86 and female receptacles 664 on the interface 624 for receiving the male plugs.

In the illustrated embodiment, the male plugs 660 are connected via leads 632 to respective terminals on the heating modules 82, 84, 86 and via ground leads to grounding terminals on the module holder 120. The leads 632 of the male plugs 660 are connected to respective terminals of the lower heating modules 82, 84, 86 by suitable means, e.g., stud-and-eyelet connections or crimped and bonded connections.

The quick connection and disconnection of the modules of the heat sources to the interface 624 in either or both of the first and second embodiments may be enabled by means of mating uniquely configured and paired quick connect/disconnect connectors (e.g., complementary connectors). For example, referring to FIG. 31E, each of the male plugs and its matching female receptacle may have a unique connector or pin configuration so that a particular male plug will only mate with a particular female receptacle. In the illustrated embodiment, each male plug has three "pins" with each pin having a unique male or female configuration, and its matching female receptacle has a complementary configuration. As a specific example, the male plug 670 of the first heating element 204 (H1) has "pins" with a "female, male, female" configuration. Only the female receptacle 674 of the first heating element 204 has this same "female, male, female" configuration. As a result, the male plug 670 of the first heating element 204 can only be plugged into the female receptacle 674 of the first heating element 204. This provides added safety and prevents a heating element being connected to the wrong receptacle. Other types of quick connect/disconnect connectors may be used to readily connect and disconnect the heating modules to and from the interface 624 on the housing 32.

Similarly, as shown in FIG. 31E, each removable heating module 610, 612, 614 of the upper heat source 608 is configured for quick connection and disconnection to and from the interface 624 by means of mating quick connect/disconnect connectors, such as male plugs 670 (or other quick connect/disconnect devices) connected via leads 633 to respective terminals of the heating elements of the upper removable modules and female receptacles 674 (or other quick connect/disconnect devices) on the interface 624 for receiving the male plugs 670. In the illustrated embodiment, the male plugs 670 are connected via leads 633 to respective terminals on the heating modules 610, 612, 614 and via ground leads to grounding terminals on the module holder 616. The leads 633 of the male plugs 660 are connected to respective terminals of the upper heating modules 610, 612, 614 by suitable means, e.g., stud-and-eyelet connections or crimped and bonded connections. Other types of quick connect/disconnect connectors may be used to readily connect and disconnect the heating modules 610, 612, 614 to and from the interface 624 on the housing 32.

Figure 31:
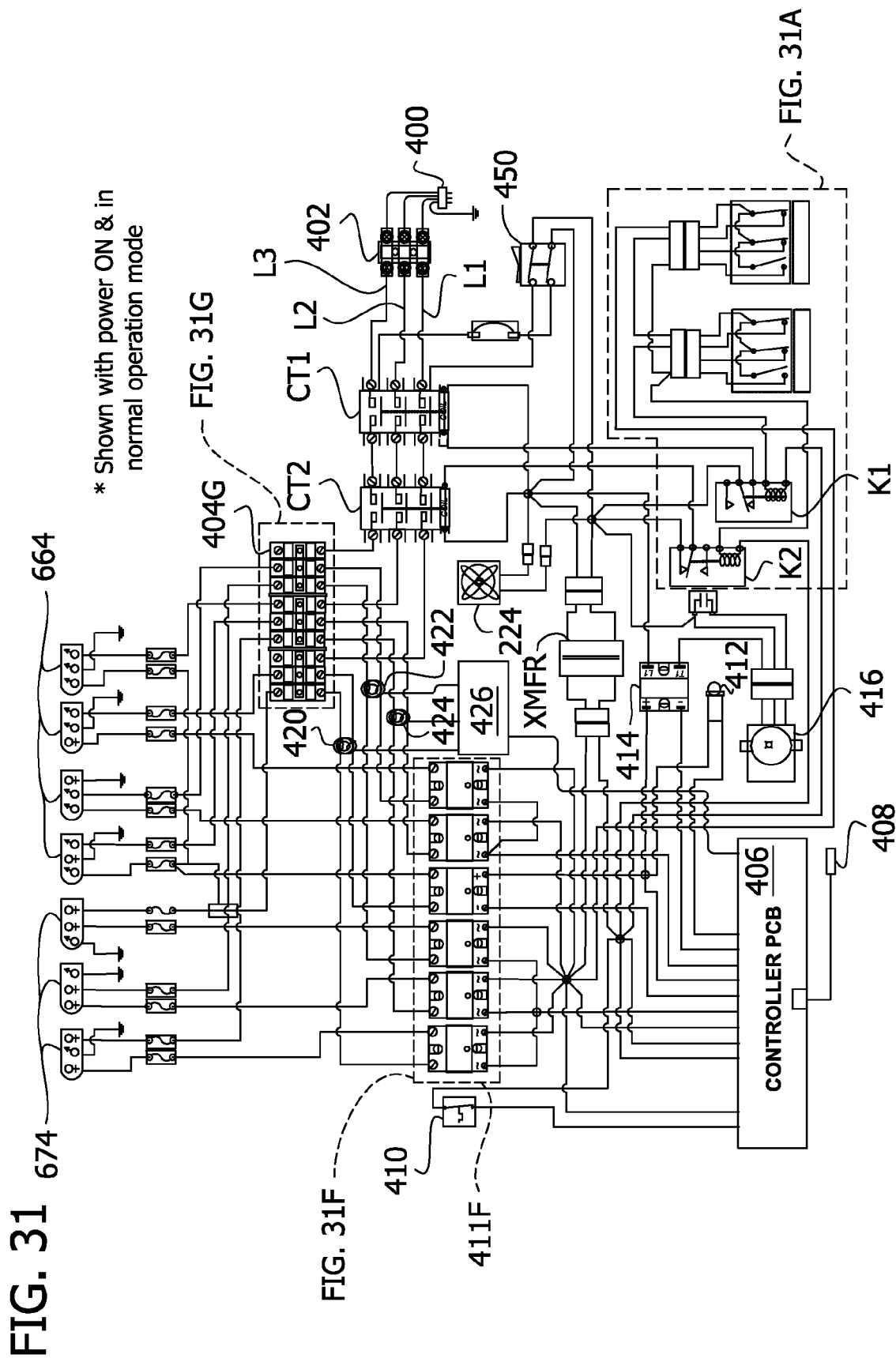
FIG. 31 is a wiring diagram of the broiler of the second embodiment.
Figure 31A:
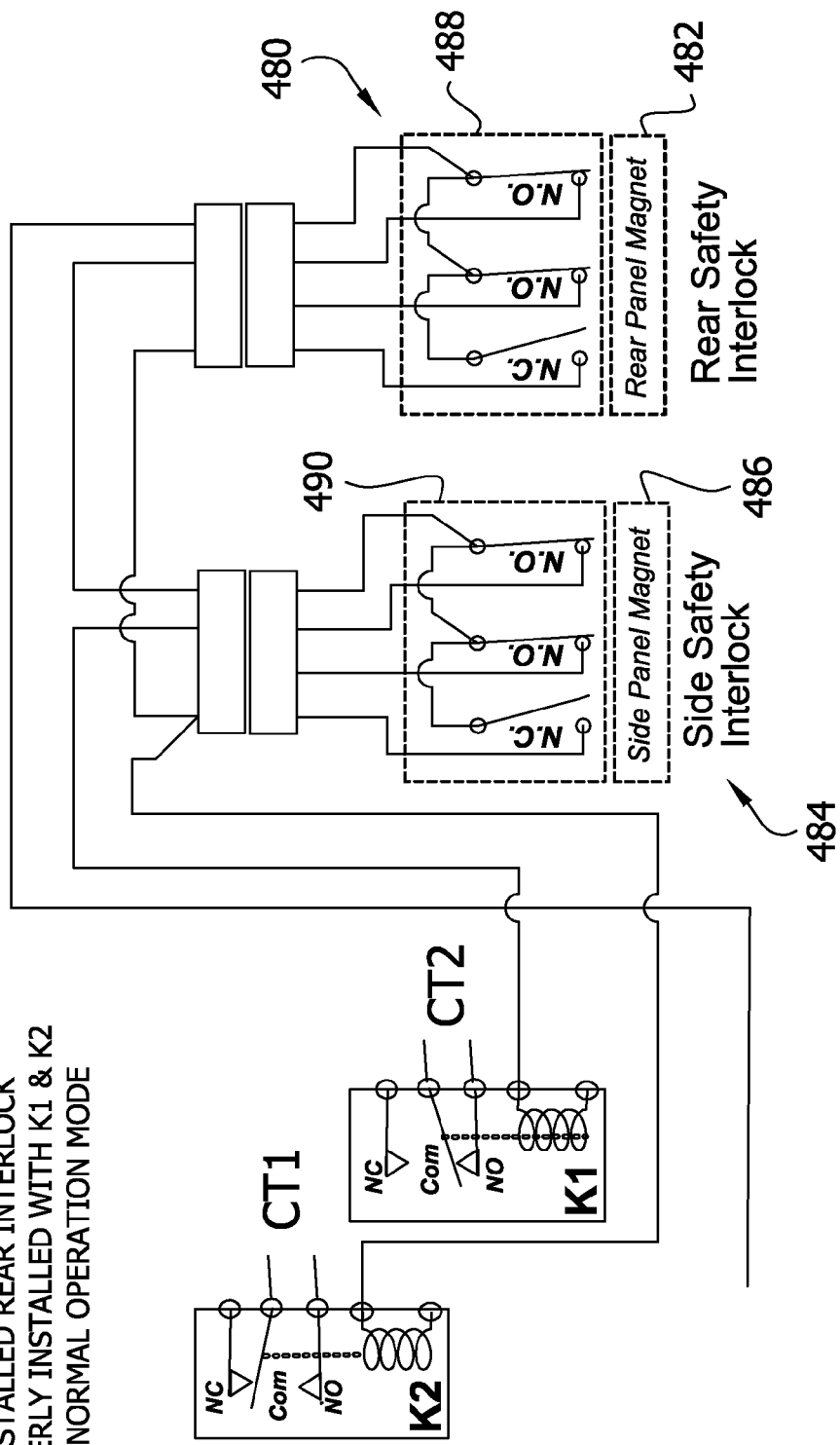
FIG. 31A is an expanded view of a portion of FIGS. 31 and 32 illustrating the interlocks and relay according to scenario 1, wherein both the side and rear panels are properly in place.
Figure 31B:
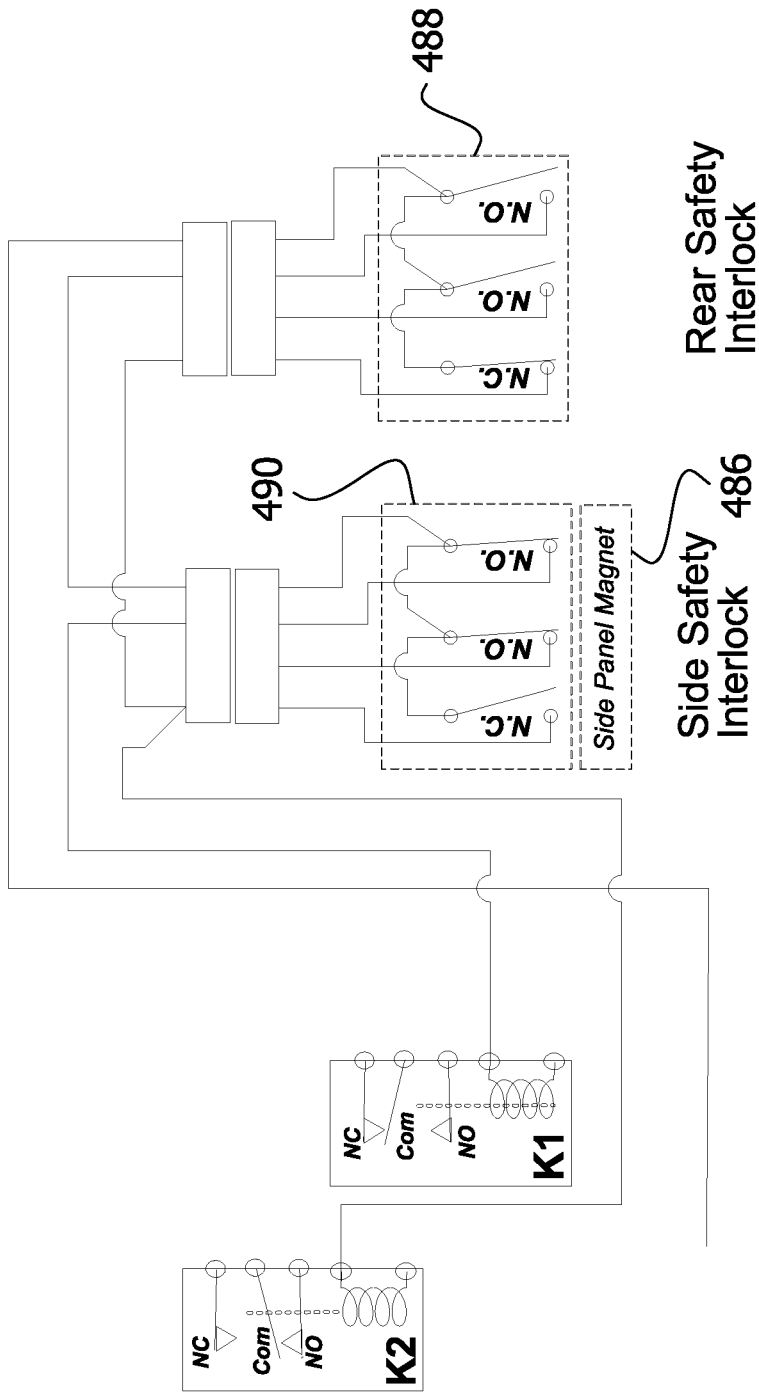
FIG. 31B is an expanded view of a portion of FIGS. 31 and 32 illustrating the interlocks and relay according to scenario 2, wherein the second access panel is properly in place and the rear panel is not properly in place.
Figure 31C:
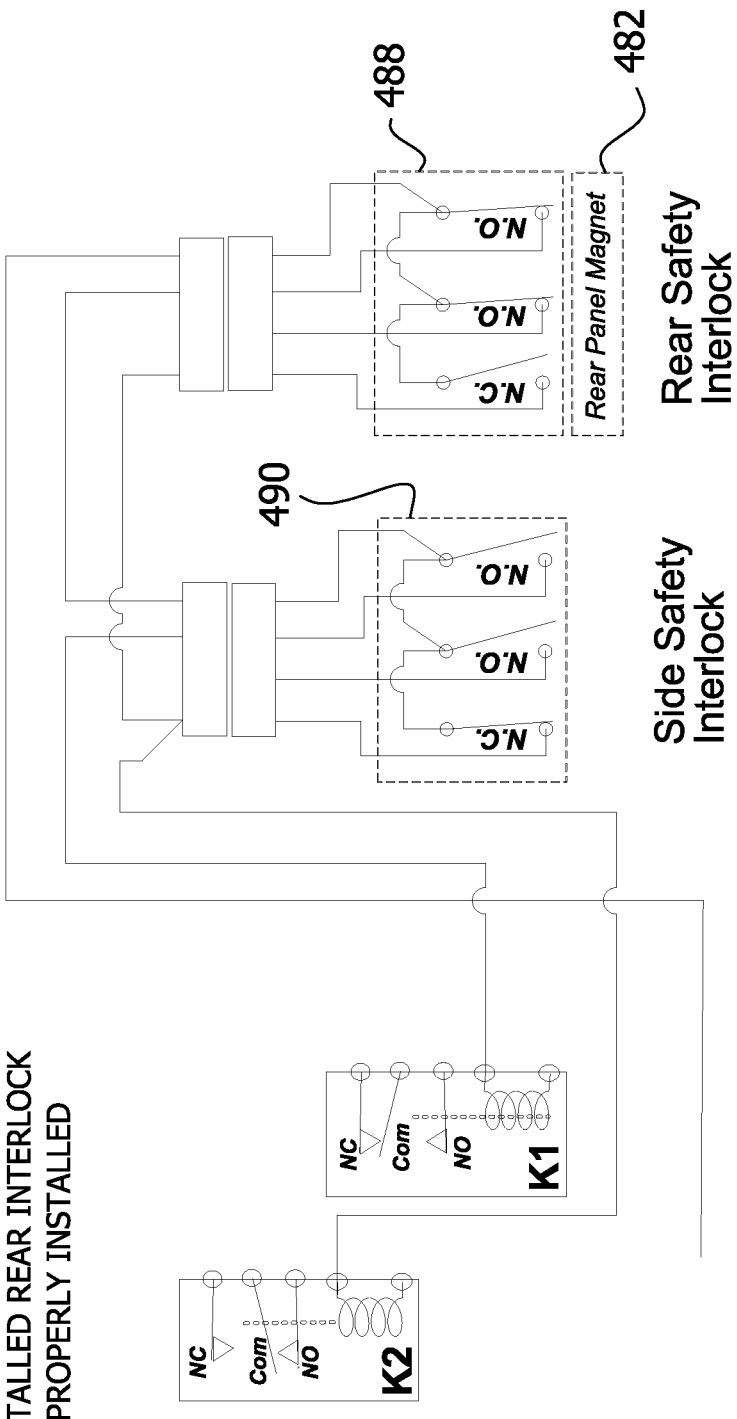
FIG. 31C is an expanded view of a portion of FIGS. 31 and 32 illustrating the interlocks and relay according to scenario 3, wherein the second access panel is not properly in place and the rear panel is properly in place.
Figure 31D:
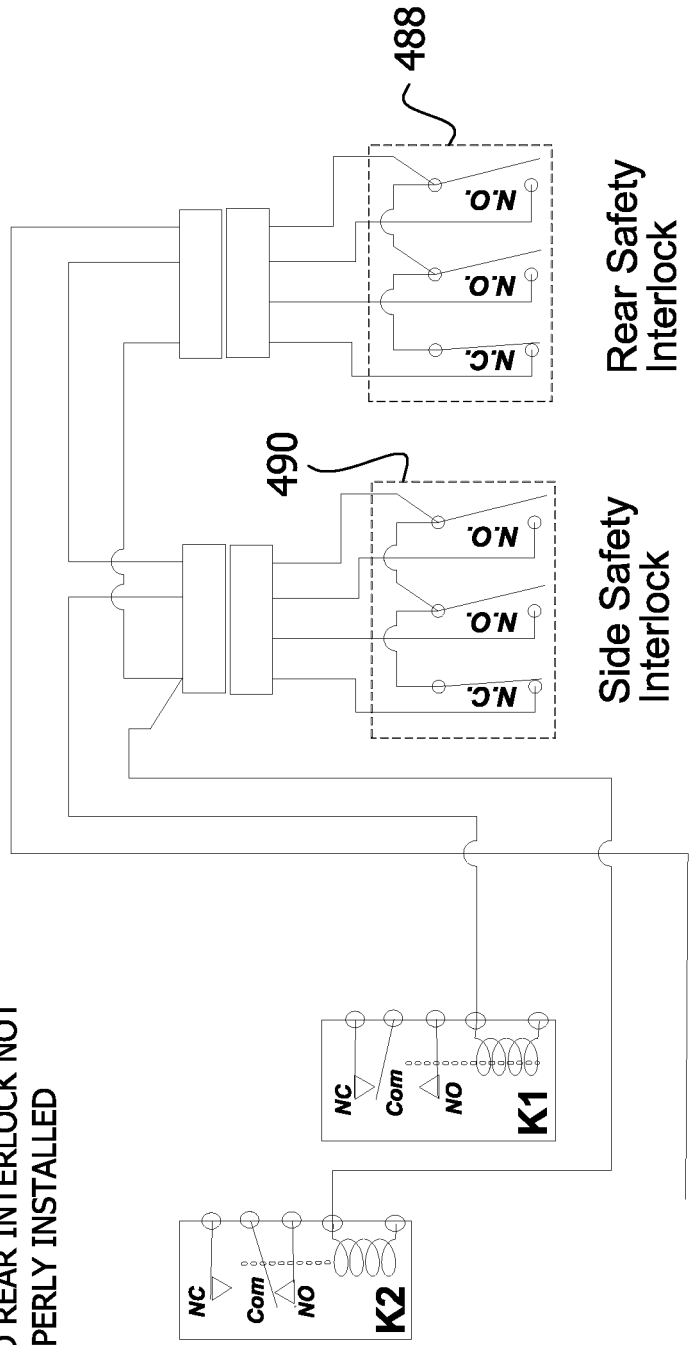
FIG. 31D is an expanded view of a portion of FIGS. 31 and 32 illustrating the interlocks and relay according to scenario 4, wherein both the side and rear panels are not properly in place.
Figure 31E:
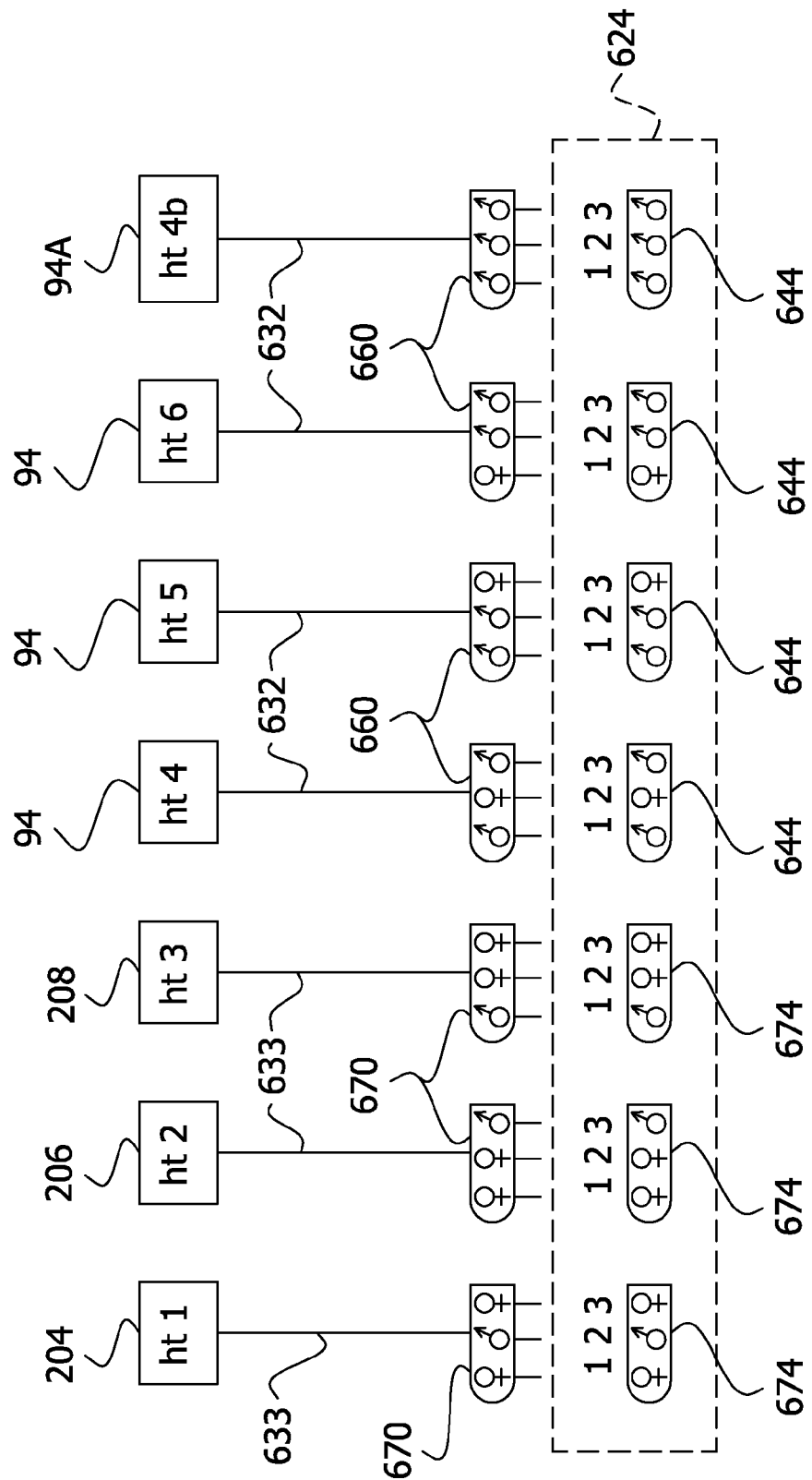
FIG. 31E illustrates the quick connect and disconnect of the modules of the heat source to the interface 624 by means of mating complementary quick connect/disconnect connectors.
Figure 31F:
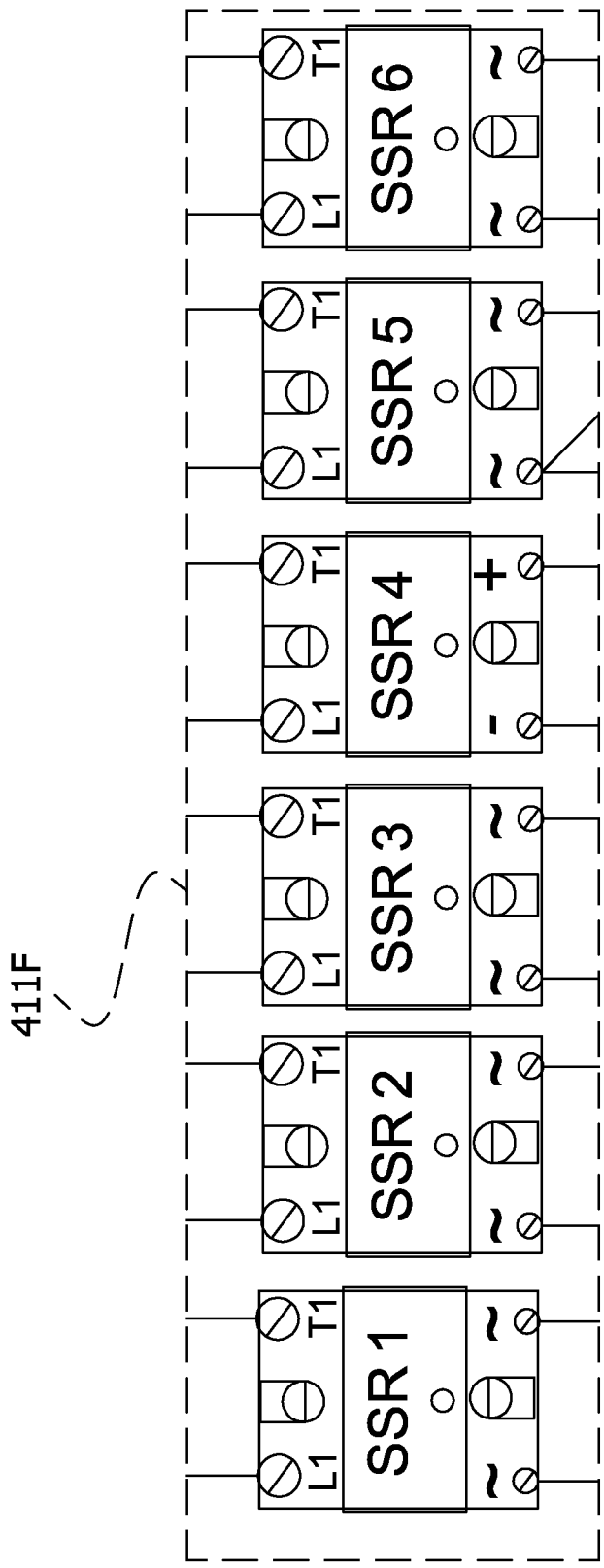
FIG. 31F is an expanded view of a portion of FIGS. 31 and 32 showing the solid state relays 411F (SSR-1 to SSR-6).
Figure 31G:
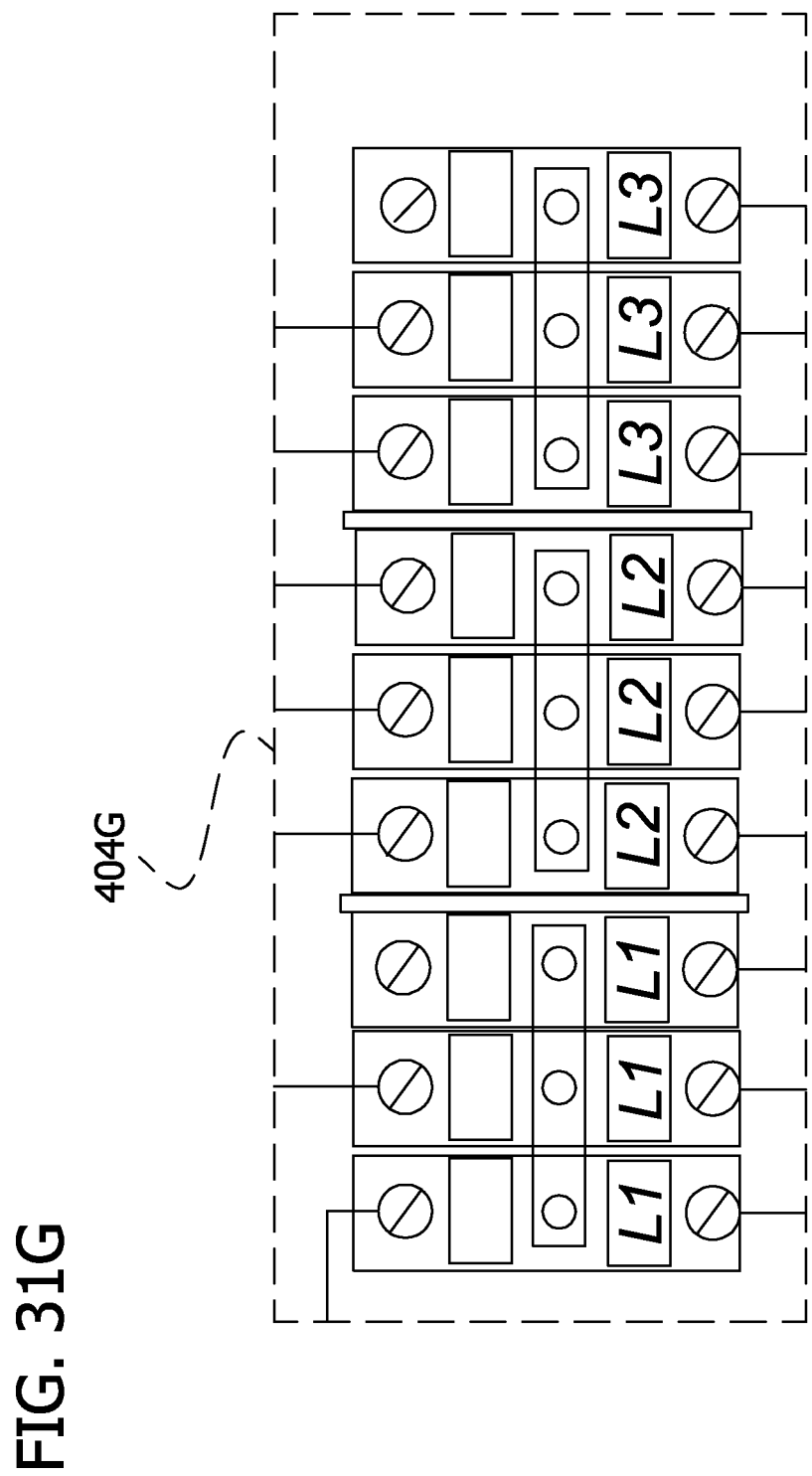
FIG. 31G is an expanded view of a portion of FIG. 31 showing the terminal block 404G.
Figure 32:
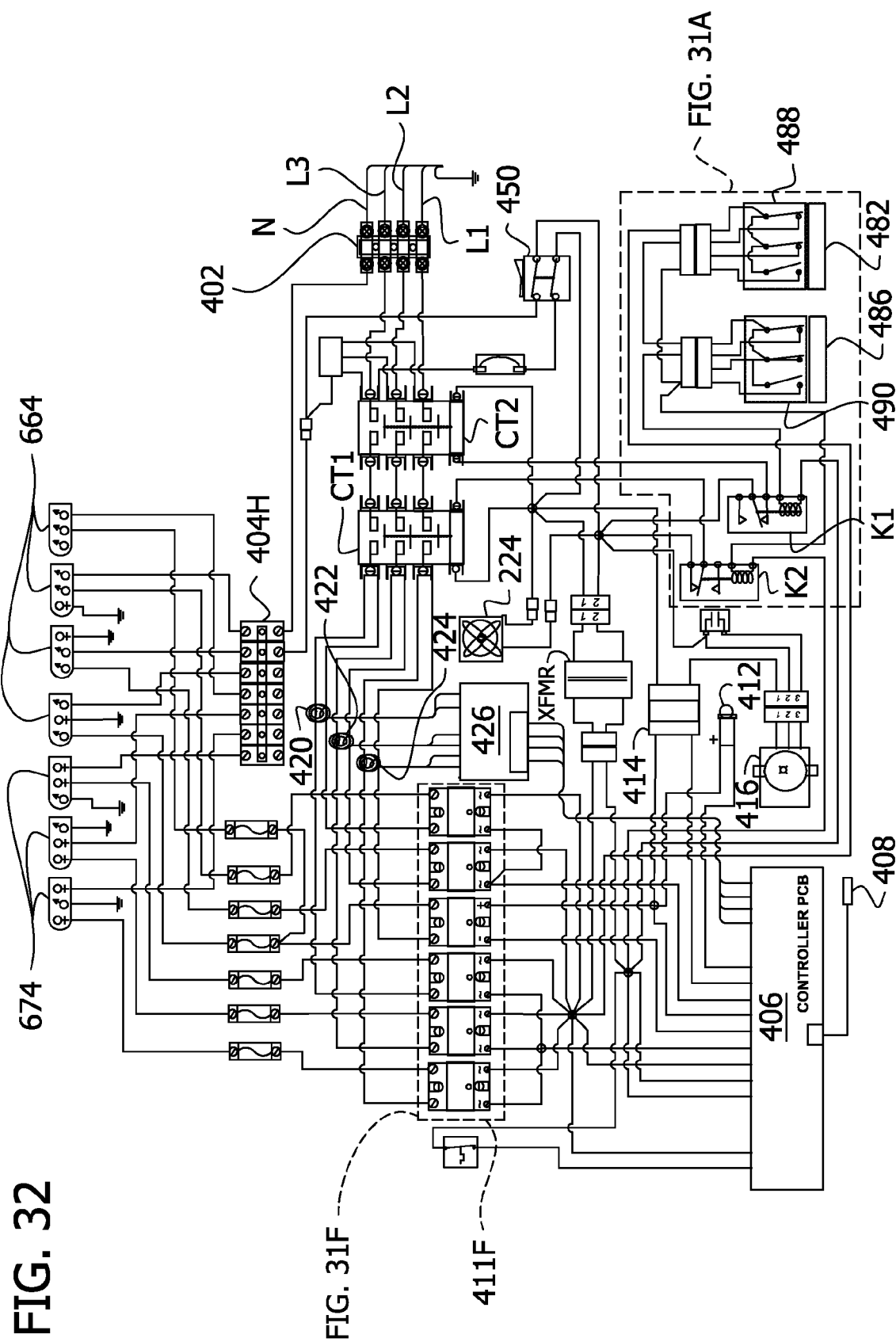
FIG. 32 is an alternative wiring diagram of the broiler of the second embodiment.

Referring to FIGS. 31, 31A-31G and 32, wire diagrams showing embodiments of the electrical aspects of the broiler 600 of the invention are illustrated. The embodiment of FIGS. 31 and 31A-31G includes safety interlocks for the second access panel 636 (hereinafter the side panel) and back panel 306 as compared to the embodiment of FIG. 21 which includes a back panel interlock but does not include a side panel interlock. FIG. 31F illustrates the solid state relays 411F of FIG. 31. FIG. 31G illustrates the terminal block 404G of FIG. 31 and FIG. 32 illustrates the terminal block 404H interconnecting the heaters, the contactors CT1, CT2 and the solid state relays 411F. The embodiment of FIG. 32 includes side panel and back panel safety interlocks as compared to the embodiment of FIG. 22 which includes a back panel interlock but does not include a side panel interlock.

The wiring diagram shown in FIGS. 31 and 31A-31G is suited for broilers to be used in markets (e.g., the United States) having certain electrical requirements (208/240 volts, 3P 60 Hz). FIG. 32 shows a wiring diagram similar to the one shown in FIGS. 31, 31A-31G but modified for broilers to be used in markets (e.g., European countries) having different electrical requirements (400 volts, 3N, 50 Hz). FIGS. 31A-31D are an expanded view of a portion of FIG. 32 illustrating the interlocks and relay according to scenarios 1-4. FIG. 31F is an expanded view of a portion of FIG. 32 showing the solid state relays 411F (SSR-1 to SSR-6).

A line supply cord and plug 400 connected to a three phase, 60 Hz, 208/240 volt power source supplies power to the broiler 30. The supply line 400 is connected to the terminal block 402 which is then connected to the first contactor CT1. The first contactor CT1 is connected in series with a second contactor CT2. When energized, the first contactor CT1 connects the supply line 400 to the second contactor CT2. The second contactor CT2 when energized connects one phase of the supply line 400 via an element terminal block 404 to one terminal of each of the heating elements 94 (H4, H5, H6), 94A (H4B), 204 (H1), 206 (H2), 208 (H3) of the upper and lower heat sources 66, 68. The other terminal of each heating element 94, 94A, 204, 206, 208 is connected to another phase via the element terminal block 404 to a bank of solid state relays 411 (SSR-1 to SSR-6), which selectively energize the heating elements. Fuses (e.g., 25 or 30 amp rating) are connected in series to each terminal of the heating elements.

The operation of the SSR relays 411 is controlled by a controller mounted on a PC board 406. In one embodiment, the controller may be a microprocessor based controller. The controller also monitors cooking chamber temperature via a thermocouple 408, monitors a thermal limit switch 410, and energizes and de-energizes a load light 412 to indicate that the broiler is "not ready" and "ready" to cook, respectively. In addition, the controller 406 controls a conveyor solid state relay 414 which selectively energizes a conveyor motor 416 for driving the conveyor. A plurality of current sensors 420, 422, 424, one for each cooking zone Z1, Z2, Z3, senses the current supplied to each zone. The sensors are connected to a current sense PCB 426 which provides the sensed current to the controller for monitoring operation of the heating elements 94, 94A, 204, 206, and 208.

The controller runs a diagnostic routine at defined intervals during the idle and also at the end of each cook cycle. The diagnostic routine performs three separate tests on the heating elements. It performs a test with all upper heating elements "on" and with all lower heating elements "off", followed by a test with all upper heating elements "off" and with all lower heating elements "on", and finally a test with all heating elements "off." In the event that the sensed current indicates that a heating element is not operating properly, the controller will display an error message identifying the element that has failed. (The message will indicate top left element, bottom center element, etc.) In the event that a heating element is not working properly and a cook cycle is run, the controller will sound an alarm consisting of an audible alarm and flashing of the visual display 76, to indicate that the operator should test the product temperature to make sure that the product has been cooked completely. The heating element error message will continue to display during idle. If desired, the operator can decide to not cook in the zone Z1, Z2, Z3 directly above or below the failed element. The portion of the diagnostic routine that is run with all elements off can detect a shorted solid state relay or a shorted heating element. In the event that the controller detects this condition, and error message will be displayed to indicate that the unit requires service. Using fewer than all three zones to cook is sometimes referred to as "cripple cooking."

An alternate construction of two current sensors can be used with common functional processes described for controller diagnostics, identification of a unique failed or improperly functioning heating element, and operator alerts for 3-zone heating elements 94, 94A, 204, 206, and 208.

An additional alternate construction is a single current sensor with coordinated variance in heating element wattage providing common systems fault mode detection and operator alarm.

A manually operated power switch 450 is connected to the line supply and, when closed by an operator, selectively supplies power to the SSR heat sink cooling fan 224, the conveyor motor 416 via the conveyor solid state relay 414, a relay K1, a relay K2, the first contactor CT1, the second contactor CT2 and a primary of a transformer XFMR. The transformer XFMR has a secondary which is connected to the controller for powering the controller, which is connected to the relays K1, K2, and which is connected to the solid state relays 411 (SSR-1 to SSR-6) for powering the relays.

As shown in FIGS. 14, 19, 31 and 31A-31G, a back panel 306 interlock switch device 480 in series with a side panel interlock switch device 484 are provided. The switch devices include actuators 482, 486 (labeled MAGNETS in FIGS. 31, 31A-31C) mounted on the back panel 306 and the side panel 636 and safety sensors 488, 490 on the housing 32. Alternatively, in other (e.g., wireless) configurations, the actuators 482, 486 could be on the housing and the sensors 488, 490 on the back and side panel. When the back panel 306 and the side panel 636 is properly in place on the broiler, the actuators 482, 486 are aligned adjacent the safety sensor 488, 490. The actuators 482, 486 contain a plurality of aligned magnets having a unique configuration of polarities. The sensors 488, 490 are configured to detect only an actuator having the same unique configuration of polarities. The sensors 488, 490 each have three magnetic switches. When the actuators 482, 486 are not aligned adjacent the sensors so that the sensors do not detect the magnetic fields of the actuators, or the sensors detects magnetic fields which do not have the unique configuration of polarities, or the actuators are not properly aligned with the sensors so that the sensors do not detect the unique configuration of polarities, N.O. (normally open) switches remain open and N.C. (normally closed) switches remain closed. On the other hand, when the actuators 482, 486 are properly aligned adjacent the sensor 488, 490 so that the sensors detect the unique configuration of polarities of the magnetic fields of the actuators, the sensors close the N.O. switches and open the N.C. switches. In one embodiment, the sensors may be model no. EX-BNS 33-12 manufactured and sold by Schmersal, Inc. of Tarrytown, N.Y., and the actuators may be model ES-BPS-33 manufactured and sold by Schmersal, Inc. Other types of interlock switch devices can be used in which one component of the device is on the back and side panel and another complementary component is on the housing 32, and in which the components function to interrupt power to the broiler when the when either the back or side panel is not properly in place on the housing. Power is supplied to the relays K1, K2 via the safety sensors 488, 490.

FIG. 31A illustrates scenario 1 in which both the back and sides panels are properly in place such that actuators 482, 486 are aligned adjacent the safety sensor 488, 490. In this scenario 1, the magnetic field of the actuators causes the N.O. magnetic switches of sensors 488 and 490 to close and interconnect the secondary of the transformer XMFR to the relay K1 to energize relay K1. When the back and sides panels are properly in place such that the actuator 482, 486 are aligned adjacent the safety sensor 488, 490, the magnetic field of the actuators cause the N.C. magnetic switches of sensors 488 and 490 to open and disconnect (open circuit) the secondary of the transformer XMFR from relay K2 to de-energize (open circuit) relay K2. Energizing relay K1 closes its contact to energize the first contactor CT1 interconnecting the line supply with the second contactor CT2. De-energizing relay K2 results in its contacts being closed to energize the second contactor CT2 interconnecting the first contactor CT1 and the line supply with the terminal block 404G and the heating elements. Since the contacts of contactors CT1 and CT2 are closed, the broiler is operational.

FIG. 31B illustrates scenario 2 in which the side panel is properly in place but the back panel is not properly in place such that actuator 486 is aligned adjacent its safety sensor 490 but actuator 482 is not aligned adjacent its safety sensor 488. When actuator 486 is aligned adjacent its safety sensor 490, the magnetic field of the actuator causes the N.O. magnetic switches of sensor 490 to close. When actuator 486 is aligned adjacent its safety sensor 490, the magnetic field of the actuator causes the N.C. magnetic switch of sensor 490 to open. When actuator 482 is not aligned adjacent its safety sensor 488, the absence of the magnetic field of the actuator 482 results in the N.O. magnetic switches of sensor 480 remaining open and the N.C. magnetic switches of sensor 480 remaining closed. This results in de-energizing (open circuit) of relay K1 to keep open the first contactors CT1 and energizing of relay K2 to open circuit and de-energize the second contactors CT2. Since the contacts of contactors CT1 and CT2 are open, the broiler is not operational.

FIG. 31C illustrates scenario 3 in which the back panel is properly in place but the side panel is not properly in place such that actuator 486 is not aligned adjacent its safety sensor 490 and actuator 482 is aligned adjacent its safety sensor 488. When actuator 486 is not aligned adjacent its safety sensor 490, the absence of the magnetic field of the actuator causes the N.O. magnetic switches of sensor 490 to remain open. When actuator 482 is aligned adjacent its safety sensor 488, the magnetic field of the actuator causes the N.C. magnetic switch of sensor 490 to open. When actuator 482 is aligned adjacent its safety sensor 488, the magnetic field of the actuator 482 causes the N.O. magnetic switches of sensor 480 to close and the N.C. magnetic switches of sensor 480 to open. This results in de-energizing (open circuit) of relay K1 to keep open the first contactors CT1 and energizing of relay K2 to open circuit and de-energize the second contactors CT2. Since the contacts of contactors CT1 and CT2 are open, the broiler is not operational.

FIG. 31D illustrates scenario 4 in which the back panel is not properly in place and side panel is not properly in place such that actuators 482,486 are not aligned adjacent the safety sensor 488, 490. When actuator 486 is not aligned adjacent its safety sensor 490, and when actuator 482 is not aligned adjacent its safety sensor 488, the absence of the magnetic fields of the actuators 486, 482 results in the N.O. magnetic switches of sensors 490, 480 remaining open and the N.C. magnetic switches of sensors 490, 480 remaining closed. This results in de-energizing (open circuit) of relay K1 to keep open the first contactors CT1 and energizing of relay K2 to open circuit and de-energize the second contactors CT2. Since the contacts of contactors CT1 and CT2 are open, the broiler is not operational.

Thus, the interlock switches 480, 484 provide a first level of power control for operational safety requiring the back and side panel to be properly in place (see FIG. 31A) in order to operate the broiler. The interlock switches allow operation of the broiler only when the back and side panel are in place such that the actuators 482, 486 are properly aligned adjacent the sensors 488, 490 in order to energize relay K1 and de-energize relay K2 so that the first and second contactors CT1, CT2 close their contacts to connect the line supply 400 to the terminal block 404G which energizes the upper and lower heat sources 66, 68.

The embodiment of FIG. 31 also provides additional fail-safe (redundant) power controls when the back and/or side panel is not in place such that the actuator 482, 486 are not aligned adjacent the safety sensor 488, 490. For example, if relay K1 fails such that its contact are welded closed causing the contacts of contactor CT2 to close, and if the back or side panel is not in place such that either actuator is not aligned adjacent the safety sensor, relay K2 would still have an open contact to open the contacts of contactor CT1 and prevent energizing of the heating elements of the upper and lower heat sources 66, 68.

Thus, failure of relay K1 does not inhibit proper operation of the interlock switch devices 480, 484 to prevent broiler operation when the back or side panel 306 is not in place.

As another example, if relay K2 fails such that its contact are welded (e.g., fused) closed causing the contacts of contactor CT1 to close, and if the back or side panel is not in place such that either actuator 482, 486 is not aligned adjacent the safety sensor 488, 490, relay K1 would still have an open contact to open the contacts of contactor CT2 and prevent energizing of the heating elements of the upper and lower heat sources 66, 68.

Thus, failure of relay K2 does not inhibit proper operation of the interlock switch devices 480, 484 to prevent broiler operation when the back panel is not in place. As a result, relays K1 and K2 provide a second level of power control for operational safety requiring the back and side panel to be properly in place (see FIG. 31A) in order to operate the broiler even if one of the relays fails.

As another example, if the first contactor CT1 fails such that its contacts are welded closed, and if the back or side panel is not in place such that either actuator 482, 486 is not aligned adjacent the safety sensor 488, 490, relay K1 and second contactor CT2 still would operate as noted above to prevent energizing of the heating elements of the upper and lower heat sources 66, 68.

Thus, failure of first contactor CT1 does not inhibit proper operation of the interlock switch devices 480, 484 to prevent broiler operation when the back or side panel is not in place.

As another example, if the second contactor CT2 fails such that its contacts are welded closed, and if the back or side panel is not in place such that either actuator 482, 486 is not aligned adjacent the safety sensor 48, 490, relay K2 and second contactor CT1 still would operate as noted above to prevent energizing of the heating elements of the upper and lower heat sources 66, 68.

Thus, failure of second contactor CT2 does not inhibit proper operation of the interlock switch device 480, 484 to prevent broiler operation when the back or side panel is not in place. As a result, contactors CT1 and CT2 provide a third level of power control for operational safety requiring the back and side panel to be properly in place (see FIG. 31A) in order to operate the broiler even if one of the contactors fails.

As another example, if either of the N.O. magnetic switches fails such that it is welded closed, and if the back or side panel is not in place such that the actuator 482, 486 is not aligned adjacent the safety sensor 488, 490, the N.C. magnetic switch would close energizing relay K2 to open its contact to de-energize contactor CT2 as noted above and prevent energizing of the heating elements of the upper and lower heat sources 66, 68. Thus, failure of N.O. second magnetic switch does not inhibit proper operation of the interlock switch devices 480, 484 to prevent broiler operation when the back or side panel is not in place.

As another example, if either of the N.C. magnetic switches of the sensors 488, 490 fails such that it is welded closed, this would energize relay K2 to open its contacts to de-energize contactor CT2 as noted above and prevent energizing of the heating elements of the upper and lower heat sources 66, 68. Thus, failure of N.C. magnetic switches does not inhibit proper operation of the interlock switch devices 480, 484 to prevent broiler operation when the back or side panel is not in place.

As a result, the magnetic switches provide a fourth level of power control for operational safety requiring the back and side panel to be properly in place (see FIG. 31A) in order to operate the broiler even if one of the contactors fails even is one of the switches fails.

In summary, the interlock switches 480, 484 provide a first level of power control for operational safety. Secondly, the relays K1 and K2 comprise redundant electrical components in combination with the interlock switch devices 480, 484 to permit safe operation of the broiler. Thirdly, the contactors CT1 and CT2 comprise redundant electrical components in combination with the interlock switch devices 480, 484 to permit safe operation of the broiler 30. Fourthly, the N.O. and N.C. magnetic switches of the interlock switches provide a fourth level of power control for operational safety. Thus, the interlock sensors 488, 490, the contactors CT1, CT2 and the relays K1, K2 are configured such that the interlock sensors prevent transmittal of electrical power to the heating elements in the event of a failure of one of the magnetic switches, the relays and the contactors.

In addition, the fuses in line with the solid state relays protect the relays so that the relays operate properly in response to the controller, which also permits safe operation of the broiler.

The removable heating modules 82, 84, 86 described above enable a failed heating element 94, 94A to be quickly, safely and easily replaced. To do this, the power switch 450 of the broiler 30 is turned off and the broiler is either unplugged or an all pole disconnect is locked out, to disconnect electrical power to the broiler. The back panel 306 is then removed by lifting it up from the housing 32 to disengage the lip 320 from the slots 334 and the locking elements 328, 330 on the cover brackets from their respective recesses 336, 338 in the housing. Removing the back panel 306 also moves the actuator 482 on the panel away from the safety sensor 488 to open the N.O. switches and close the N.C. switch to further insure that electrical circuit is broken for safety reasons.

Assuming that one of heating elements 94, 94A of the lower heat source 68 has failed, the lower terminal cover 270 is removed to expose the removable heating modules 82, 84, 86. The failed heating module is removed by unlatching the appropriate locking components 154, 158, quickly disconnecting the plug 244 of the failed module from the receptacle 246 on the interface 242, and pulling the module in a backward direction to disengage the module frame from module holder 120. The failed module is then replaced with a replacement module, and the above steps are reversed to reinstall the lower terminal cover and back panel.

In the event the heating element 94, 94A failed due to an electrical short, the fuse corresponding to that heating element may blow to protect the respective solid state relay. Therefore, the replacement process may also involve replacing the blown fuse. This is readily accomplished by lifting the fuse hood 230 and replacing the blown fuse with a replacement fuse taken from one of the fuse holders 232 on the hood. After the back panel 306 is in position and the fuse is replaced, the broiler 30 is ready for operation. Electrical power is supplied to the broiler by throwing the circuit breaker to its closed position and moving the power switch 450 to its "power on" position.

The replacement process does not require tools, and the person replacing the module has no risk of injury due to electrical shock because the power circuit cannot be completed until the back panel 306 is in proper position closing the back of the housing with the actuator 482 aligned relative to the safety sensor 488.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electric broiler comprising
   a housing having a top, bottom, front, back and opposite sides,
   a cooking chamber in the housing,
   a cooking surface in the cooking chamber,
   an upper heat source in the cooking chamber above the cooking surface,
   a lower heat source in the cooking chamber below the cooking surface,
   an electrical circuit for providing electrical power to the upper and lower heat sources, said electrical circuit including at least one quick connect/disconnect connector on the housing,
   at least one of the upper and lower heat sources comprising a removable heating module having an electric heating element and a quick connect/disconnect connector for quick electrical connection and disconnection of said electric heating element to and from said quick connect/disconnect connector on the housing, and
   a module holder on the housing for holding said removable heating module, said heating module being movable from a first position in which the heating element is in the module holder and operable to heat the cooking chamber to a second position in which the heating module is removed from the module holder to permit replacement of the module, wherein
   said heating module comprises a frame holding said heating element, the frame of the heating module being channel-shaped, with a bottom of the channel serving as a connecting portion for holding the heating element;
   further comprising a key system for preventing operation of a heating module at a location on said module holder not suited for that heating module.

2. The electric broiler set forth in claim 1, further comprising a locking mechanism for locking said heating module in said first position.

3. The electric broiler set forth in claim 2, said module holder is configured for holding the frame in a position in which the heating element projects forward from the frame as a cantilever into the cooking chamber.

4. The electric broiler set forth in claim 3, wherein the module older defines an elongate horizontal recess for receiving and supporting said frame in a horizontal orientation, and wherein the frame of the heating module has a top wall, a bottom wall, and a generally vertical connecting portion, said heating element projecting out from the connecting portion as a cantilever into the cooking chamber.

5. The electric broiler set forth in claim 4, wherein said heating element comprises a sinuous coil having ends extending through the connecting portion of the frame.

6. The electric broiler as set forth in claim 5, wherein a turn of the coil is supported by a bracket on the frame.

7. The electric broiler set forth in claim 1, wherein said cooking chamber comprises multiple cooking zones having different heat requirements, and further comprising a plurality of said removable heating modules having different heating element configurations for meeting said different heat requirements, and a plurality of different locations on said module holder, each location corresponding to a particular cooking zone.

8. The electric broiler set forth in claim 7, wherein said key system comprises openings of different sizes at said different locations on said module holder, each opening being sized for receiving a heating module having a specific heating configuration.

9. The electric broiler set forth in claim 7, wherein said key system comprises a pin-and-slot system comprising pins on either the heating modules or the module holder and slots for receiving the pins on the other of the heating modules or the module holder, said pins and slots having different arrangements at said different locations such that a heating module can be mounted only at a suitable location on the module holder.

10. The electric broiler set forth in claim 7, wherein said key system comprises multiple sets of interlocking components on the heating modules and module holder, the sets having different configurations at said different locations on the module holder such that a heating module can be mounted only at a suitable location.

11. The electric broiler set forth in claim 1, wherein said upper heat source comprises an upper removable heating module having an upper electric heating element and an upper quick connect/disconnect connector for quick electrical connection and disconnection of said upper electric heating element to an upper quick connect/disconnect connector on the housing, and an upper module holder on the housing for holding said upper removable heating module, said upper heating module being movable from a first position in which the upper heating element is in the upper module holder and operable to heat the cooking chamber to a second position in which the upper heating module is removed from the upper module holder to permit replacement of the upper module.

12. The electric broiler set forth in claim 1, further comprising a first removable panel for covering a first portion of the housing; wherein said electrical circuit comprises an interlock switch device for preventing the transmittal of electrical power to said heating element unless the panel is in proper place on the housing; wherein the interlock switch device includes first and second magnetic switches; wherein said electrical circuit includes first and second contactors for providing electrical power to the heat sources and includes first and second relays for controlling the first and second contactors, respectively; and wherein said interlock switch device, said contactors and said relays are configured such that the interlock switch device prevents transmittal of electrical power to said heating element in the event of a failure of one of the magnetic switches, the relays and the contactors.

13. The electric broiler set forth in claim 1, wherein said quick connect/disconnect connector on the housing comprises an interface, and said quick connect/disconnect connector of the heating module comprises a lead attached to a terminal of the electric heating element, and a quick connect/disconnect device on the lead for engaging the interface on the housing.

14. A removable heating module for an electric broiler, said broiler comprising a housing, a cooking chamber in the housing, a cooking surface in the cooking chamber, an upper heat source in the cooking chamber above the cooking surface, a lower heat source in the cooking chamber below the cooking surface, a module holder on the housing for holding said removable module, and an electrical circuit for providing electrical power to the upper and lower heat sources, said electrical circuit including at least one quick connect/disconnect connector on the housing, said removable heating module comprising:

an electric heating element; and
a quick connect/disconnect connector for quick electrical connection and disconnection of said electric heating element to and from said quick connect/disconnect connector on the housing; wherein
said removable heating module being movable from a first position in which the heating module is in the module holder and the heating element is operable to heat the cooking chamber to a second position in which the heating module is removed from the module holder to permit replacement of the module with a replacement module,
said heating module comprises a frame holding said heating element, the frame of the heating module being channel-shaped, with a bottom of the channel serving as a connecting portion for holding the heating element;
further comprising a key system component on the frame for preventing operation of the heating module at a location on the module holder not suited for that heating module.

15. The removable heating module set forth in claim 14, wherein said quick connect/disconnect connector on the housing comprises an interface, and said quick connect/disconnect connector of the heating module comprises a lead attached to a terminal of the electric heating element, and a quick connect/disconnect device on the lead for engaging the interface on the housing.

16. The removable heating module set forth in claim 14, wherein said frame being configured for engagement with the module holder to support the heating element in a position in which the heating element projects forward from the frame as a cantilever into the cooking chamber.

17. The removable heating module set forth in claim 16, wherein the frame is elongate and configured for reception in an elongate horizontal recess defined by the module holder.

18. The removable heating module set forth in claim 17 wherein the frame and has a top wall, a bottom wall, and a generally vertical connecting portion, said heating element projecting out from the connecting portion as a cantilever into the cooking chamber.

19. The removable heating module set forth in claim 17, further comprising a locking mechanism component on the frame configured to engage a mating locking mechanism component on the module holder to lock the frame in the module holder.

20. The removable heating module set forth in claim 18 wherein the heating element comprises a sinuous coil having ends extending through the connecting portion of the frame.

21. The removable heating module set forth in claim 20 wherein a turn of the coil is supported by a bracket on the frame.

22. The removable heating module set forth in claim 20 wherein a second heating element projects out from the connecting portion as a cantilever into the cooking chamber.

* * * * *